US006603497B2

(12) United States Patent
Hevenor et al.

(10) Patent No.: US 6,603,497 B2
(45) Date of Patent: Aug. 5, 2003

(54) REPLACEABLE DONOR SHEET ASSEMBLY WITH MEMORY FOR USE WITH A THERMAL PRINTER

(75) Inventors: Charles M. Hevenor, Glastonbury, CT (US); Howard H. Plude, Avon, CT (US); William J. Tortora, Willington, CT (US); Edward M. Oscarson, New Hartford, CT (US); Kenneth O. Wood, Longmont, CO (US)

(73) Assignee: Gerber Scientific Products, Inc., South Windsor, CT (US)

( * ) Notice: Subject to any disclaimer, the term of this patent is extended or adjusted under 35 U.S.C. 154(b) by 404 days.

(21) Appl. No.: 09/726,293

(22) Filed: Nov. 30, 2000

(65) Prior Publication Data

US 2001/0000055 A1 Mar. 22, 2001

Related U.S. Application Data

(62) Division of application No. 09/288,361, filed on Apr. 8, 1999.

(51) Int. Cl.[7] .......................... G01D 15/16; B41J 17/28

(52) U.S. Cl. ...................................................... 347/217

(58) Field of Search ......................... 347/217, 218–219, 347/214, 222; 400/236–237, 120.02, 120.03, 120.04, 613; 226/16

(56) References Cited

U.S. PATENT DOCUMENTS

| | | |
|---|---|---|
| 4,399,749 A | 8/1983 | Arai |
| 4,797,018 A | 1/1989 | Hofmann et al. |
| 4,851,861 A | 7/1989 | Kikuchi et al. |
| 4,949,097 A | 8/1990 | Imaseki |
| 4,961,088 A | 10/1990 | Gilliland et al. |

(List continued on next page.)

FOREIGN PATENT DOCUMENTS

| | | |
|---|---|---|
| EP | 0 562 979 B1 | 3/1993 |
| EP | 0 654 760 A2 | 5/1995 |
| EP | 0 887 197 A2 | 12/1998 |
| JP | 03292177 | 12/1991 |
| JP | 06312568 | 11/1994 |
| JP | 07323651 | 12/1995 |
| JP | 08002078 | 1/1996 |
| JP | 08197764 | 8/1996 |
| WO | WO96/04142 | 2/1996 |

OTHER PUBLICATIONS

Annex to Form PCT/ISA/206 for PCT/US00/09426, Jul. 24, 2000.

*Primary Examiner*—Lamson Nguyen
*Assistant Examiner*—K. Feggins
(74) *Attorney, Agent, or Firm*—McCormick, Paulding & Huber LLP

(57) ABSTRACT

A wide format thermal printer for printing a multicolor graphic product on a printing sheet; a vacuum workbed for supporting a sheet material for performing work operations, such as cutting, printing or plotting, thereon; a replaceable donor sheet assembly, which includes a memory, for use with a thermal printer; methods and apparatus for improved thermal printing, including methods and apparatus for conserving donor sheet and reducing the amount of time required to print a multicolor graphic product; a thermal printhead including a memory; methods and apparatus for the alignment of a sheet material for printing or performing other work operations on the sheet material; and methods and apparatus for controlling the tension of the donor sheet during printing with a wide format thermal printer. The wide format thermal printer can include provision for the automatic loading of cassettes of donor sheet from a cassette storage rack. The vacuum workbed can include provision for determining the size of the sheet material supported by the workbed, and for controlling the suction applied to the apparatus in a worksurface of the workbed.

6 Claims, 45 Drawing Sheets

U.S. PATENT DOCUMENTS

| | | | | |
|---|---|---|---|---|
| 4,970,531 A | | 11/1990 | Shimizu et al. | |
| 5,016,171 A | | 5/1991 | Connolly et al. | |
| 5,034,774 A | | 7/1991 | Higginson et al. | |
| 5,038,173 A | | 8/1991 | Kusumoto | |
| 5,049,898 A | | 9/1991 | Arthur et al. | |
| 5,066,978 A | | 11/1991 | Watarai et al. | |
| 5,079,565 A | | 1/1992 | Shimizu et al. | |
| 5,132,711 A | | 7/1992 | Shinada et al. | |
| 5,138,344 A | | 8/1992 | Ujita | |
| 5,185,315 A | | 2/1993 | Sparer | |
| 5,206,685 A | | 4/1993 | Hara et al. | |
| 5,209,587 A | | 5/1993 | Herbert et al. | |
| 5,245,354 A | | 9/1993 | Ono et al. | |
| 5,266,968 A | | 11/1993 | Stephenson | |
| 5,280,303 A | | 1/1994 | Maslanka | |
| 5,283,613 A | | 2/1994 | Midgley, Sr. | |
| 5,325,115 A | | 6/1994 | Tanahashi | |
| 5,326,182 A | | 7/1994 | Hagstrom | |
| 5,333,960 A | | 8/1994 | Nam | |
| 5,365,312 A | | 11/1994 | Hillmann et al. | |
| 5,371,523 A | | 12/1994 | Wada et al. | |
| 5,385,416 A | | 1/1995 | Maekawa et al. | |
| 5,399,035 A | | 3/1995 | Nakae | |
| 5,452,059 A | | 9/1995 | Sekiya | |
| 5,455,617 A | | 10/1995 | Stephenson et al. | |
| 5,480,238 A | | 1/1996 | Nakano et al. | |
| 5,491,540 A | | 2/1996 | Hirst | |
| 5,516,219 A | * | 5/1996 | Leonard et al. | 400/613 |
| 5,610,635 A | | 3/1997 | Murray et al. | |
| 5,672,020 A | | 9/1997 | Leonard et al. | |
| 5,682,191 A | | 10/1997 | Barrett et al. | |
| 5,699,091 A | | 12/1997 | Bullock et al. | |
| 5,751,303 A | | 5/1998 | Erickson et al. | |
| 5,774,639 A | | 6/1998 | Schildkraut et al. | |
| 5,803,627 A | | 9/1998 | Paranjpe | |
| 5,860,363 A | | 1/1999 | Childers et al. | |
| 6,138,885 A | * | 10/2000 | Hevenor et al. | 226/16 |

* cited by examiner

| FIG. 29A | FIG. 29B |
| --- | --- |

REPLACEABLE DONOR SHEET ASSEMBLY WITH MEMORY FOR USE WITH A THERMAL PRINTER

CROSS REFERENCE TO RELATED APPLICATION

This application is a divisional of U.S. patent application Ser. No. 09/288,361 entitled REPLACEABLE DONOR SHEET ASSEMBLY FOR USE WITH A THERMAL PRINTER, filed on Apr. 8, 1999, and which is herein incorporated by reference.

BACKGROUND OF THE INVENTION

The present invention relates to methods and apparatus for printing a graphic product on sheet material in accordance with a printing program and stored data representative of the graphic product, and more particularly to methods and apparatus for printing a wide format multicolor graphic product on a printing sheet, such as a vinyl sheet for use as signage.

Known in the art are thermal printing apparatus for generating signs, designs, characters and other graphic products on a printing sheet in accordance with a printing program and data representative of the graphic product. Typically, a thermal printer interposes a donor sheet that includes donor material and a backing between a thermal printhead and the printing sheet. The thermal printhead includes an array of thermal printing elements. The thermal printhead prints by pressing the donor sheet against the printing sheet and selectively energizing the thermal printing elements of the array, thereby selectively transferring pixels of donor medium from the donor sheet to the printing sheet. Movement of the printing sheet relative to the thermal printhead (or vice versa) while pressing the donor sheet against the printing sheet with the thermal printhead draws fresh donor sheet past the thermal printhead. The printing sheet typically includes a vinyl layer secured to a backing layer by a pressure sensitive adhesive so that after printing the vinyl bearing the graphic product can be cut and stripped from the backing material and affixed to an appropriate sign board or other material for display.

The proper printing of many graphic products, such as commercial artwork or signage, can require high quality print work. Often, it is desired that the final multicolor graphic product be physically large, such as several feet wide by tens of feet long. Typically, existing thermal printers are limited in the width of printing sheet that they can print upon. For example, one popular thermal printer prints on sheets that are one foot wide. Accordingly, the final graphic product is often assembled from separately printed strips of printing sheet that must be secured to the signboard in proper registration with one another. Often, the registration is less than perfect and the quality of the final graphic product suffers, especially when backlit.

Wide format thermal printers are known in the art. For example, one wide format thermal printer currently available can accommodate a printing sheet up to three feet wide and uses four full width (i.e., three feet wide) printheads, each interposing a different color donor sheet between the printhead and the printing sheet. Accordingly, far fewer seams, if any at all, require alignment when creating the sign or other product. Also, the use of four printheads allows faster printing of the multicolor graphic product.

Unfortunately this type of machine can be expensive to manufacture and to operate. For example, each printhead, at a typical resolution of 300 dpi, includes literally thousands of thermal printing elements, all of which are typically required to have resistances that are within a narrow tolerance range. Such a thermal printhead is difficult and expensive to manufacture, and moreover, burnout of simply a few thermal printing elements can require replacement of the entire printhead. Furthermore, donor sheet is also expensive, and the full-width printing heads can be wasteful of donor sheet when printing certain types of, or certain sections of, graphic products. For example, consider that a single color stripe one inch wide and perhaps a foot long is to be printed in center of the printing sheet. Though the printed object occupies 1/12 of a square foot, an area of donor sheet that is three feet wide by one foot long, or three square feet, is transferred past the print head when printing the above object, and hence consumed. The printing of a wide format graphic product that includes a narrow border about the periphery of the printing sheet is another example that typically can be wasteful of donor sheet when printing with the above wide format thermal printer.

Other wide format printers are known in the art, such as wide format inkjet printers, which can also print in a single pass. However, inkjet printed multicolor graphic products are typically not stable when exposed to the elements (e.g., wind, sun, rain) or require special post-printing treatment to enhance their stability, adding to the cost and complexity of printing with such apparatus.

Accordingly, it is an object of the present invention to address one or more of the foregoing and other deficiencies and disadvantages of the prior art.

Other objects will in part appear hereinafter and in part be apparent to one of ordinary skill in light of the following disclosure, including the claims.

SUMMARY OF THE INVENTION

In one aspect, the invention provides an assembly providing a supply of donor sheet for use in a printing operation and for replaceable use with a donor sheet cassette. The assembly includes a core having a tubular body, which body extends along a longitudinal axis between a base end and a drive end, and which body also has a central opening extending along the longitudinal axis between the base end and the drive end and a selected length of donor sheet wound about the core body. The core body also includes a plurality of drive elements, which drive elements extend along and radially of the longitudinal axis, and are located within the central opening substantially at the drive end of the core body. The assembly further includes a memory element mounted within the central opening of the core body and substantially at the drive end of the core body and inboard of the drive elements, the memory element having a data transfer face substantially perpendicular to the longitudinal axis and facing the base end of the core body and a back face facing the drive end of the core body.

The assembly can also include a take-up core having a tubular body, which body extends along a longitudinal axis between a base end and a drive end, and which body also has a central opening extending along the longitudinal axis between the base end and the drive end of the core body. The take-up core can also include a plurality of drive elements, which drive elements extend along and radially of the longitudinal axis, and are located within the central opening substantially at the drive end of the core body and are substantially identical to the drive elements of the supply core body. The free end of the length of donor sheet is coupled to the take-up core body.

In an additional aspect of the invention, there is provided an assembly for providing a supply of donor sheet for use with a wide format thermal printer for printing a multicolor graphic product onto a printing sheet in separate color planes. The assembly is for replaceable insertion in a refillable donor sheet cassette, where the cassette replaceably mounts on a cassette receiving station mounted with a thermal printhead of the thermal printer, and the cassette receiving station is adapted for receiving the cassette such that a section of donor sheet is positioned under the thermal printhead and interposed between the printhead and the printing sheet when printing. The assembly includes a core having a tubular body, which body extends along a longitudinal axis between a base end and a drive end, and which body also has a central opening extending along the longitudinal axis between the base end and the drive end and a selected length of donor sheet wound about the core body. The core body includes a plurality of drive elements, which drive elements extend along and radially of the longitudinal axis, and are located within the central opening substantially at the drive end of the core body. A memory element mounts within the central opening of the core body and substantially at the drive end of the core body and inboard of the drive elements. The memory element includes a data transfer face substantially perpendicular to the longitudinal axis and facing the base end of the core body and a back face facing the drive end of the core body.

In yet another aspect, the invention provides a method of providing a replaceable donor sheet assembly for insertion in a refillable cassette and for use with a thermal printer for providing a donor sheet for thermal printing. The method includes the steps of providing a length of donor sheet; providing a core having a tubular body extending along a longitudinal axis between a base end and a drive end and having a central opening extending therethrough between the base and drive ends, where the core includes a plurality of drive elements, which drive elements extend along and radially of the longitudinal axis and are located within the central opening substantially at the drive end of the core body, as well as a memory element mounted within the central opening of the core body and substantially at the drive end of the core body and inboard of the drive elements, where the memory includes a data transfer face substantially perpendicular to the longitudinal axis and facing the base end of the core body and a back face facing the drive end of the core body; winding the selected length of the donor sheet about the core body; determining selected data characteristic of the donor sheet; and writing the selected data to the memory element.

In yet another aspect of the invention, there is provided a method of manufacturing a replaceable assembly for providing a supply of donor sheet and for insertion in a refillable cassette. The method includes the steps of: providing a length of donor sheet having a first width W; cutting the length of donor sheet along its length into N separate slice lengths of donor sheet each having a width approximately equal to W divided by N; providing N supply core bodies; winding the N slice lengths of donor sheet onto the N core bodies to provide N wound supply core bodies of donor sheet; providing N memory elements each having data transfer and back faces, each of the memory elements mounted within a different supply core body substantially at a first end thereof and having the data transfer face facing inwardly toward the second end of the core body; testing the donor sheet to determine data characteristic of the donor sheet; storing on the memory elements the data characteristic of the sheet material; providing N take-up core bodies; and affixing free ends of each of the slice lengths wound on the supply core bodies to a different take-up core body to form N donor sheet assemblies.

BRIEF DESCRIPTION OF THE DRAWINGS

FIG. 7 is drawn as if the workbed is transparent such that the apparatus below the workbed is readily visible.

FIG. 21B illustrates the technique of X axis conservation for consuming less donor sheet than the technique of FIG. 21A.

DETAILED DESCRIPTION OF THE PREFERRED EMBODIMENTS

Figure 1:
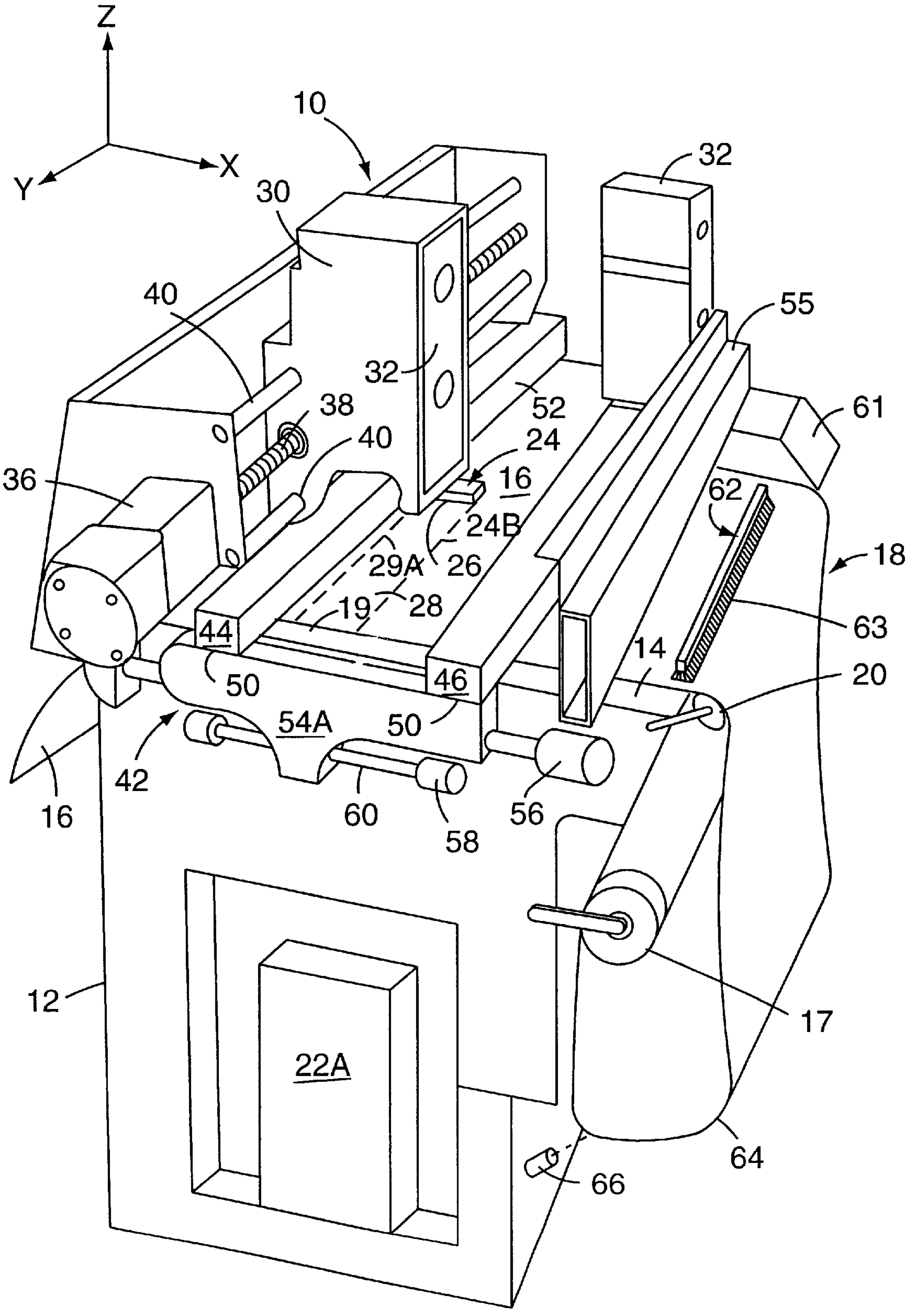
FIG. 1 illustrates one embodiment of a wide format thermal printer according to the invention.

FIG. 1 illustrates one embodiment of a wide format thermal printer 10 according to the invention. The wide format thermal printer 10 includes a base structure 12 that supports a workbed having a work surface 14 for supporting a printing sheet 16 onto which a multicolor graphic product is to be printed. A guide surface 20 can be provided for guiding the printing sheet 16 as it travels from the printing sheet supply roll 17 to the work surface 14. A printing sheet drive motor, indicated generally by reference numeral 18, can be provided at the other end of the printing sheet supply roll 17 for rotating the printing sheet supply roll 17. The wide format thermal printer 10 prints the multicolor graphic product onto the printing sheet 16 in separate color planes and responsive to a controller(s), such as the "on-board" controller 22A, and responsive to machine readable data representative of the graphic product. The machine readable data can be stored either on the on-board controller 22A or on additional controllers (not shown in FIG. 1) located remote to the wide format thermal printer 10 and in communication with the on-board controller 22A. Reference numeral 22 is used herein to generally refer to the controller (s), whether on-board or otherwise, associated with the wide format thermal printer 10. The printing sheet 16 exits the printer 10 at the other end of the work surface 14.

The wide format thermal printer 10 prints each color plane by interposing a section of a donor sheet (not shown in FIG. 1) corresponding to the color of the section of donor sheet interposed between the thermal printhead 24 and the printing sheet 16. The multicolored graphic product is printed on the printing sheet 16 in individual print swaths, as indicated by reference numeral 28, that extend along a print axis, also referred to herein as the "Y-axis", and have a selected printing width, or swath width, along a printing sheet translation axis, also referred herein as the "X-axis". The print (Y) axis and the printing sheet translation (X) axis define a plane substantially parallel to the plane of the work surface 14 of the workbed. The thermal printhead 24 presses the section of donor sheet against the printing sheet 16 and selectively energizes an array of thermal printing elements 26, which extends along a printing sheet translation (X) axis, as the thermal printhead 24 is translated along the print (Y) axis. The array of thermal printing elements is energized responsive to the machine readable data and the controller(s) 22.

A printhead carriage 30 mounts the thermal printhead 24 and includes a cassette receiving station for receiving a cassette 32 of the donor sheet. The cassette 32 includes a supply roll of donor sheet, typically including a supply length of donor sheet wound on a supply core tubular body, and a take-up roll for receiving the donor sheet after it has been interposed between the thermal printhead 24 and the printing sheet 16. The take-up roll includes the consumed length of donor sheet wound on a take-up core tubular body.

The printing drive motor 36 translates the printhead carriage 30, and hence the thermal printhead 24, along the print (Y) axis by rotating the printhead ball screw 38. The printhead guide rails 40 guide the thermal printhead 24 as it travels along the print (Y) axis. A pair of translatable clamps, indicated generally by reference numeral 42, translate the printing sheet 16 along the printing sheet translation (X) axis between the printing of print swaths such that adjacent print swaths align to print a color plane of the multicolor graphic product. The first and second clamps, 44 and 46 respectively, are each movable between clamped and unclamped conditions relative to the printing sheet 16 supported on the work surface 14 and each extend from a first end 50 to a second end 52 across the work surface 14 and parallel to the print (Y) axis. The print swath 28 shown as being printed in FIG. 1 extends parallel to the print (Y) axis in an area between the clamps 44 and 46.

The clamp pair fixture 54A mechanically couples the first ends 50 of the clamps 44 and 46 to one another such that the clamps 44 and 46 are substantially fixedly spaced from one another in the direction of the printing sheet translation (X) axis. A guide rod 56 supports and guides the clamp pair fixture for translation along the printing sheet translation (X) axis. The clamp actuator 58 is coupled to the clamp pair fixture 54A via the ball screw 60 for rotating the ball screw and translating the clamp pair 42 parallel to the printing sheet translation (X) axis. The second ends of the clamps 52 are also mechanically coupled by a clamp pair fixture supported by a guide rod (both not shown in FIG. 1). An additional actuator may be provided for translating the second ends 52 of the clamps 44 and 46 independently of the first ends 50 of the clamps 44 and 46 Independent translation of the first and second ends of the clamps can be particularly advantageous when aligning the printing sheet 16 to the work surface 14, as discussed in more detail below.

In the process of printing a particular color plane on the printing sheet 16, the clamp pair 42 reciprocates back and forth along the printing sheet translation (X) axis between first and second positions. For example, after the thermal printhead 24 prints a print swath, the clamp pair 42 clamps the printing sheet 16 and moves to a second position to translate the sheet a distance typically equal to the width of one print swath 28. The clamp pair 42 then returns to its original position so as to be ready to translate the printing sheet 16 again after the next swath is printed. The thermal printhead is then translated along the print (Y) axis and prints the next swath. The above cycle repeats until a complete color plane is printed on the printing sheet. Preferably, only one clamp of the clamp pair 42 clamps the printing sheet at time, and the printing sheet 16 is pulled by the clamp pair 42 rather than pushed. For example, when translating the printing sheet away from the supply roll 17, the clamp 44 is in the clamped condition for clamping the printing sheet 16 and the clamp 46 is in the unclamped condition. If translating the printing sheet 16 in the opposite direction from that described above, the clamp 46 clamps the printing sheet and the clamp 44 is in the unclamped condition.

According to the invention, the wide format printer 10 can print the multicolor graphic product on the printing sheet 16 by translating the printing sheet in both directions along the printing sheet translation (X) axis. For example, when printing one color plane, the translatable clamp pair 42 translates the printing sheet in one direction along the printing sheet translation (X) axis between successive print swaths, and when printing a different color plane, the translatable clamp pair can translate the printing sheet 16 in the opposite direction between successive print swaths. Additionally, it can be advantageous to translate the printing sheet in both directions along the printing sheet translation axis when printing a single color plane. For example, one portion of the color plane can be printed by translating the printing sheet in one direction along the printing sheet translation (X) axis between successive print swaths and another portion printed by translating the printing sheet in the opposite direction between successive print swaths.

Prior art printers that print in separate color planes often avoid printing in both directions due to the difficulty of providing proper registration between the color planes. One technique known in the art is to print a registration mark at one end (along the printing sheet translation (X) axis) of the printing sheet, and print each color plane starting at that registration mark and proceeding towards the opposite end of the printing sheet. Thus the printing sheet must be "rewound" between successive color planes so that the printing of the next plane can also start at the registration mark. The present invention advantageously allows printing in both directions, avoiding the need to "rewind" the printing sheet.

The wide format thermal printer 10 also includes apparatus (not shown) for securing the printing sheet 16 to the work surface 14 of the workbed when printing on the printing sheet 16 and releasing the printing sheet 16 from the work surface 14 when translating the printing sheet 16 in the printing sheet translation (X) axis. Such apparatus for securing the printing sheet can include suction apertures formed in the work surface 14 of the workbed and a suction source coupled to the suction apertures for applying suction to the printing sheet 16, and/or, as understood by one of ordinary skill in the art, electrostatic apparatus or mechanical clamps for clamping the printing sheet 16 to the work surface 14. The preferred apparatus for securing the printing sheet is described in more detail below.

The wide format printer can include a cassette storage rack 55 for storing cassettes 32 that are not in use. The cassette storage rack 55 extends generally parallel to the print (Y) axis and can mount a plurality of donor sheet cassettes 32 in a row. As discussed in more detail below, the cassette receiving station of the printhead carriage 30 can include a translatable engaging element for engaging a donor sheet cassette 32 stored on the cassette storage rack 55 and transporting the cassette 32 between the cassette receiving station and the cassette storage rack 55. The printhead carriage 30 includes donor sheet handling apparatus for, in conjunction with the cassette 32, interposing a section of the donor sheet between the thermal printhead 24 and the printing sheet 16 supported by the work surface 14. The cassette storage rack 55 can include donor sheet cassettes 32 that include spot color donor sheet, such that the wide format printer of the present invention can advantageously print an enhanced multicolor graphic product by easily incorporating both spot and process colors into the final printed multicolor graphic product.

The wide format thermal printer 10 can also include a user interface 61 for controlling the basic operating functions of the printer 10. Typically, however, the printer 10 is controlled from a remote controller 22, e.g., a workstation, that communicates with the on-board controller 22A. Preferably the wide format thermal printer also includes squeegee bars 62 (only one of which can be shown in FIG. 1) for pressing against the printing sheet 16 for cleaning the printing sheet 16 and for providing a selected drag on the printing sheet 16 when the sheet 16 is translated along the printing sheet translation (X) axis. The squeegee bars can include brushes 63 that can be electrically grounded for dissipating static charge. Typically, the squeegee bars are operated by actuators (not shown), such as solenoids, that are controlled by the controller(s) 22 for selectively lifting the squeegee bars 62 away from the printing sheet material. The other squeegee bar is typically located at the opposite end (in the direction of the printing sheet translation (X) axis) of the work surface 14, and each includes an independently controllable actuator.

Preferably, the printing sheet 16 forms a hanging loop 64 between the printing sheet and the guide surface 20. The hanging loop 64 helps maintain proper tension on the printing sheet 16, such that it is properly translated by the translatable clamp pair 42. The hanging loop optical sensor 66 sensing the presence of a proper hanging loop 64 and a printing sheet supply roll motor 18 (not shown) responsive to the hanging loop optical sensor 66, rotates the printing sheet supply roll 17 accordingly to maintain the proper hanging loop 64.

For simplicity, the wide format printer 10 and its various components, such as the printhead carriage 30, the donor sheet cassette 32, and the cassette storage rack 55, are indicated very generally and schematically in FIG. 1. The ensuing description and FIGURES provide additional detail and description of the wide format printer 10, and in particular of the printhead carriage 30 and the donor sheet cassette 32.

Figure 2:
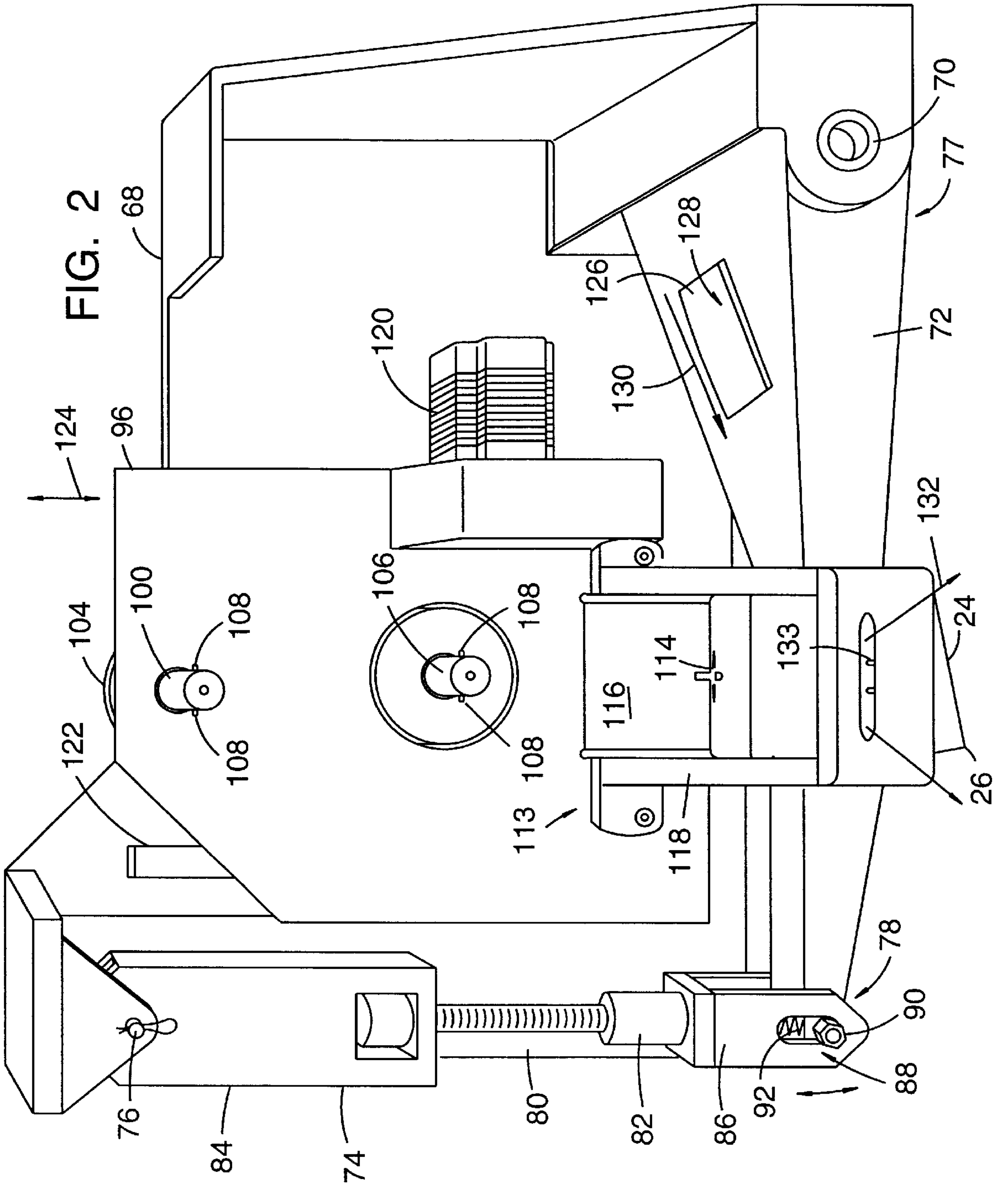
FIG. 2 illustrates one embodiment of the printhead carriage of the wide format thermal printer of FIG. 1.

FIG. 2 illustrates a preferred embodiment of the printhead carriage 30. The printhead carriage 30 includes a base structure 68 that receives the printhead guide rails 40 and the printhead ball screw 38 for translation of the base structure 68 parallel to the print (Y) axis. The base structure 68 pivotably mounts a cantilever arm 72 for pivoting about a pivot pin 70 that extends along a pivot axis that is generally parallel to the printing sheet translation (X) axis and perpendicular to the print (Y) axis. A second pivot pin 76 couples the pivot actuator 74 to the base 68 and to the other end 78 of the cantilever arm 72. The pivot actuator 74 is typically a stepper motor that rotates a lead screw 80 that is received by the threaded nut 82. The threaded nut 82 attaches to a support 86 that defines a slot 88 for engaging a pin 90 coupled to the end 78 of the cantilever arm 72. A bias spring 92 is inserted between the end 78 of the cantilever arm 72 and an upper surface of the support 86. The cantilever arm 72 mounts the thermal printhead 24. The pivot actuator 74 raises and lowers the printhead by pivoting the cantilever arm 72. The bias spring 92 allows the pivot actuator 74 selectively advance the lead screw 80, after the printhead 24 has contacted the printing sheet 16, for pressing the donor sheet between the thermal printhead 24 and the printing sheet 16 with a selected pressure The base structure 68 mounts a donor sheet handling apparatus 94 that includes a cassette receiving station 96. The cassette receiving station 96 includes a take-up shaft 100 and take-up shaft drive elements 102 rotationally coupled to a take-up drive motor 104. The supply shaft 106 includes supply shaft drive elements 108 that are rotationally coupled to a magnetic brake (not shown) mounted behind the cassette receiving station 96.

The cassette receiving station 96 is adapted for receiving a donor sheet cassette 32, such that a section of the donor sheet threaded between supply and take-up rolls of the cassette is positioned under the thermal printhead 24 for being interposed between the printhead 24 and the printing sheet 16. The supply shaft and take-up shaft drive elements 108 and 102 engage drive elements mounted with the donor sheet cassette 32 and are rotationally coupled to the supply and take-up rolls of the donor sheet cassette 32. One of ordinary skill in the art, apprised of the disclosure presented herein, understands that the present invention can be practiced by manually loading a donor sheet cassette 32 onto the cassette receiving station 96. That is, a donor sheet cassette 32 would be selected from the cassette storage rack 55, which need not be mounted on the wide format thermal printer 10, and the cassette placed onto the receiving station 96 for printing the color plane of the multicolor graphic product corresponding to the color of the donor sheet mounted within the cassette 32. Furthermore, one of ordinary skill in the art also understands that the supply and take-up rolls of donor sheet can be mounted directly on the take-up and supply shafts, 100 and 106, respectively, and appropriate guide apparatus, such as pins, arranged with the cassette receiving station 96, for aiding in interposing the donor sheet between the thermal printhead 24 and the printing sheet 16.

However, one of the advantages of the present invention is that it can provide for relatively unattended printing of several or all of color planes of the multicolor graphic product. Accordingly, provision is made for the automatic loading and unloading of donor sheet cassettes 32 to and from the cassette storage rack 55. The cassette receiving station 96 mounts a cassette transport apparatus 112 that extends from the receiving station 96 toward the cassette storage rack 55. The cassette transport apparatus 112 includes a translatable engaging element 114 that can be translated to the far end of the cassette transport apparatus 112 for engaging a donor sheet cassette 32 stored on the cassette storage rack 55. The engaging apparatus 114 is carried by a toothed drive belt 116 that is mounted by a belt support bed 118. The belt drive motor 120 is coupled to the toothed drive belt 116 for moving the toothed drive belt 116 about the belt support bed for translating the engaging tab 114 away and toward the cassette receiving station 96.

The base structure 68 slidably mounts the cassette receiving station 96 via a pair of slides, one of which is visible in FIG. 2 and indicated by reference numeral 122. The cassette receiving station 96 can thus slide up and down in the direction of the Z axis, as indicated by the arrows 124. To move the cassette receiving station 96 upward, the pivot actuator 74 pivots the cantilever arm 72 upward such that the cantilever arm 72 contacts the cassette receiving station 96. Further movement of the cantilever arm 72 upward by the pivot actuator 74 then moves the cassette receiving station 96 upward along the slides, such as slide mount 122, moving the belt support bed 118 upward. As a result of this upward movement, when the cassette engaging element 114 is at the end of the belt support bed 118 and is correctly positioned, along the print (Y) axis, under a donor sheet cassette 32 on the cassette storage rack 55, the cassette engaging element 114 engages that donor sheet cassette 32.

To retrieve a donor sheet cassette 32 and mount the cassette onto the cassette receiving station 96, the printing drive motor 36 is instructed to drive the printhead carriage 30 such that it is opposite a selected donor sheet cassette 32 stored on the cassette storage rack 55. The belt drive motor 120 then drives the toothed drive belt 116 to translate the translatable engaging element 114 to the end of the belt support bed 118, such that the translatable engaging element 114 is positioned under a donor sheet cassette 32. Next, the pivot actuator 74 pivots the cantilever arm 72 upward such that the cantilever arm 72 contacts and drives the cassette receiving station 96 upward so that the translatable engaging element 114 engages a notch in the donor sheet cassette 32. The belt drive motor 120 then drives the toothed drive belt 116 in the opposite direction, such that the donor sheet cassette 32 is drawn towards the cassette receiving station 96. As the donor sheet cassette 32 is drawn towards the cassette receiving station 96, the shaft drive elements 102 and 108 are slightly rotated so that they properly engage drive elements mounted with the donor sheet cassette 32. The belt drive motor 120 thus pulls the donor sheet cassette towards the cassette receiving station 96 until it is properly mounted with the station and engages the shaft drive elements 102 and 108. The procedure is reversed for returning a donor sheet cassette 32 to the cassette storage rack 55.

After retrieving a selected donor sheet cassette 32, the pivot actuator 74 lowers the cantilever arm 72 such that the printhead 24 presses a section of the donor sheet against the printing sheet 16 supported by the work surface 14. Stops are included for limiting the downward travel of the cassette receiving station 96.

Note that the cantilever arm 72 can include provision for cooling the thermal printhead 24. The cantilever arm 72 can mount a blower 126 that draws air into the cantilever arm 72, as indicated by reference numeral 128. Internal cavities in the arm channel the air towards the printhead 24, as indicated by reference numeral 130. The air then exits the cantilever arm 72, as indicated by reference numerals 132, after being blown over cooling fins 133, which are in thermal communication with the thermal printhead 24. Additional detail on thermal printhead 24 and the thermal management thereof is given below.

Figure 3:
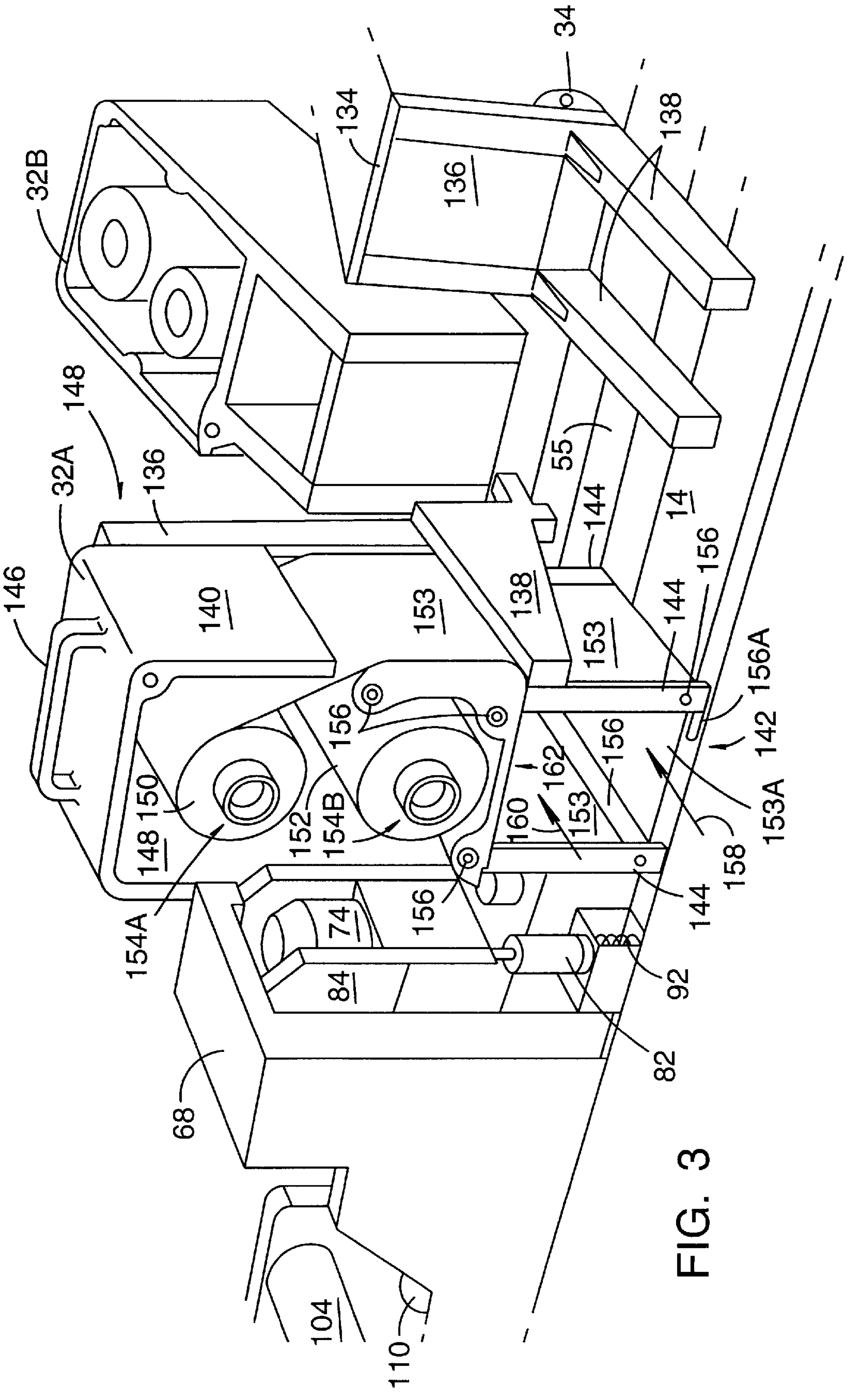
FIG. 3 is a perspective view of the cassette storage rack of the wide format thermal printer of FIG. 1 and of a donor sheet cassette mounted on the rack.

FIG. 3 is a perspective view of the cassette storage rack 55 and donor sheet cassettes 32. The cassette storage rack 55 includes individual cassette storage trays, such as tray 134, each for storing a donor sheet cassette 32. Cassette storage trays 134 can pivot backwardly for accessing a donor sheet cassette 32, such as donor sheet cassette 32B, for removing the donor sheet therefrom or for adding the donor sheet thereto. As described in more detail below, the donor sheet cassettes 32 are refillable precision donor sheet cassettes that accept replaceable donor sheet assemblies that include supply and take-up rolls. Each of the cassette storage trays 134 include a back portion 136 and a seat portion formed by legs 138 for supporting a donor sheet cassette 32.

The donor sheet cassette 32A is now described in additional detail to further illustrate the invention. The donor sheet cassette 32A includes an upper portion 140 and a lower portion, indicated generally by reference numeral 142. The upper portion 140 houses a take-up roll 150 of spent donor sheet that is wound about a take-up core tubular body and houses a supply roll 152 of a supply length of donor sheet wound about a supply core tubular body. The lower portion 142 includes four (4) legs 144 that extend downwardly from the upper portion 140. The lower portion 142 serves to position the donor sheet 153 such that it is interposed between the thermal printhead 24 and the printing sheet 16. The legs 144 form a rectangular "box" of the donor sheet 153, and the thermal printhead 24 fits into the "box", following the path indicated by reference numeral 158, as the donor sheet cassette 32 is loaded onto the cassette receiving station 96. Thus the donor sheet cassette 32 of the present invention includes structure for precisely guiding the donor sheet 153, as in contrast to much of the prior art, wherein the cassettes are non-precision structures, typically made of plastic, that simply roughly position the donor sheet for positioning by precision guiding apparatus fixedly mounted with the printer.

The upper portion 140 includes a handle 146 and a cover 148. The donor sheet supply roll 152 includes a supply length of the donor sheet 153 that is wound about a core tube (not shown). The cover 148 rotationally mounts torque transmission elements 154A and 154B, for transmitting torque from the take-up and supply shafts, 100 and 106, respectively, of the cassette receiving station 96 to the take-up and supply rolls, 150 and 152. The donor sheet cassette 32A includes a transfer apparatus for transferring the donor sheet 153 from the supply roll 152 to the take-up roll 150, such that it can be interposed between the thermal printhead 24 and the printing sheet 16. The donor sheet transfer apparatus includes a donor sheet take-up roll mounting shaft and a donor sheet supply roll mounting shaft, which mount the take up and supply rolls 150 and 152, respectively, and which are not visible in FIG. 3. The donor sheet transfer apparatus also includes guide rollers 156, including those supported by the legs 144, for guiding the donor sheet 153 from the supply roll 152, to the take-up roll 150, such that the lower section 153A of the donor sheet 153 is interposed between the thermal printhead 24 and the printing sheet 16. When printing, and as the pivot actuator 74 presses the thermal printhead 24 against the printing sheet 16, as the printing drive motor 36 translates the thermal printhead 24 along the print (Y) axis, fresh sections 153 of the donor sheet 153 are drawn past the thermal printhead 24 from the supply roll 152, and the consumed donor sheet is wound on the take-up roll 150.

As described briefly above, the legs 144 of the lower section 142 of the donor sheet cassette 32A are spaced such that the thermal printhead 24 can fit therebetween for pressing the lower section 153A of the donor sheet 153 against the printing sheet 16. Reference numeral 158 indicates how the thermal printhead 26 extends between the legs 144 when the donor sheet cassette 32A is received by the donor sheet cassette receiving station 94, shown in FIG. 2. Reference numeral 160 indicates how the spacing of the legs 144 also allows the cassette transport apparatus 112 to fit between the legs such that the translatable engaging element 114 may engage a slot formed in a lower wall of the upper portion 140 of the donor sheet cassette 32A. The location of the slot is indicated generally by the reference numeral 162 in FIG. 3.

Partially shown in FIG. 3 are the following: the base structure 68 of the printhead carriage 30; the take-up drive motor 104; the magnetic brake 110 that is rotatably coupled to the supply shaft 106; the pivot actuator 74; the pivot actuator housing 84; the pivot actuator threaded nut 82; and the bias spring 92.

FIGS. 1–3 are discussed above to generally and schematically illustrate many of the salient features of the wide format printer of the present invention. Additional detail is provided in the FIGURES and discussion presented below.

Figure 4A:
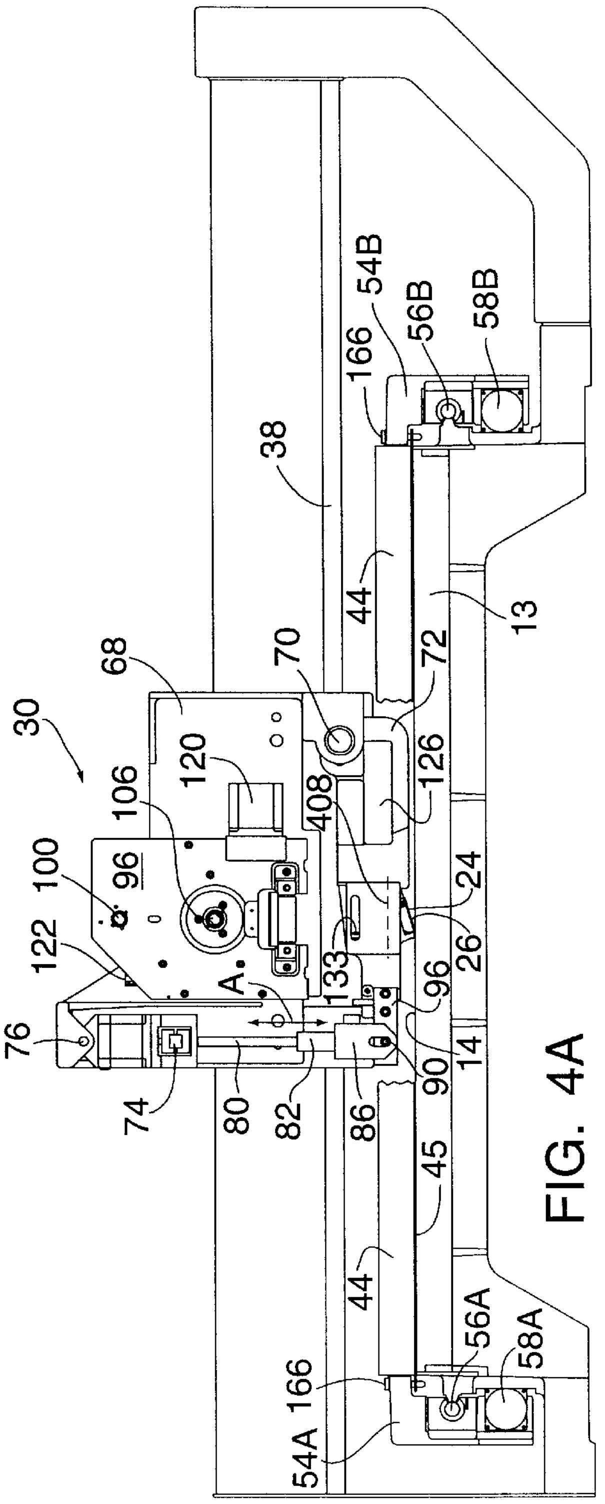
FIG. 4A is a cutaway view of the upper portion of the wide format thermal printer of FIG. 1, including a front elevational view of the printhead carriage of FIG. 2.
Figure 4B:
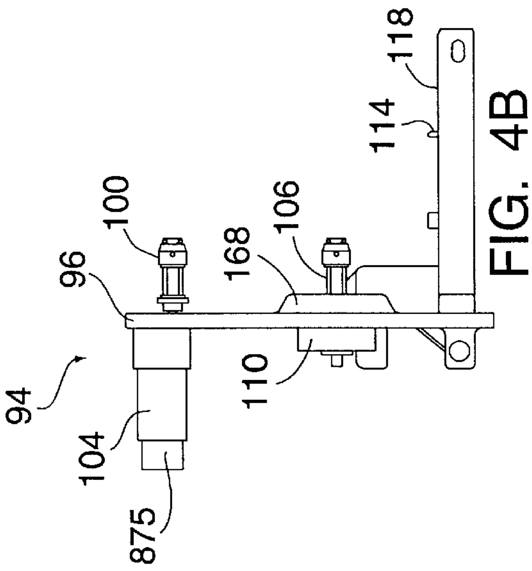
FIG. 4B is side elevational view of the donor sheet handling apparatus, including a cassette receiving station, for slidably mounting to the base structure of the printhead carriage of FIG. 2.
Figure 5:
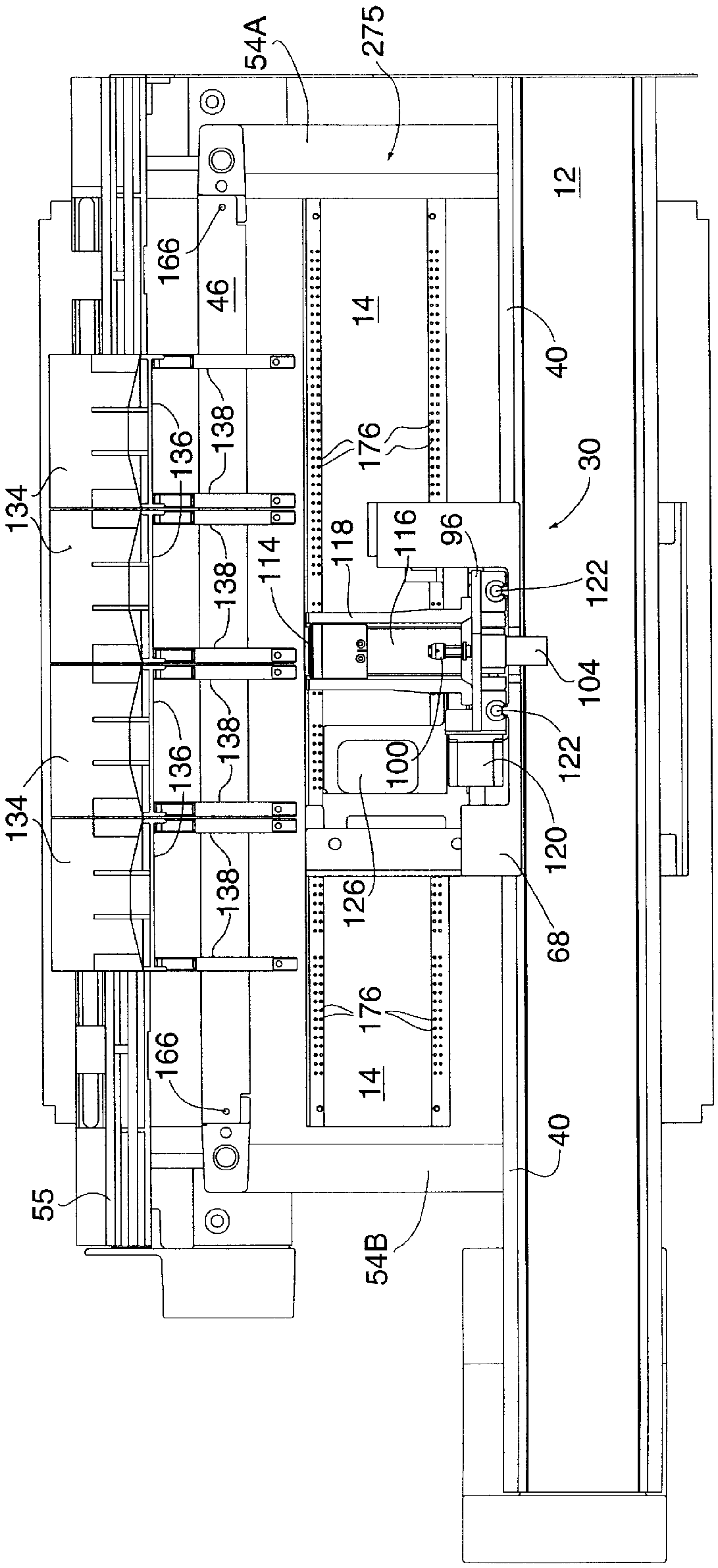
FIG. 5 is a top view of the wide format thermal printer of FIG. 1 showing the work surface, the printhead carriage of FIG. 2, one of the magnetic clamps and the cassette storage rack including four (4) cassette storage trays.

FIGS. 4–5 illustrate additional views of the apparatus shown in FIGS. 1–3. FIG. 4A is a cutaway view of the upper portion of the wide format thermal printer 10, including a front elevational view of the printhead carriage 30.

With reference to FIG. 4A, note that separate drive actuators 58A and 58B, respectively, independently drive the first and second ends of the translatable clamp pair 42. Only the clamp 44 of the translatable clamp pair 42 is shown in FIG. 4A, and the clamp 44 is cutaway to illustrate full detail of the printhead carriage 30 The work surface 14 is defined by a workbed 13, shown in cross-section in FIG. 4A. The reference character "A" indicates a space between the cantilever arm 72 and the cassette receiving station 96. The pivot actuator 74 has pivoted the cantilever arm 72 downward such that it does not contact the cassette receiving station 96, and mechanical stops have limited the downward travel of the cassette receiving station. Also indicated in FIG. 4A, by reference numeral 408, is the mounting axis, along which a trunnion pin is preferably disposed for coupling the thermal printhead 24 to the cantilever arm 72. The thermal printhead 24 is described in more detail below.

FIG. 4B illustrates a side elevational view of the donor sheet handling apparatus 94 including the cassette receiving station 96 that is slidably mounted to the base structure 68 of the printhead carriage 30. Shown are the take-up drive motor 104, the magnetic brake 110, as well as the translatable cassette engaging element 114. A boss 168 is formed at the base of the supply shaft 106.

FIG. 5 is a top view of the wide format thermal printer 10 showing the work surface 14, the printhead carriage 30, the clamp 46, and the cassette storage rack 55, including four (4) cassette storage trays 134. Note that the work surface 14 can include suction apertures 176. Suction is selectively applied to the suction apertures 176 for securing the printing sheet 16 to the work surface 14 when printing on the printing sheet 16 and releasing the printing sheet 16 from the work surface 14 when translating the printing sheet 16 with the translatable clamp pair 42. The workbed 13 typically includes a platen 275, against which the thermal printhead 24 presses the donor sheet and printing sheet 16.

Figure 6A:
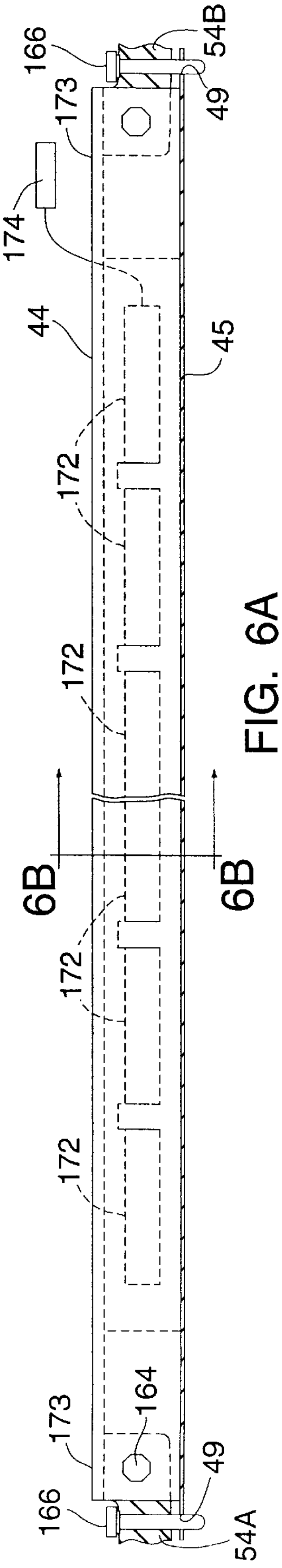
FIGS. 6A and 6B illustrate cross-sectional and end views, respectively, of one of the magnetic clamps, including the keeper, of the wide format thermal printer of FIG. 1.
Figure 6B:
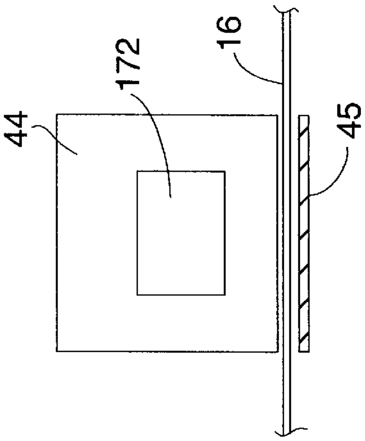

FIGS. 6A and 6B illustrate cross-sectional and end views, respectively, of the magnetic clamp 44, including the keeper 45. Screws 164 attach the ears 173 of the magnetic clamp 44 to the clamp pair fixtures 54A and 54B. The pins 166 guide the keeper 45 and pass through apertures 49 in the keeper 45. The clamp 44 is placed in the clamped condition by energizing the magnetic coils 172 disposed within the clamp 44 via the connector 174 to attract the keeper 45 so as to clamp the printing sheet 16 between the keeper 45 and a clamping surface of the clamp 44.

The present invention is deemed to include many additional features and aspects. These features and aspects are now described in turn. The order of discussion is not intended to bear any relation to any relative significance to be ascribed to the features or aspects of the invention.

Vacuum Workbed

The wide format thermal printer 10 of the present invention is intended to be used with a variety of widths of printing sheets 16. "Width", in this context, refers to the dimension of the printing sheet along the print (Y) axis. Narrow printing sheets may not cover all of the suction apertures 176 in the worksurface 14 of the workbed 13, which are provided for securing the printing sheet 16 to the worksurface 14. To ensure that sufficient suction is applied to apertures blocked by the printing sheet 16 to secure the printing sheet 16 to the worksurface, it is often necessary to isolate many if not all of the unblocked apertures from the suction source 210. It is known in the art to arrange the apertures 176 in independent zones and for an operator to manually isolate, such as by turning valves or causing operation of solenoids, selected zones so as to not apply suction to those apertures not blocked by the printing sheet 16.

Furthermore, it is known for the operator, based upon observation of the width of the printing sheet 16, to manually inform the controller 22B of the width of the printing sheet 16, such as by data entry to the controller using a keypad. Knowledge of the width of the printing sheet 16 can be advantageous for a number of reasons. First, the array of thermal printing elements 26 is not to be energized when dry. That is, the array of thermal printing elements 26 of the thermal printhead 24 should not be energized when the thermal printhead 24 is not pressing donor sheet 153 against the printing sheet 16. Running the thermal printhead 24 "dry" risks ruining the typically expensive thermal printhead 24, as the thermal printing elements of the array 26 can overheat and change their printing characteristics. Accordingly, it is useful to know the width of the printing sheet 16 for imposing a limit on the travel of the thermal printhead 24 along the print (Y) axis.

According to the invention, there is provided a simple system for accommodating various widths of printing sheets 16 without the need for an operator of the wide format thermal printer 10 to observe which zones of apertures 176 are not blocked by the printing sheet 16 and to then manually operate valves so as to isolate those apertures from a suction source. The system of the invention can also automatically determine the width of the printing sheet 16.

Figure 7:
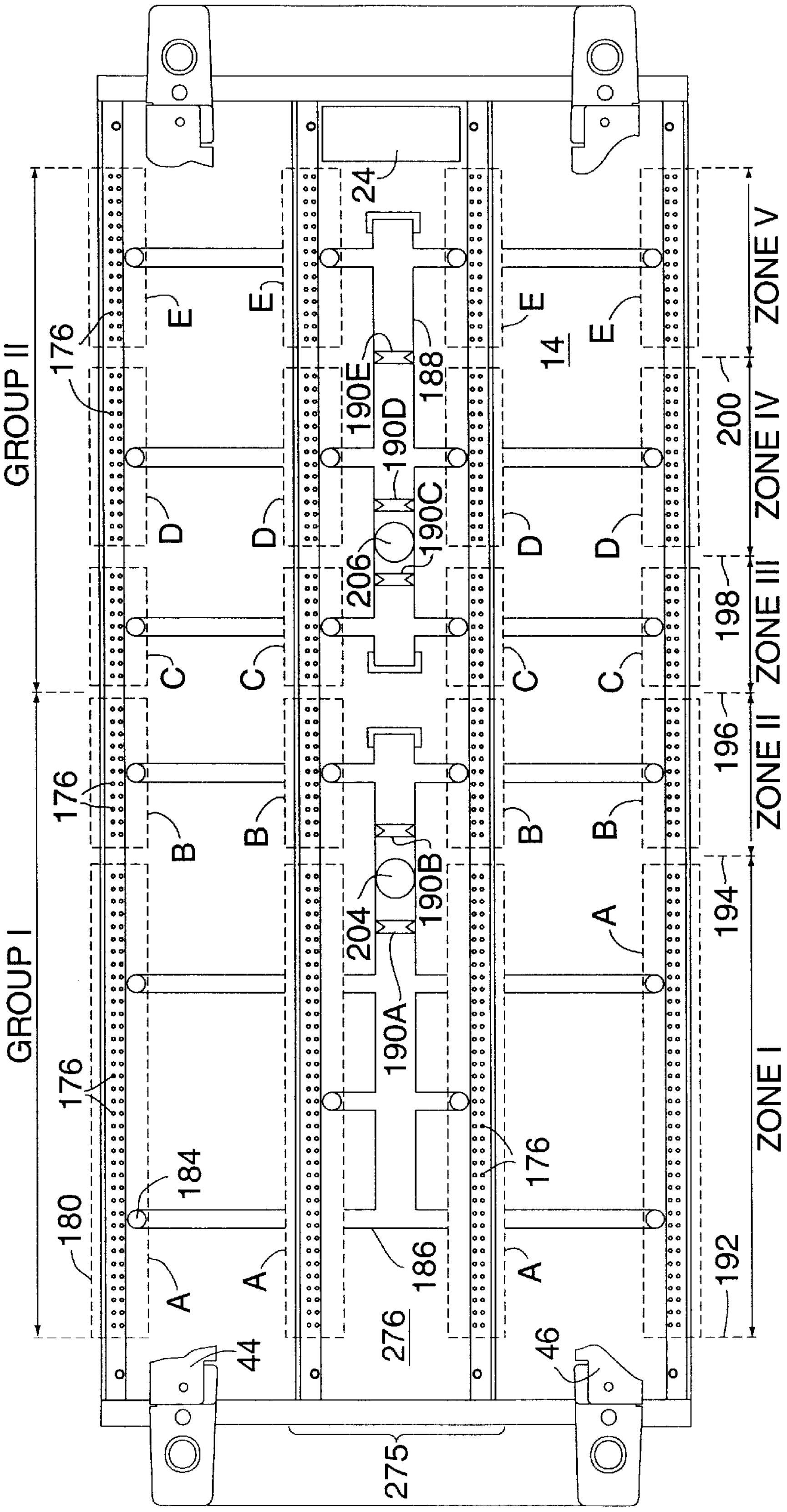
FIG. 7 illustrates a top view of the work surface of the workbed of the wide format thermal printer of FIG. 1 showing suction apertures in the worksurface for selectively securing the printing sheet to the worksurface.

FIG. 7 illustrates a top view of the work surface 14 of the workbed 13. FIG. 7 is drawn as if the workbed 13 is transparent such that the apparatus below the workbed 13 is readily visible. The clamps 44 and 46 are shown as cutaway and the thermal printhead 24 is illustrated on the right-hand side of FIG. 7 so as to indicate the location of the print swath 28 relative to the apertures 176.

The dotted lines indicate plenums formed in the workbed 13 below the worksurface 14 and in fluid communication with those apertures 176 surrounded by a particular dotted line. Reference numerals 186 and 188 indicate manifolds for applying suction to the apertures, and the circles within the dotted lines indicate fluid communication between a manifold and the plenum indicated by the dotted line. For example, the manifold 186 fluidly communicates with plenum indicated by the reference numeral 180, as indicated by the circle 184, and hence, taking note of the additional circles shown in FIG. 7, fluidly communicates with the apertures indicated by the reference letters A and B. The manifolds 186 and 188 can be fabricated from suitable lengths and couplings of plastic pipe or tubing.

According to the invention, the apertures 176 are organized into zones, which can correspond to different widths of the printing sheet 16 disposed upon the worksurface 14 of the workbed 13. Reference numeral 194 indicates a dividing line between zone I and zone II; reference numeral 196 indicates a dividing line between zone II and zone III; reference number 198 indicates a dividing line between zone III and zone IV; and reference number 200 indicates a dividing line between zone IV and V. The apertures 176 included in each zone are further delineated by reference letters A–E. Zone I includes the plenums, and suction apertures in fluid communication therewith, indicated by reference letters A; Zone II is similarly indicated by reference letters B, and zones II, IV and V are indicated by reference letters C, D and E, respectively. FIG. 7 is to be viewed in conjunction with FIG. 8, and the circles 204 and 206 indicate fluid communication with the apparatus shown in FIG. 8 for applying suction to the manifolds 186 and 188.

Figure 8:
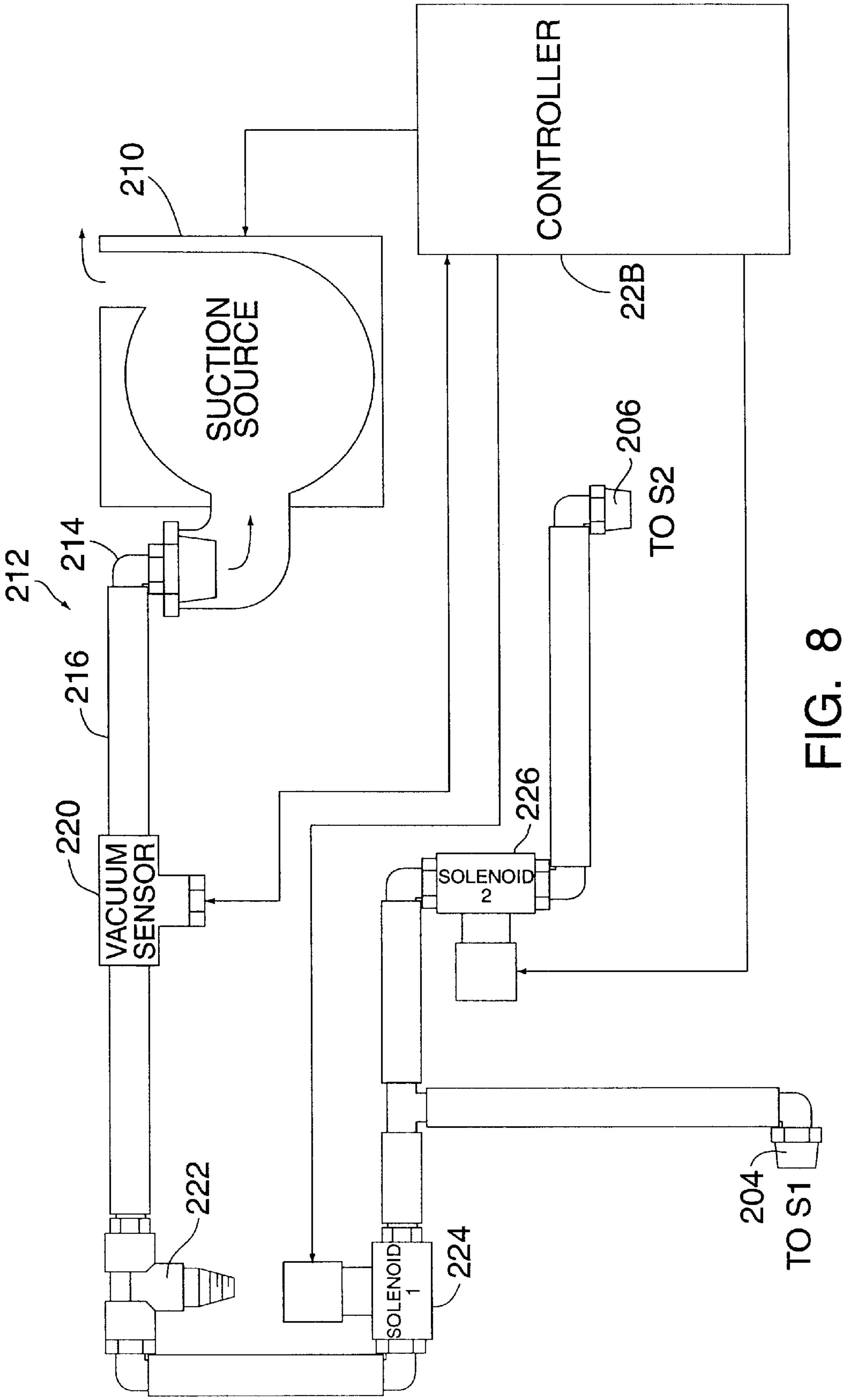
FIG. 8 illustrates suction apparatus for selectively applying suction to the suction apertures in the worksurface illustrated in FIG. 7.

Shown in FIG. 8 are the following: a suction source 210, manifold 212 that includes elbows, such as elbow 214, and tubing sections, such as tubing section 216; a vacuum sensor 220 for providing an electrical signal responsive to the degree of vacuum drawn by the suction source on the apertures; the muffler 222 that provides an orifice for providing for a selected fluid leakage from the atmosphere to the suction source 210; and first and second flow control valves 224 and 226, respectively. Reference numerals 204 and 206 indicate where the apparatus, shown in FIG. 8, interconnects with the first and second manifolds 186 and 188, shown in FIG. 7. The controller 22B in FIG. 8 receives signals produced by the vacuum sensor 220 and is in electrical communication with the flow control valves 224 and 226 for controlling thereof. The controller 22B, shown in FIG. 8, can be the on-board controller 22A or an off-board controller.

With reference to FIG. 7, the zones can be further organized into groups. In the embodiment shown in FIGS. 7 and 8, the first group includes zones I and II and includes the apertures 176 in fluid communication with the manifold 186. The second group includes zones II, IV and V, and the apertures in fluid communication with the manifold 188. The first vacuum manifold 186 provides fluid communication between the suction source 210 and the first group of apertures (zones I and II), and the second manifold 188 provides fluid communication between the suction source 210 and the second group of apertures (zones III, IV and V).

The first vacuum manifold 186 includes a first flow restriction element 190A interposed between the suction source 210 and the apertures 176 of zone I, and a second fluid flow restriction element 190B interposed between the suction source and the apertures 176 of zone II. Similarly, the second vacuum manifold 188 can include fluid flow restriction elements 190C, 190D and 190E. The flow restriction element 190C is interposed between the suction source 210 and zone III, fluid flow restriction element 190D is interposed between the suction source and the apertures 176 of Zone IV, and fluid flow restriction element 190E is interposed between the fluid restriction element 190D and the apertures 176 of Zone V. The flow restriction elements 190 restrict the flow rates through the zones of apertures for providing selected differences in the degree of vacuum attained, and hence in the signals provided to the controller 22B by the vacuum sensor 220, when the apertures 176 of the different zones are unblocked.

In a preferred embodiment, the apparatus of FIGS. 7 and 8 operates as follows: the controller 22B energizes the suction source 210. Initially, the flow control valve 224 and the flow control valve 226 are "closed" and the vacuum sensor 220 provides a signal indicative of a high degree of vacuum. Next, the controller 22B opens the flow control valve 224 to apply suction to the first group of apertures, that is the apertures 176 of zones I and II. If the printing sheet 16 is only wide enough to cover zone I, leaving the apertures of zone II unblocked, the vacuum sensor 220 senses a difference in vacuum from that sensed when the switches were closed, the magnitude of the difference being responsive to the flow restriction element 190B. The difference in signal level indicates to the controller 22B that the apertures of one of the zones, typically zone II, are unblocked. If a difference in vacuum is sensed after the flow control valve 224 is opened, the controller typically does not proceed to open flow control valve 226, as the printing sheet extends from left to right in FIG. 7 and the apertures in zones III, IV and V are unblocked. Note that the flow restriction element 190A can be included in the manifold 186 for limiting the flow when the apertures of both zones I and II are unblocked, or for facilitating detection of which of the zones is unblocked, creating a first level, or degree, of vacuum when zone I is unblocked and zone II is blocked and different degree of vacuum for indicating that zone I is blocked and zone II is unblocked.

Alternatively, if the printing sheet 16 placed upon the work surface 14 blocks the apertures of both zones I and II, there is little or no change in the level of vacuum attained by the suction source 210 and hence sensed by the vacuum sensor 220, except perhaps for a transient response as the manifold 186 is initially evacuated. Thus no change in the signal produced by the vacuum sensor 220 indicates to the controller 22B that all of the apertures 176 of zones I and II are blocked, and that the printing sheet 16 is at least wide enough to cover zones I and II.

The controller 22B next opens the flow control valve 226 to apply suction to the second group of apertures, that is the apertures 176 of zones III, IV and V. Should the level of vacuum also change very little compared to that attained when both flow control valves 224 and 226 were closed, the printing sheet 16 is determined to extend past all of the zones. If the printing sheet is wide enough to cover zones I and II, but not all of zones III, IV and V, for example, if it is wide enough to only cover zones III and IV, upon opening flow control valve 226, the level of vacuum attained by the evacuation source and, hence, the signal responsive to that level of vacuum provided by the sensor 220 to the controller 22B, will be different than those levels and signals previously obtained. How different depends on how many of zones III, IV and V are unblocked. The flow restriction elements 190C and 190D and 190E are interposed in the manifold 188 such that different vacuum levels will be attained by the evacuation source responsive to the number of zones containing unblocked apertures. For example, if the flow restriction elements were not included, uncovering any one of the zones may be sufficient to significantly reduce the vacuum attained by the evacuation source 210 to the same nominal level. Restricting the flow through the zones of apertures ensures that the vacuum decreases as zones are unblocked in discrete steps and signals can be provided, by the vacuum sensor 220 to the controller 22B, that are responsive to the number of zones are unblocked.

The number of zones and groups described above are merely exemplary and the invention can be practiced with other numbers of zones and groups, as is understood by one of ordinary skill in the art, in the light of the disclosure herein. Typically, suction is successively applied to the groups of apertures until it is determined that one of the groups includes unblocked apertures or until all of the groups have had suction applied thereto, that is, until no groups remain. The five (5) zones shown in FIG. 7 correspond to the five (5) widths of printing sheets 16 that are commonly expected to be used with the wide format printer 10 of the invention. Grouping of the zones into first and second groups reduces the number of separate signal levels that are to be sorted by the controller 22B for a given total number of zones. In practice, the flow restriction elements 190 can be realized by judicious choice of the hardware used to construct the manifolds 186 and 188. For example, it has been found that elbows typically used for interconnecting sections of tubing can be selected to function as the flow restriction elements 190. According to the invention, the flow restriction elements can be selected for both ensuring separate signal levels for identifying the zones having unblocked apertures, and also for ensuring that those apertures within a group and which are blocked provide adequate suction for securing the printing sheet to the workbed even when the other apertures of the group are unblocked.

However, as understood by one of ordinary skill in the art, apprised of the disclosure herein, the vacuum apparatus and method described above is not limited to use with printers, but can be of advantage in many other instances as well. For example, in the garment industry, sheet materials, such as layups of cloth, are often cut into selected shapes on a table that mounts a numerically controlled cutting implement. The sheet material is often secured to the table via the application of suction to apertures in the surface of the table, and knowledge of the width of the sheet material and constraining the travel of the cutter is also of importance, for reasons similar to those discussed above. This is but one example of an additional environment where the present invention can be useful. In general, the invention is deemed useful in many environments where a workbed includes a worksurface for supporting a sheet material on which work operations are to be performed, such as by translatable workhead mounting a pen, cutter or printhead or other work implement.

Figure 9A:
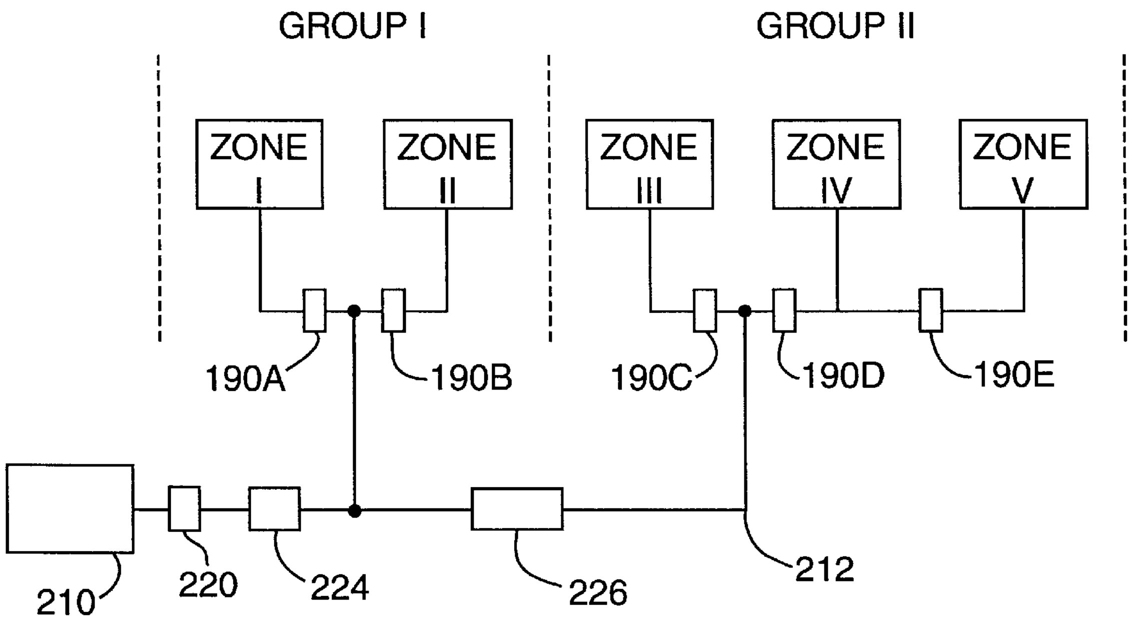
FIGS. 9A and 9B schematically illustrate alternative embodiments of the apparatus illustrated in FIGS. 7 and 8.
Figure 9B:
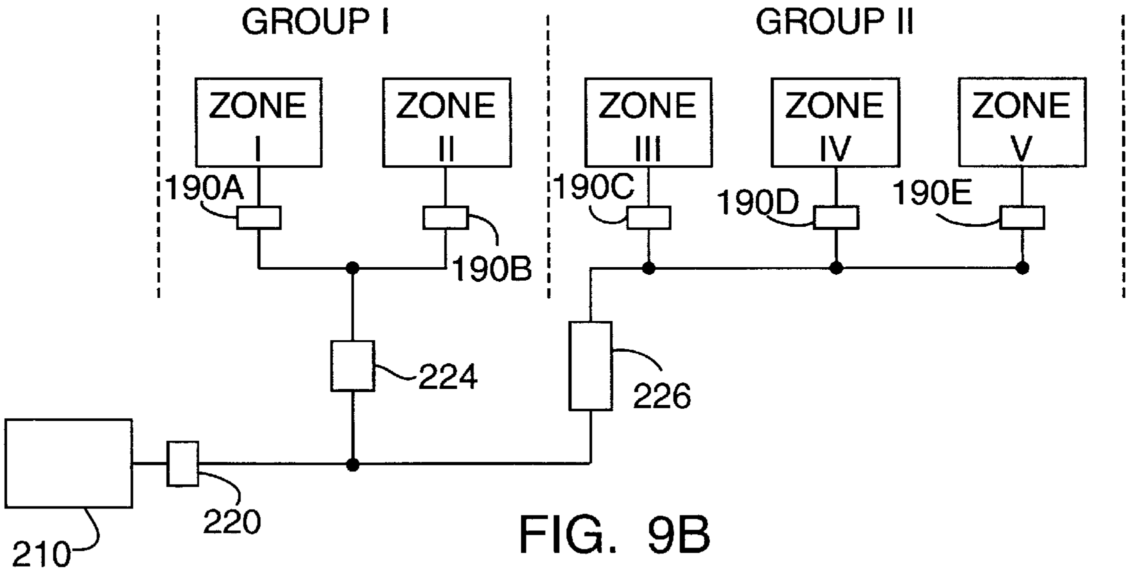

FIGS. 9A and 9B illustrate two embodiments of the invention. FIG. 9A corresponds to the arrangement of hardware shown in FIGS. 7 and 8, whereas FIG. 9B illustrates an alternative embodiment. Note that in FIG. 9B the zones and groups are arranged more in "parallel" with respect to the suction source 210 than the arrangement depicted in FIG. 9A.

Briefly returning to FIG. 7, as is known in the art of thermal printing, the workbed 13 typically includes a platen for supporting the printing sheet material 16 as it is printed upon by the thermal printhead 24. For example, reference numeral 275 in FIG. 7 indicates the area of the workbed 13 typically occupied by the platen, which can be a rectangular, hard, antistatic rubber material that is fitted to the workbed 13 so as to extend along the print 35 (Y) axis. The upper surface 276 of the platen is typically substantially flush with the rest of the worksurface 14, and includes those vacuum apertures shown as within the area 275 of FIG. 7.

Donor Sheet Assembly

Figure 10A:
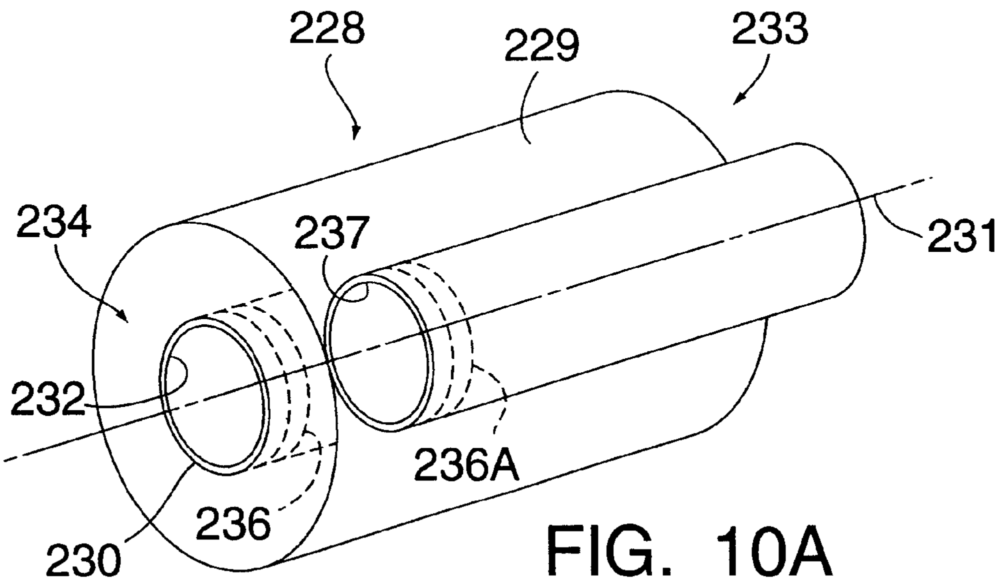
FIG. 10A illustrates a donor sheet assembly for loading into the donor sheet cassette shown in FIG. 3.

FIG. 10A illustrates a donor sheet assembly 228 for loading into the donor sheet cassette 32. The donor sheet assembly 228 includes a length of donor sheet 229 wound about a supply core having a tubular body 230. The supply core 230 extends along a longitudinal axis 231 from a base end 233 to a drive end 234 and has a central opening 232 therethrough. Reference numeral 236 generally indicates drive elements and a memory element located substantially at the drive end of the supply core body 230. The drive elements and memory element are both described in more detail below.

Figure 10B:
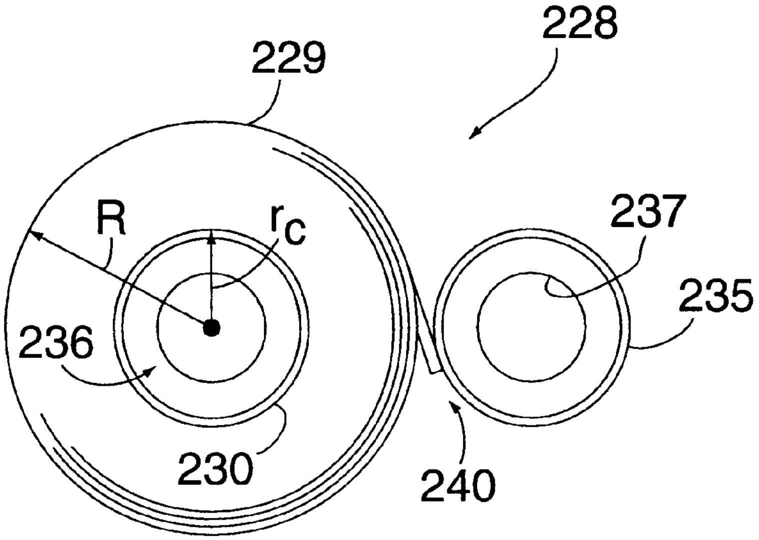
FIG. 10B illustrates a front view of the donor sheet assembly of FIG. 10A.

The donor sheet assembly 228 can also include a take-up core having a tubular body 235 having a central opening 232 therethrough. As shown in FIG. 10A, the take-up core body 235 can be packaged with the length of donor sheet 229 wound about the supply core body 230. FIG. 10B illustrates a front view of the donor sheet assembly 228 of FIG. 10A. Reference numeral 240 indicates that a free-end of the length of donor sheet 229 can be attached to the take-up core tubular body 235 for facilitating insertion of the assembly 228 into, and use of the assembly 228 with, the donor sheet cassette 32. The donor sheet assembly 228 can be wrapped in cellophane or some other appropriate packaging material to protect the length of donor sheet 229 and to hold the assembly 228 together. The take-up core body 235 also includes drive elements disposed at one end thereof, as indicated generally by the dotted lines 236A. Typically, the take-up core body 235 does not include a memory element disposed therewith.

Figure 11C:
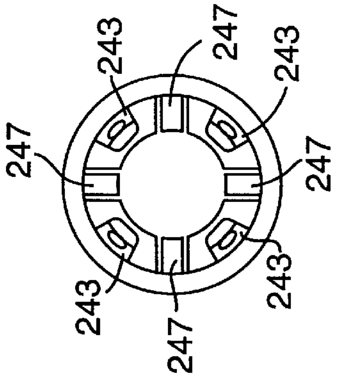
FIG. 11C is an end view of the supply core tubular body of FIG. 11A, taken along line C—C in FIG. 11A.
Figure 11D:
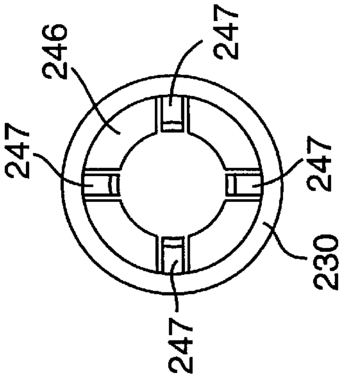
FIG. 11D is an end view of the supply core tubular body of FIG. 11A, taken along the line D—D in FIG. 11A.
Figure 11A:
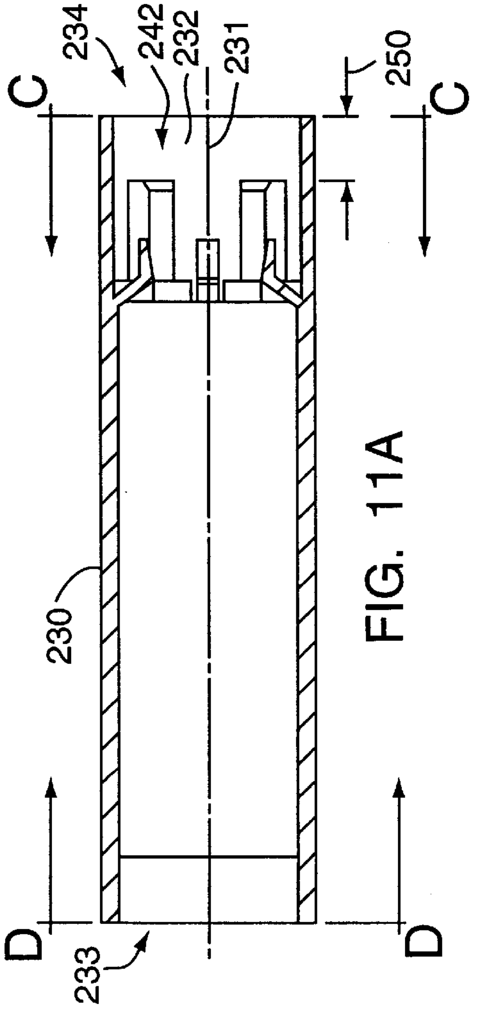
FIG. 11A illustrates the supply core tubular body of the donor sheet assembly of FIGS. 10A and 10B.
Figure 11B:
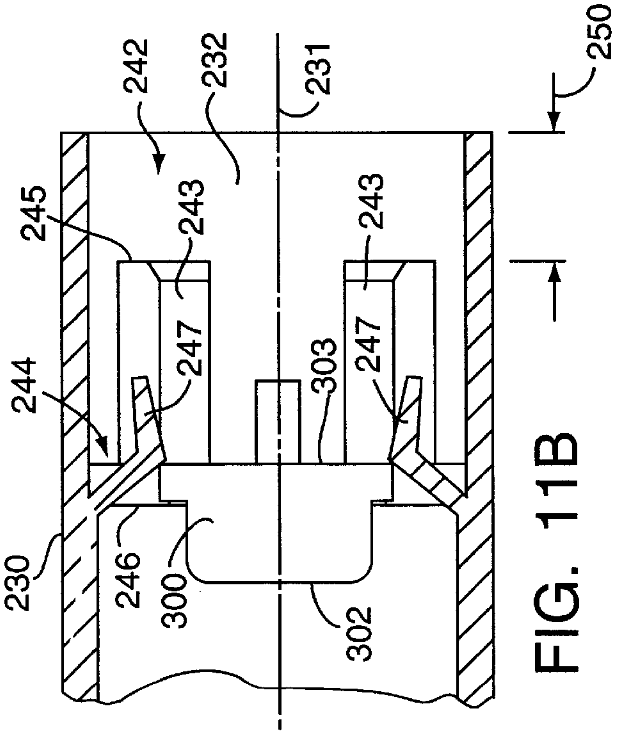
FIG. 11B is an enlarged view of the drive end of the supply core tubular body shown in FIG. 11A.

FIGS. 11A through 11D illustrate additional details of the supply core body 230. As shown in FIG. 11A, supply core tubular body includes drive elements 242 located within the central opening 232 and substantially at the drive end 234 of the supply core body 230, and that generally extend along and radially of the longitudinal axis 231. As shown in additional detail in FIG. 11B, which is an enlarged view of the drive end 234 of the supply core body 230 shown in FIG. 11A, the drive elements can include drive teeth 243 that extend from a base end 244 to a front end 245. The base end 244 is adjacent an annular support 246. Retaining elements 247, which can be spring fingers integral with the supply core body 230, hold the memory element 300 in place against the annular support 246, inboard of the drive elements 242. The memory element 300 includes a data transfer face 302 facing the base end 233 of the supply core body 230 and a back face 303 facing the drive end 234 of the supply core body 230. The data transfer face 302 is substantially perpendicular to the longitudinal axis 231.

FIGS. 11C and 11D show end views of the supply core body 230 taken along section lines C—C and D—D, respectively of FIG. 11A. Note that the drive elements 242 are recessed from the drive end 234 of the supply core body 230, as indicated by reference numeral 250 in FIG. 11B. The take-up core body 235 also includes drive elements substantially similar to those shown with the supply core body 230.

Figure 12:
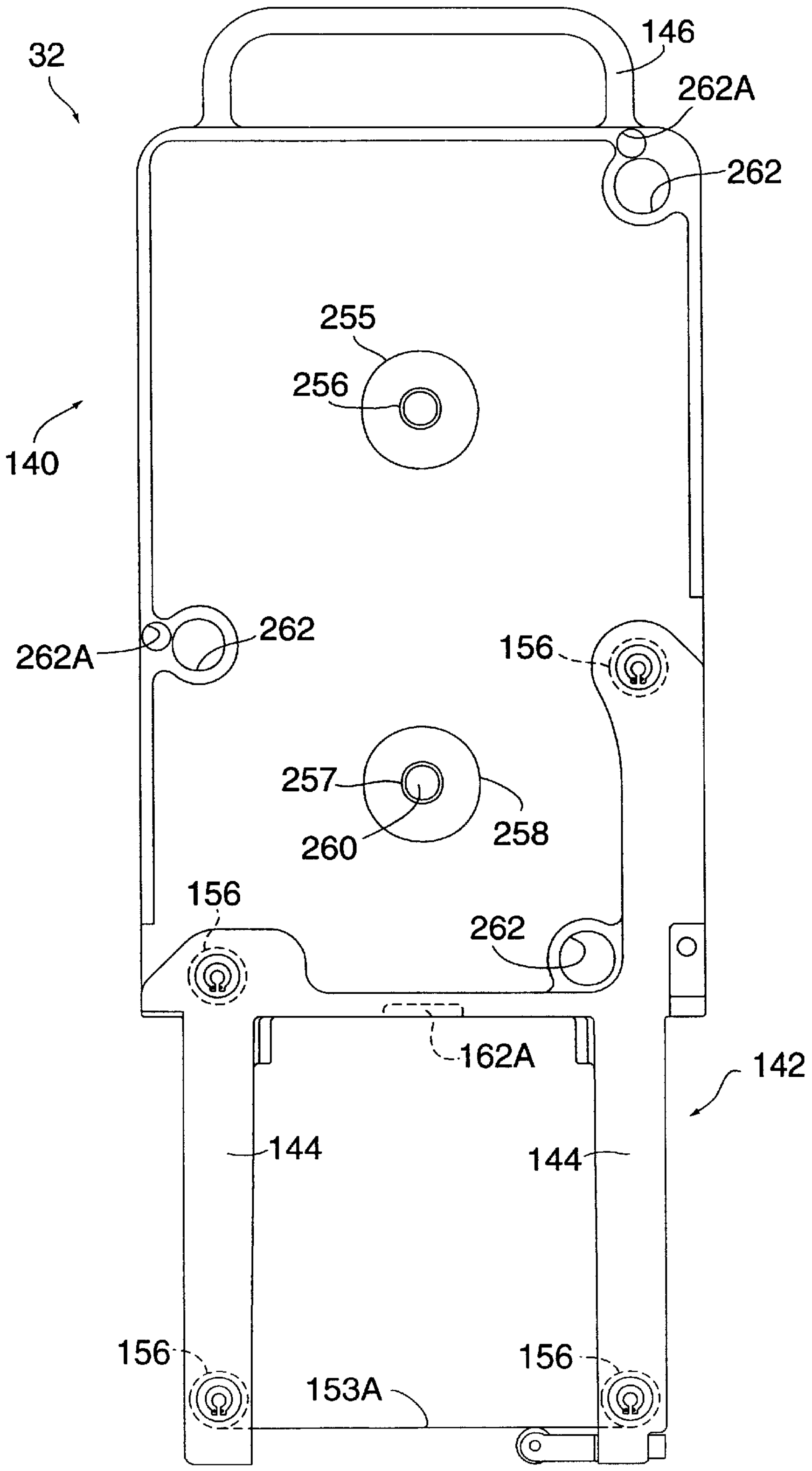
FIG. 12 is a front view of the donor sheet cassette of FIG. 3 with the cover removed.

FIGS. 12, 13A, 13B and 14 show additional details of the donor sheet cassette 32. FIG. 12 is a front view of a donor sheet cassette 32 with the cover 148 removed. Shown are the upper portion 140 of the donor sheet cassette 32 and the lower portion 142. The take-up inner shaft 256 rotationally mounts a take-up shaft 255 for mounting the take-up core body 235 for having spent donor sheet wound thereon, as indicated by reference numeral 150 shown in FIG. 3. The take-up shaft 255 fits through the central opening 232 of the take-up core 235. An inner supply shaft 257 rotationally mounts a supply shaft 258 for receiving the supply core body 230. FIG. 3 as discussed above, illustrates how the donor sheet is threaded between the supply core body 230 and the take-up core body 235. The inner supply shaft 257 also mounts at the front thereof a data transfer element 304, described in more detail in FIG. 14, for transferring data between the controller(s) 22 and the memory element 300 associated with the donor sheet. Note the slot 162A for receiving the translatable engaging element 114 that is mounted by the toothed drive belt 116 of the cassette transport apparatus 112. (See FIG. 2). The donor sheet cassette 32 includes threaded holes 262 for receiving screws, for holding the cover 148 to the donor sheet cassette 32, and guide holes for receiving the guide pins 268, shown in FIGS. 13A and 13B of the cover 148.

Figure 13B:
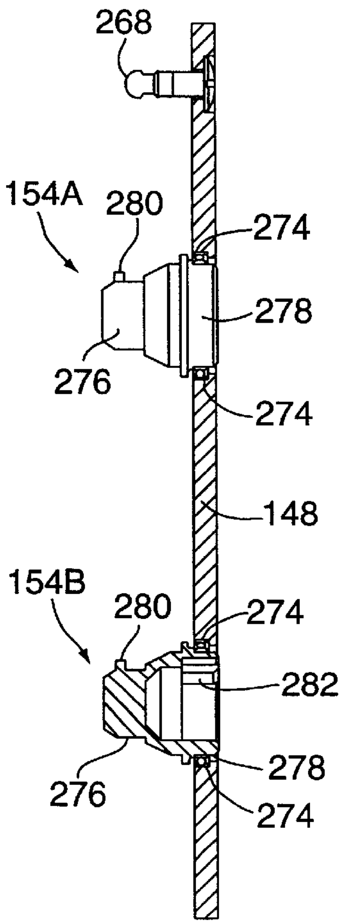
FIGS. 13A and 13B show front and side views, respectively, of the donor sheet cassette cover of the donor sheet cassette of FIG. 12.
Figure 13A:
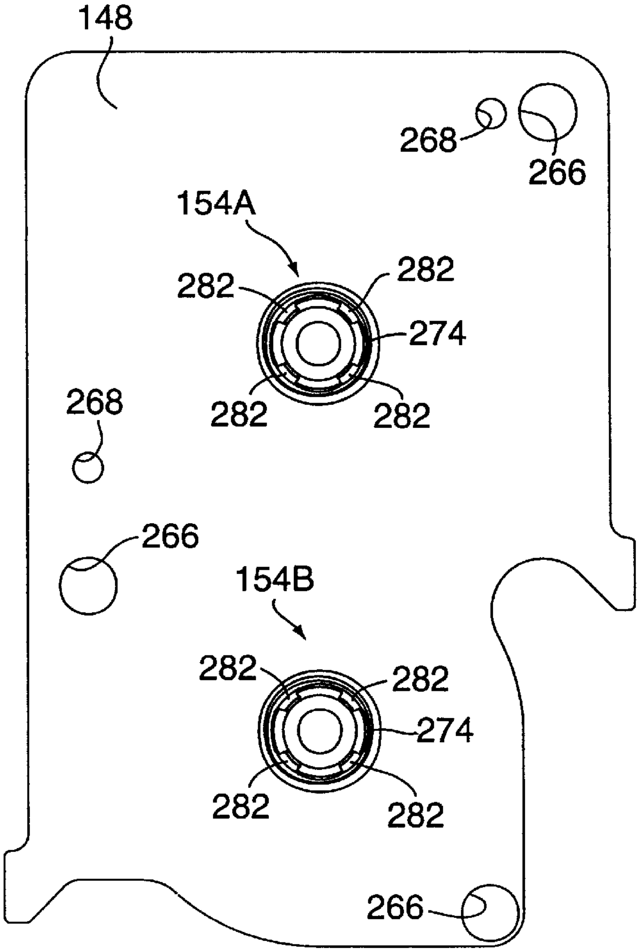

FIGS. 13A and 13B show front and side views of the donor sheet cassette cover 148. The cover 148 includes bearings 274 that mount a take-up torque transmission element 154A and a supply torque transmission element 154B, each having male and female ends, 276 and 278, respectively. The supply torque transmission element 154B, which is substantially identical to the take-up roll torque transmission element 154A, is shown in cross-section. The male ends 276 includes an external drive element(s) 280 and the female ends 278 include internal drive elements 282. The torque transmission elements 154 couple the drive elements of core bodies 230 and 235 to the shaft drive elements 102 and 108 of the cassette receiving station 96. The cover also includes through holes 266 through which the mounting screws past for securing the cover 148 to the donor sheet cassette 32. Also included are the guide pins 268 which are received by the apertures 262A, shown in FIG. 12.

Figure 14:
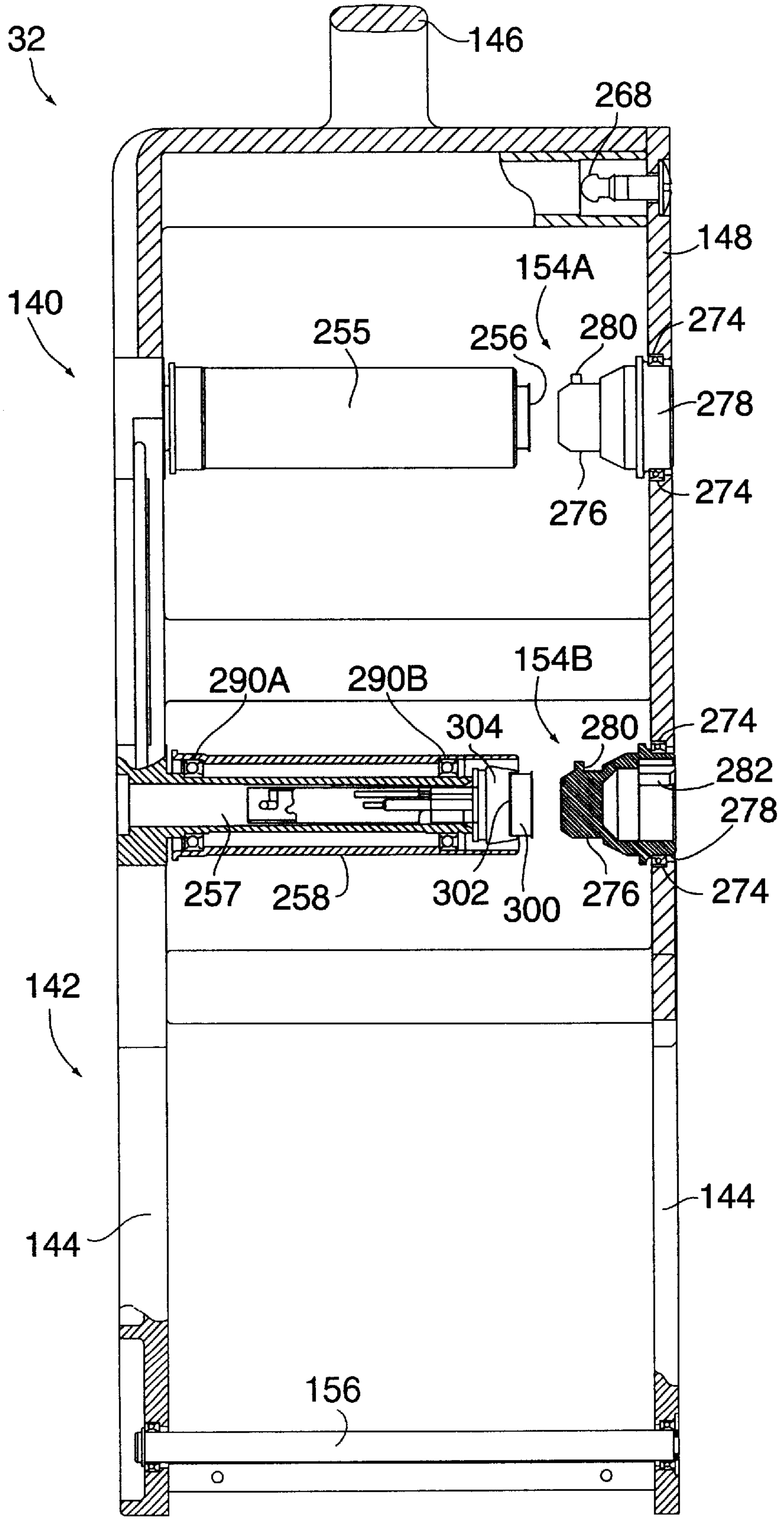
FIG. 14 illustrates the donor sheet cassette cover of FIG. 13A and 13B mounted to the donor sheet cassette of FIG. 12.

FIG. 14 illustrates the donor sheet cassette cover 148 mounted to the donor sheet cassette 32. The supply shaft 258 is shown cut-away. The rear shaft bearings 290A and front shaft bearings 290B rotationally mount the supply shaft 258 to the inner supply shaft 257, and the take-up shaft 255 is similarly mounted to the take-up inner shaft 256. The core tubular bodies 230 and 235 and length of donor sheet wound thereon and therebetween are omitted from FIG. 14 for simplicity; however, the memory element 300 is included and is shown mating with the data transfer element 304 of the supply shaft 258. Communication elements(not shown) at the back of the donor sheet cassette 32 communicate data to and from the memory element 300 via the data transfer element 304. The communication elements communicate with the storage trays 134 via conducting tabs located on the donor sheet cassette body for transferring data to and from the memory elements 300 and the controller(s) 22.

The methods and apparatus of the present invention are intended to increase the economy and efficiency of existing thermal printers, in part by reducing the amount of donor sheet required to print a given multicolor graphic product on the printing sheet 16. The refillable donor sheet cassette 32 receives the donor sheet assembly 228 that can include relatively long lengths of donor sheet wound about the supply core body 230. This helps to realize the economic benefit of obtaining the donor sheet in bulk, and for allowing for the completion of more print jobs between reloading the donor sheet cassette. Typically, the donor sheet assembly 228 will include a length of donor sheet 229 that can be up to or greater than 500 meters. Use of a refillable donor sheet cassette 32 also avoids the cost or waste and recycling problems associated with the use of plastic disposable cassettes. When refilling the donor sheet cassette 32, the cover 148 is removed and the used supply and take-up core bodies removed, and a new donor sheet assembly 228 inserted into the cassette. Preferably, the spent donor sheet, now wound about the take-up core body 235, and the used supply core body 230 are recycled, and in particular, the used supply core body 230 can be returned for reading of data written on the memory element 300 by the wide format thermal printer 10. The used supply core body can have a fresh length of donor sheet 229 wound thereon and the new data written to the memory element 300. The reading and writing of data to and from the memory element 300 is now described in more detail.

Typically, the wide format printer 10 prints a color plane of the multicolor graphic product responsive to the data read from the memory element 300 mounted with the donor sheet assembly 228 to be used in printing that color plane. Many types of information can be stored on the memory element 300. Typically included is data characteristic of the donor sheet. For example, as there are a variety of colors of donor sheet, including spot and process colors, and as there are known to be at least sixty (60) different types of donor sheets, it is typically important that the wide format thermal printer 10 be aware of the color and type of donor sheet being used such that printing parameters, such as the energization of the thermal printing elements 26 or the pressure with which the thermal printhead 24 presses the donor sheet against the printing sheet 16, can be adjusted accordingly. The stored information, therefore, can include data representative of at least the color and type of the donor sheet, including, for example, information relating to the type of finish on the donor sheet, whether the donor sheet is resin based or wax based, and the class of the ink donor material on the donor sheet.

Other data characteristic of the donor sheet stored on the memory element 300 can include the average color spectra reading, such as the LAB value, for the length of donor sheet 229. Typically, a particular manufactured lot of donor sheet is tested to determine this color spectra value, and all memory elements 300 included in donor sheet assemblies 228 that include a length 229 from that lot store substantially identical color spectra information. The color spectra reading is used in the printing process, either by the wide format thermal printer 10 or in preprocessing of data representative of the multicolor graphic image, to account appropriately for variations in the manufacturing processes that result in different color spectra values. For example, the RIP (raster image processing) computations can be varied in accordance with different color spectra data. Furthermore, the wide formal thermal printer 10 can vary the voltage applied for energizing the array of thermal printing elements 26 responsive to variations in the value of the color spectra value read from the memory element 300.

The memory element 300 can also include data representative of information pertaining to the specific opacity/transparency value for the length of donor sheet 229 included in the donor sheet assembly 228. The wide format thermal printer 10 can use this information to adjust how the donor sheet is printed to maximize performance and color.

Data representative of the “firing deltas” to be used in energizing the array of thermal printing elements 26 to optimally print with a particular length of donor sheet 229 can also be stored on the memory element 300. The term “firing deltas” refers to variations in printing parameters for improving printing with a particular donor sheet. For example, the firing deltas can include data for varying the voltage and/or power applied to thermal printing elements, the time that the thermal printing elements are energized, and the pressure with which thermal printhead presses the donor sheet against the printing sheet.

Data representative of the length of the length of donor sheet 229 originally wound during the donor sheet assembly 228 can also be stored in the memory element 300. Typically, the length is stored in centimeters. This length is used to track the remaining length of unused donor sheet wound on the core tube 230. As the wide format thermal printer 10 prints a color plane, the donor sheet is interposed between the printhead and the printing sheet 16 and the thermal printhead 24 is translated along the print axis, drawing the donor sheet past the printhead 24. From this process, the wide format printer can track the length of donor sheet drawn past the thermal printhead 24, and hence can determine the length remaining on the supply core body 230.

The memory element 300 can also include data representative of the supply side roll diameter, that is, the diameter of the length of donor sheet 229 originally wound on the supply core body 230. This diameter is not uniquely determined by the length of donor sheet 229. The diameter can vary significantly with the color of the donor sheet and other characteristics of the donor sheet. The diameter should be accurately tracked and recorded when the length of donor sheet is wound on the core 230 and this information is used by the wide format thermal printer 10 to accurately estimate and control the tension applied to the donor sheet while printing, as described below.

The memory element 300 can include a "read only" portion for storing data representative of the manufacturer of the donor assembly 228 of the donor sheet. Such data can be stored on the memory element by the manufacturer of the memory element 300, and can be read by the wide formal thermal printer 10 upon loading of the donor sheet assembly 228 into a donor sheet cassette 32 that is mounted on the cassette storage rack 55. An operator of the wide format thermal printer 10 can be informed when a donor sheet assembly 228 that is not warranted or whose quality cannot be guaranteed is to be used on the wide format thermal printer 10.

The memory element 300 can also store data representative of a lot code assigned to each manufacturing run of donor sheet produced by the manufacturer. This lot code will allow any performance problems reported by customers to be tracked back to an original lot. If problems are being reported with the donor sheet of a particular lot, the remaining unused donor sheet of that lot may be removed from service to avoid future problems.

The memory element 300 can also include information representative of a "born-on date" of the length of donor sheet 229. This information is the actual date of the manufacture of the donor sheet assembly 228, that is, the date that the length of donor sheet 229 was wound onto the supply core body 230. This "born-on date" can be significantly different than other dates of importance, such as, a "lot code" date typically included with the lot code information described above. For example, it can be beneficial to energize the thermal printing elements differently when printing with older donor sheet lengths 229, and whether the donor sheet has aged before or after being wound on the supply core body 230 can be of importance. The "born on" date can be checked to see if a selected shelf life of the donor toil assembly 228 has been exceeded.

Figure 15A:
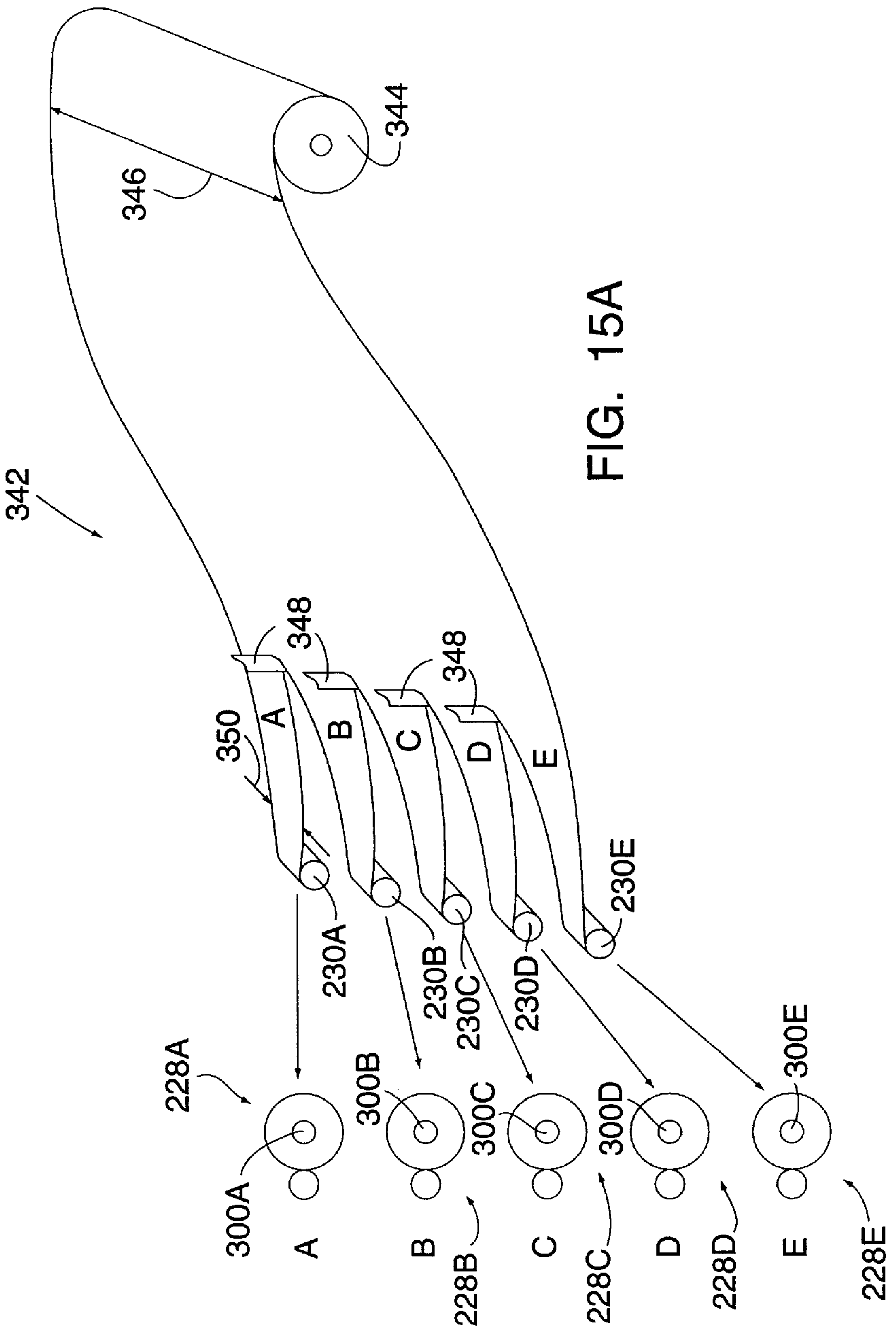
FIG. 15A illustrates method and apparatus for more economically providing donor sheet to the wide format thermal printer of FIG. 1 and for reducing the cost of printing a given multicolor graphic product.

FIG. 15A illustrates one method for more economically providing donor sheet to the wide format thermal printer 10 and for reducing the cost of printing a given multicolor graphic product on the printing sheet 16. A donor sheet assembly 228 can be prepared from a master roll 344 that is sliced by cutters 348 into number of "slices" A, B, C, D, and E that are then wound onto the five individual core bodies 230A through 230E. The master roll 334 includes a length of donor sheet having a width (W), as indicated by reference numeral 346. The individual slices of donor sheet have a width 350 that is smaller than the width 346 of the master roll 344. In the example shown in FIG. 15A, the width 350 is approximately one-fifth (⅕) of the width of the donor sheet 346 on the master roll 344. Although four (4) cutters 348 are shown in FIG. 15A, typically two (2) additional cutters are positioned at the edges of the donor sheet and trim off a scrap width of the donor sheet material. The core bodies 230A–E are then incorporated into donor sheet assemblies 228. According to the invention, data representative of the "slice position" is stored on the memory element 300 to account for variations of properties across the width 346 of the donor sheet. For example, the stored information can indicate whether the length of donor sheet 229 is from slice position "A", "B", "C", "D" or "E". This information can also allow any problems reported with donor sheet assemblies 228 to be tracked to the manufacturing process and can allow better monitoring of that process for improvement thereof.

The above are examples of data characteristic of the donor sheet. One of ordinary skill in the art, in light of-the disclosure herein, can envision other data characteristic of the donor sheet and that can be advantageously stored on the memory element 300. Additional examples are given below.

Other information that can be stored on the memory element 300 can include a revision code. The revision code will inform software running on the controller(s) 22 how many data fields are present in the memory element 300 and the format of the data fields. This revision code is updated each time a change is made to the amount or type of data that is being stored on memory elements 300 provided with donor sheet assemblies 228. Many revisions are likely be made over time and it is appropriate that the controller(s) 22 understands what data is actually on a particular memory element 300.

Data can be stored on the memory element 300 before or after mounting the memory element with the supply core body 230. When recycling previously used supply core tubular bodies, the memory elements 300 are likely not removed from the core bodies, and new data can be written to the memory element 300 by inserting a probe having a data transfer element into the central opening of the supply core body 230 at the base end 233 thereof such that the probe data transfer element contacts the data transfer face 302 of the memory element 300.

Typically, the data described above is stored on the memory element 300 between the time of manufacture of the donor sheet assembly 228 and the first use of the donor sheet assembly 228 with a wide format thermal printer 10. However, the invention also provides for the wide format thermal printer 10 to write to the memory element 300 before, during or after printing a multicolor graphic product.

As described above, the amount of donor sheet used when printing can be tracked by the wide format thermal printer 10 (i.e., by the controller(s) 22). Accordingly, after a particular color plane has been printed, or after it is determined that the wide format thermal printer is through printing with that particular donor sheet cassette 32, the wide formal thermal printer 10 can write data representative of the amount of donor sheet remaining on the supply core body 230 to the memory element 300. The remaining length of information can be important for planning jobs so that the wide format thermal printer 10, before loading a particular donor sheet cassette to the cassette receiving station 96, can ensure that it will not run out of donor sheet while printing a print swath. Running out of donor sheet during printing a print swath usually destroys the multicolor graphic product. Furthermore, the color fidelity of the donor sheet can vary from lot to lot, and it is a good idea for the wide format printer 10 to be able to predict when there is not enough donor sheet in the donor sheet cassette 32 to complete a particular print job. A warning can be provided to an operator of the wide format thermal printer 10, such as via a display associated with the controller 22. The remaining length information is also typically stored in centimeters. It is initially set by the manufacturer of the donor sheet assembly 228 to match the manufactured length information, and decremented by the wide format thermal printer 10 as donor sheet is consumed.

The wide format thermal printer 10 can also write other information to the memory element 300. This information can include, for example, the following: (1) the number of donor sheet-out/snaps. (This information is used to track the number of times that use of a particular donor sheet assembly results in an unexpected out-of-donor-sheet condition); (2) the number of times the donor sheet assembly 228 is used for printing. (Preferably, this information reflects the number of times donor sheet cassette 32 including the donor sheet assembly 228 is picked-up and used actively for printing during a job. If a donor sheet is not used, but is mounted in one of the several donor sheet cassette storage locations on the cassette storage rack 55, the information is not changed. Furthermore, the length used to-date, that is, the original length of donor sheet minus the length remaining, divided by the number of times used, yields information representative of the average size of the print jobs being printed by the wide format thermal printer 10); (3) the date of the first use of the donor sheet assembly 228 for printing; and (4) the date of last use. This latter date is updated each time the donor sheet assembly 228 is used for printing.

Data representative of information related to the usage of the wide format thermal printer 10 on which the donor sheet assembly 228 is mounted and of the usage of the donor sheet assembly 228 can also be written on the memory element 300. This information can include: (1) the number of different wide format thermal printers 10 on which the donor sheet assembly has been used; (2) the serial number of the wide format thermal printers 10 with which the donor sheet assembly 228 has been used; (3) the total number of hours on the printhead 24 that was last used to print with the donor sheet assembly 228; (4) the total travel distance accumulated along the printing sheet translation (X) axis of the wide format thermal printer 10 used to print with the donor sheet assembly 228; (5) the total distance that a wide format thermal printer 10 has translated all printheads 24 installed in the wide format printer 10, as well as the total distance that the particular thermal printhead 24 now installed has been translated; (6) the average steering correction used by the wide format thermal printer when translating the printing sheet 16 in one direction along the printing sheet translation axis; and (7) the average steering correction used when translating the printing sheet 16 in the opposite direction along the printing sheet translation (X) axis. Steering correction refers to maintaining alignment of the printing sheet 16 relative to the worksurface 14 during printing of the multicolor graphic product, and is elaborated upon below.

Much of the data described above can be very useful in tracking the performance of the wide format thermal printers and donor sheet assemblies for diagnosis of problems, for improving the printers and the donor sheet assemblies, for determining when warranty claims are valid, and for limiting the extent of any problems that should occur.

Figure 15B:
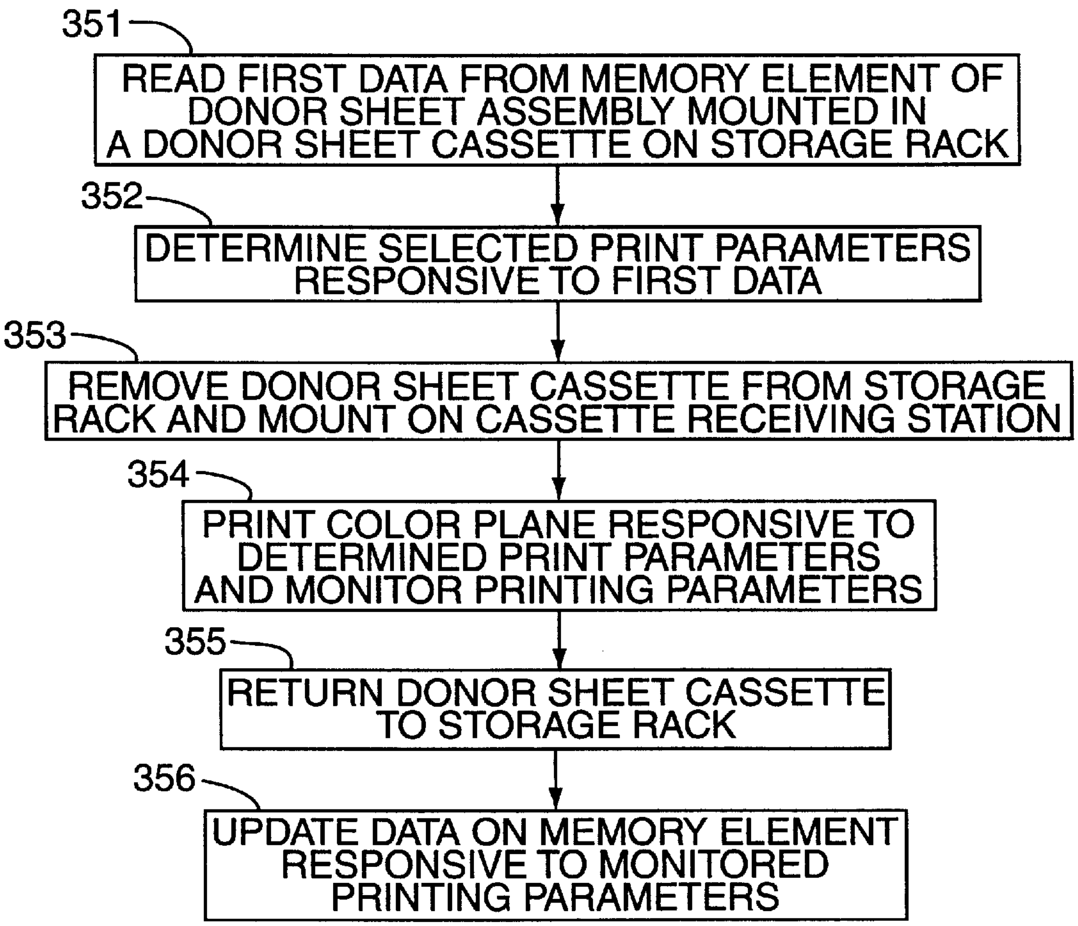
FIG. 15B is a flow chart illustrating one sequence for reading data from and writing data to the memory element mounted with core tubular body of FIG. 11.

FIG. 15B is a flow chart illustrating one sequence that can be followed in reading of data from, and writing of data to, the memory element 300. In Block 351, data is read from the memory element 300 mounted with a supply core body 230 that is mounted within a donor sheet cassette 32 on the cassette storage rack 55. In block 352, selected printing parameters, such as the desired tension to be applied to the donor sheet, or the proper energization of the array of thermal printing elements 26, are determined as a function of the data read from the memory element 300. Next, as indicated by block 353, the donor sheet cassette 32 is removed from the cassette storage rack 55 and mounted on the cassette receiving station 96, and as indicated by block 354, the color plane corresponding to the donor sheet in the donor sheet cassette is printed on the printing sheet 16. During printing, selected printing parameters, such as the distance traveled along the print (Y) axis by the thermal printhead 24 while pressing donor sheet against the printing sheet material 16, are monitored. Proceeding to block 355, the donor sheet cassette 32 is returned to the cassette storage rack 55. As indicated by block 356, the selected data on the memory element 300 is updated responsive to the monitored printing parameters. For example, the data field corresponding to the length of donor sheet remaining on the supply core body 230 can updated ( e.g., decremented) to account for the length of donor sheet consumed in block 354. The length of donor sheet consumed can be determined from the printing parameter monitored above, that is, from the distance traveled by the thermal printhead 24 while pressing the donor sheet against the printing sheet material. The steps shown in FIG. 15B are typically all accomplished via the controller(s) 22, and are repeated for each of the color planes of the multicolor graphic product printed on the printing sheet 16 by the wide format thermal printer 10.

Printing Sheet Alignment and Tracking

Figure 16A:
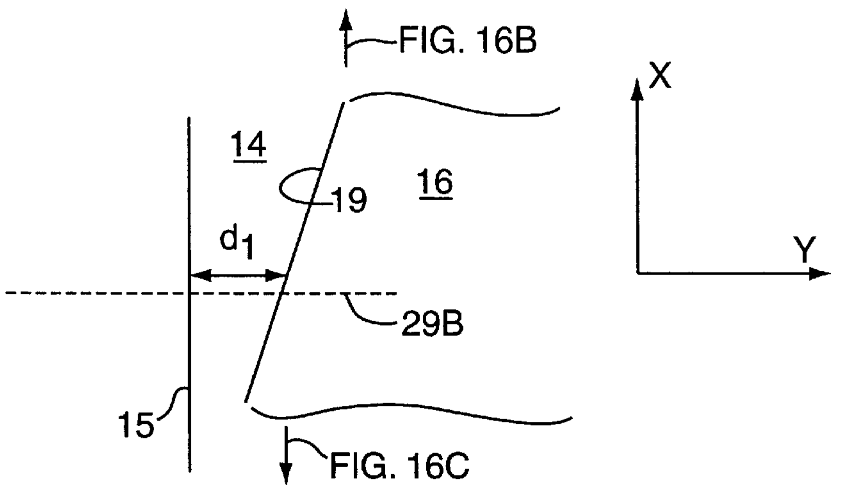
FIG. 16A illustrates the edge of the printing sheet when the printing sheet is skewed relative to the printing sheet translation (X) axis of the wide format thermal printer of FIG. 1.
Figure 16B:
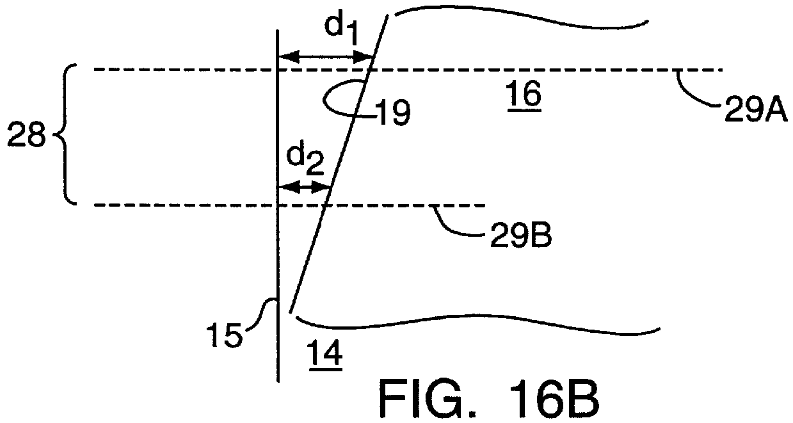
FIG. 16B illustrates the effect of translating the skewed printing sheet of FIG. 16A in one direction along the printing sheet translation (X) axis.
Figure 16C:
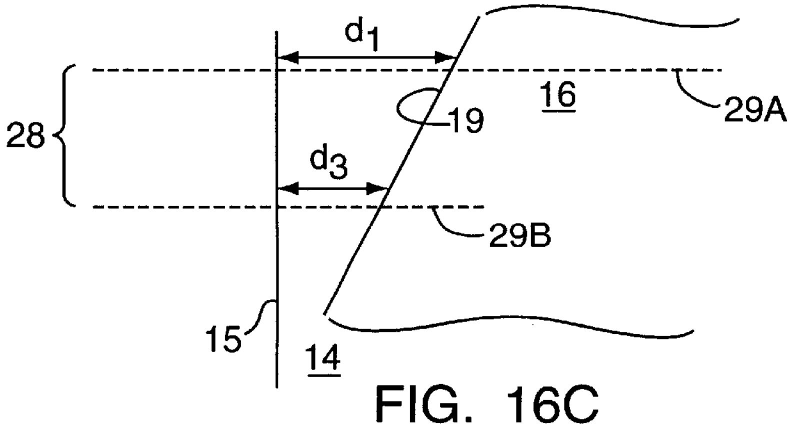
FIG. 16C illustrates the effect of translating the skewed printing sheet of FIG. 16A in the opposite direction along the printing sheet translation (X) axis.

With brief reference to FIG. 1, note that the edge 19 of the printing sheet 16 is illustrated as substantially parallel to the printing sheet translation (x) axis. As understood by those of ordinary skill, such substantial parallelism is desirable so as to avoid “skew” errors in the multicolor graphic product, such as adjacent print swaths not aligning properly. FIGS. 16A–16C illustrate the edge 19 of the printing sheet 16 when skewed relative to the printing sheet translation (X) axis. The skewing is exaggerated for purposes of illustration. In FIG. 16A, the edge 19 of the printing sheet 16 disposed at an angle to the edge 15 of the work surface 14 such that along the dotted line 29B, representing the lower edge of a print swath 28, the edges 15 and 19 are separated by a distance d1. (For purposes of illustration the edge 15 is taken as parallel to the printing sheet translation (X) axis.) As shown in FIG. 16B, as the printing sheet 16 is translated along the printing sheet translation axis (X) towards the top of the page on which FIG. 16A is illustrated, the distance between the edge 19 of the printing sheet 16 and the edge 15 of the working surface 14 along the dotted line 29B has decreased to d2, whereas, along the dotted line 29A, indicating the other boundary of the printing swath 28, the distance between the edge 19 and the edge 15 is now d1.

Alternatively, FIG. 16C illustrates the change in the distances between the edges 19 and 15 as the printing sheet 16 is translated starting from the position shown in FIG. 16A in the opposite direction along the printing sheet translation (X) axis, or towards the bottom of the page on which FIG. 16A is shown. Along the dotted line 29B, the distance between the edges has now increased to d3 and along the dotted line 29A, indicating the upper edge of the print swath 28, the distance between the edges 15 and 19 has increased to d4.

As illustrated by FIGS. 16A–C, when the printing sheet is skewed, the position of the edge 19 as measured along the print (Y), varies as the printing sheet is translated along the printing sheet translation (X) axis. One of ordinary skill is well aware of the problems such skew can cause with the printing of multicolor graphic product on the printing sheet 16. As the printing sheet 16 is driven along the printing sheet translation (X) axis, the error becomes cumulative in the print (Y) axis and produces an increasing lateral position error as the printing sheet 16 moves along the printing translation (X) direction. The error can quickly become large enough to cause printing off of the edge of the printing sheet 16. Accordingly, skew error is highly undesirable and can result in the multicolor graphic image being destroyed or in damage to the thermal printhead 24. In a wide-format thermal printer 10, which is intended to print large printing sheets, for example, 36' wide along the (Y) axis by 40' long in the (X) axis, skew error can be a problem of great concern.

According to the invention, the change in the print (Y) axis position of the edge of the printing sheet 16 as the printing sheet is translated back-and-forth along the printing sheet translation (X) axis can be used advantageously to correct the skew of the printing sheet 16.

Figure 17A:
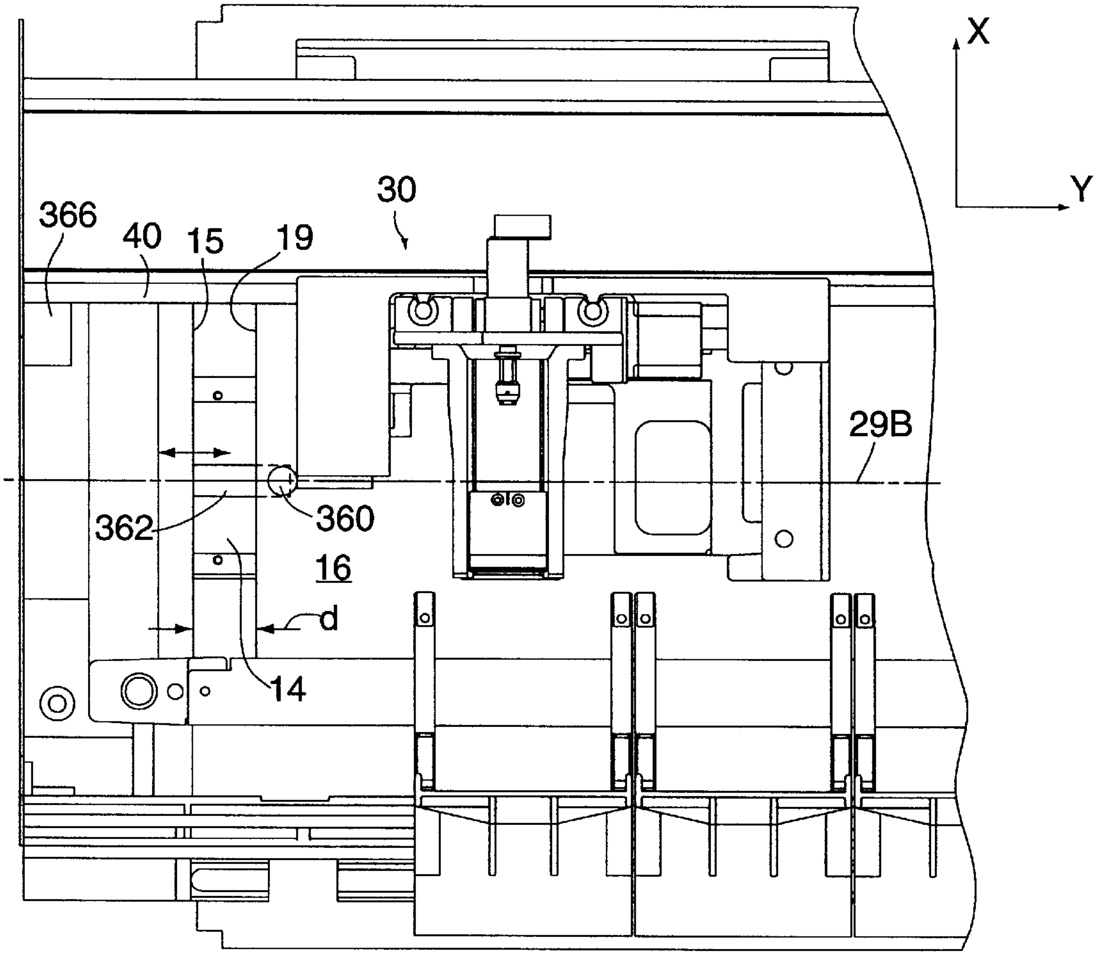
FIGS. 17A and 17B show top and elevational views, respectively, of selected components of the wide format thermal printer of FIG. 1, and illustrate an edge sensor and a reflective strip for detecting the location of the edge of the printing sheet shown in FIGS. 16A–16C.
Figure 17B:
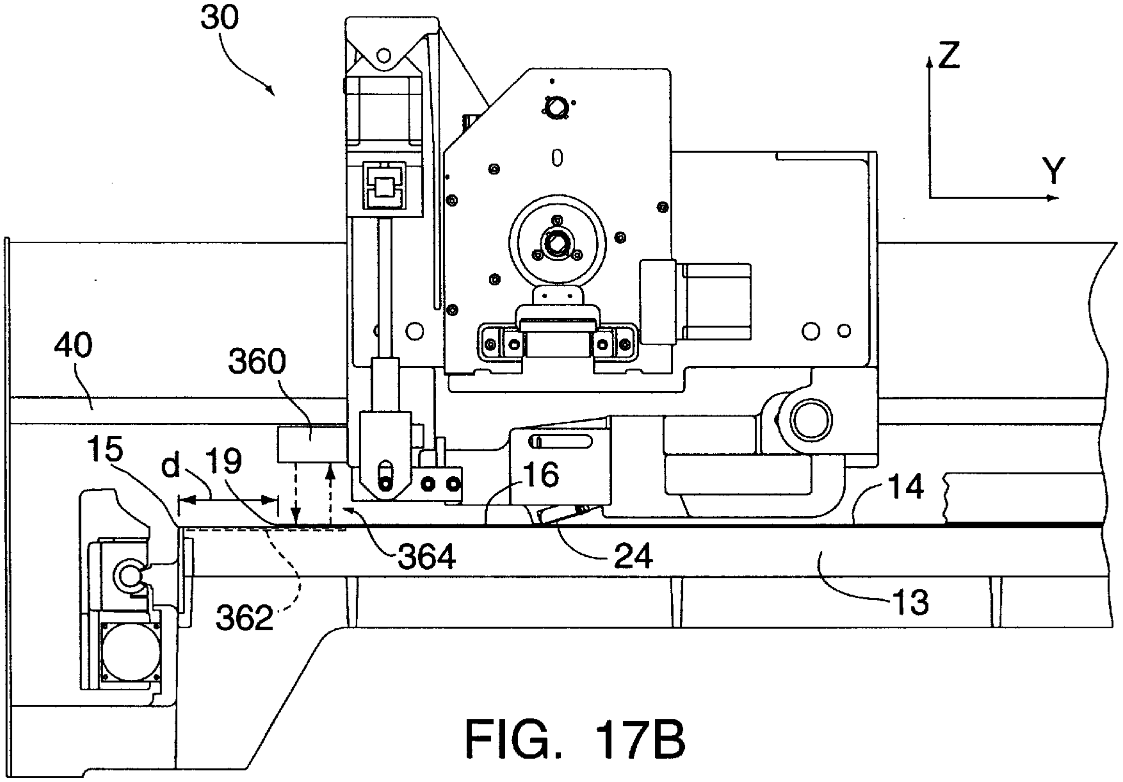

FIGS. 17A and 17B show top and elevational views, respectively, of selected components of the wide format thermal printer 10. FIG. 17A is a top view along the (Z) axis schematically illustrating the printhead carriage 30, the guiderails 40, the printing sheet 16 and the work surface 14; FIG. 17B is an elevational view along the printing sheet translation (X) axis, and schematically illustrating the printhead carriage 30, the thermal printhead 24, the workbed 13, the work surface 14 and the printing sheet 16. With reference to FIGS. 17A and 17B, the printhead carriage 30 mounts an edge sensor 360 for detecting the location of the edge 19 of the printing sheet 16. As shown in FIG. 17B, the edge sensor 360 transmits and receives a light beam 364 for detecting the edge 19 of the printing sheet 16. The edge sensor 360 includes a transmitting portion for generating light and a receiving portion for receiving reflected light. The change in the intensity of the reflected light received as the edge sensor passes over the edge 19 is used to determine the location of the edge 19. A reflective strip 362 is provided for enhancing the change in the intensity of the reflected light received by the edge sensor 360 as it passes over the edge 19 of the printing sheet The edge sensor 360 is shown as located along the lower edge of a print swath 29B. Again, this selection of location is exemplary. Note that rather than a reflection sensor, a linear array of receiving sensors, or pixels, can be located with the worksurface 14. The array would extend along the print (Y) axis, and the number of pixels illuminated indicate the position of the edge 19 of the printing sheet 16.

Figure 17C:
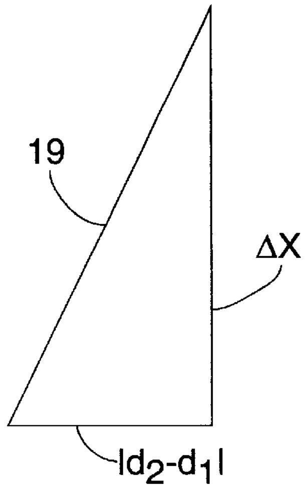
FIG. 17C illustrates one technique for determining the skew of the printing sheet from measurements made with the edge sensor of FIGS. 17A and 17B.

The skew of the printing sheet 16 can be determined as follows. The printhead carriage 30 is moved back and forth along the print axis so as to detect the edge 19 of the printing sheet 16. Assume that the edge 19 is located as indicated by the distance d1 in FIG. 16A. The printing sheet 16 is next translated along the printing sheet translation axis by the pair of translatable clamps 42 so as to, for example, move the printing sheet 16 to the position shown in FIG. 16B. The printhead carriage 30 is again moved back and forth along the print axis to detect the edge 19 of the printing sheet 16, wherein the edge is located as indicated by the distance d2. Based on the difference in relative positions of the printhead carriage 30 corresponding to the two detections of the edge 19, the relative change in distance, d1–d2, can be determined, and from the knowledge of the distance the printing sheet 16 was translated along the printing sheet translation axis, the slope of the edge 19 can be determined, as shown in FIG. 17C.

Figure 18:
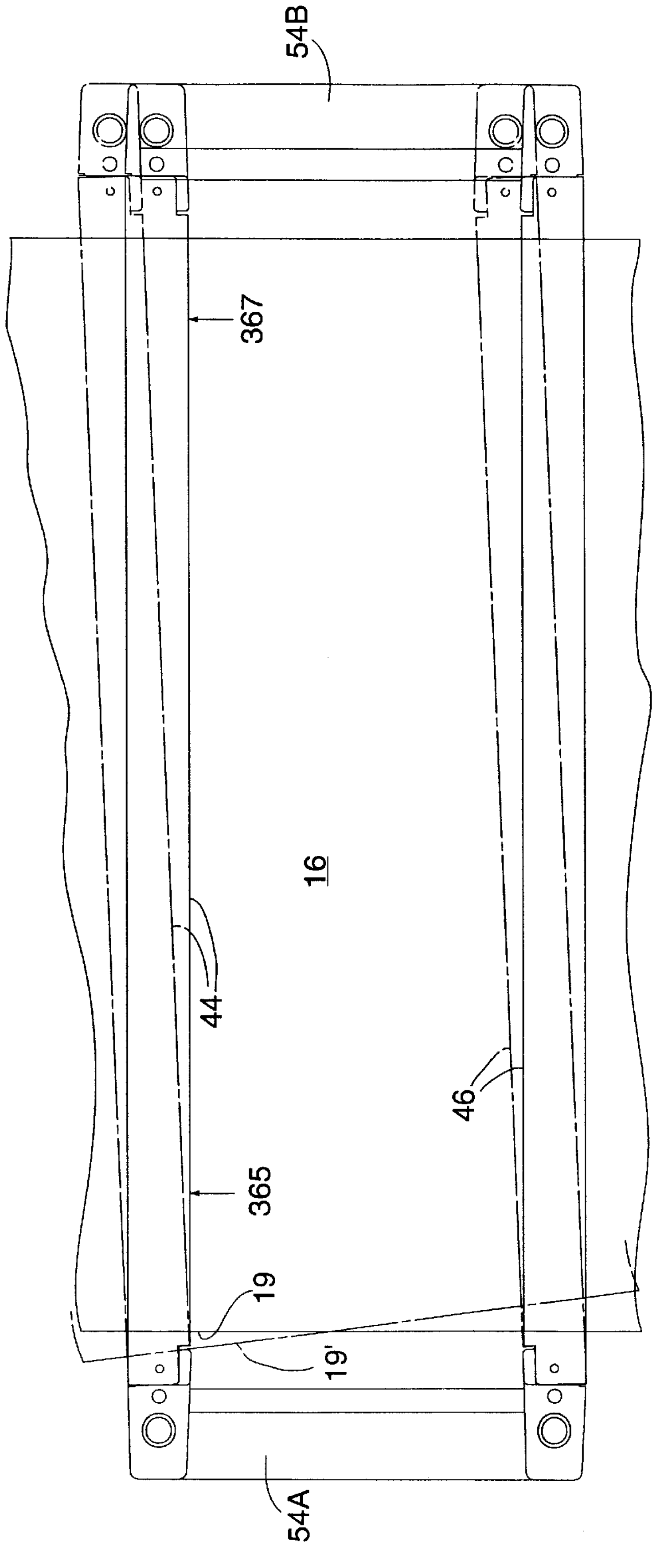
FIG. 18 illustrates selective actuation of the translatable clamps of the translatable clamp pair of the wide format printer for aligning the printing sheet.

The skew can be varied (e.g., reduced) by independently actuating the clamp actuators 58A and 58B while placing at least one of the clamps of the clamp pair 42 in the clamped condition and refraining from applying suction to the suction apertures 176. For example, with reference to FIG. 18 showing a top view of the printing sheet 16 and the translatable clamp pair 42, placing the clamp 44 in the clamped condition and actuating the right clamp actuator 58B (not shown) more that the left clamp actuator 58A (not shown) translates the right clamp pair fixture 54B more than the left clamp pair fixture 54A and moves the edge 19 of the printing sheet 16 to the position indicated by reference numeral 19', skewing the printing sheet as shown. Basically, the clamp 44 differentially drives spaced portions of the printing sheet, such as portions indicated by reference numerals 365 and 367, for producing a torque on the printing sheet 16. Of course, as the clamp 44 clamps the printing sheet 16 along a substantial length, and the particular selection of the spaced portions shown in FIG. 17 is exemplary. As used herein, differentially driving spaced portions includes driving spaced portions on the sheet material in different directions, driving the spaced portions different distances in the same direction, and fixing one portion and driving the other portion.

Typically, an iterative procedure is followed for varying the skew of the printing sheet 16. For example, the skew is determined as noted above, the clamp actuators independently actuated to vary the skew, the skew again measured, again varied, and so on, until the skew o the printing sheet 16 is within selected limits.

In general, independent actuation of the actuators 58A and 58B is used, not only to correct skew, but to “walk” the printing sheet 16 along the surface 14 of the workbed 13 so as to obtain a selected distance between the edge 19 of the printing sheet and the edge 15 of the work surface 14 or some other reference location along the print (Y) axis. Once this distance is within a predetermined range, the skew is varied as indicated above. Typically, if the edge 19 of the printing sheet 16 is within a tenth (10th) of an inch of the edge 15 of the work surface 14, it is not necessary to walk the printing sheet 16. “Walking” as used herein, refers to selectively activating the actuators 58A and 58B to first skew the printing sheet in one direction, and then to skew the printing sheet in the other direction, thereby “walking” the printing sheet 16. The term “aligning,” as used herein, refers to moving the printing sheet to obtain a selected skew (including no skew) and to obtain a selected distance between the edge 19 of the printing sheet and a reference location.

The location of the edge 19 relative to a reference position along the print (Y) axis can be determined with the aid of the home position sensor 360. The home position sensor indicates when the printhead carriage 30 is at known position along the print (Y) axis, such as when the left edge of the printhead carriage 30 is aligned with the edge 15 of the work surface 14. As understood by one of ordinary skill, another home position could be suitably selected. Use of the home position sensor 360 allows more accurate determination of the location of the edge 19 relative to the edge 15 of the edge of the worksurface 14.

Note that the skew need not be totally eliminated, that is, it is acceptable to proceed with a selected residual skew during the printing of each color plane. However, the skew should not vary during printing. Preferably, the skew is periodically checked during the printing of each color plane of the multicolor graphic product on the printing sheet 16 and adjusted as necessary. For example, as the printhead carriage 30 translates back-and-forth along the print axis to print the print swaths, and the printing sheet is translated along the printing sheet translation axis between successive swaths, the edge sensor 360 can be used to continually monitor the skew and position of the edge 19. If it is determined that the skew is varying during actuation of the clamp pair to translate the printing sheet, the steering is corrected, that is the actuation of the actuators 58A and 58B is selectively adjusted so as to maintain the predetermined skew. The actuators 58A and 58B are preferably stepper motors, and the controller(s) 22 can independently vary the number of steps each is instructed to turn. However, other types of actuators are also suitable, such as servomotors that include position encoders.

Note that the controller 22 can control the edge detection sensor 360 so as to detect both edges of the printing sheet 16 for determining the width of the printing sheet 16. The controller 22 can determine the distance between the detected edges of the printing sheet 16 from the knowledge of the distance printing carriage 30 is translated.

The translatable clamp pair 42 is but one example of a drive apparatus for moving a strip or web of sheet material, i.e., the printing sheet 16, longitudinally back-and-forth along a feed path, in this instance, the printing sheet translation (X) axis of the wide format thermal printer 10.

Other known drive apparatus include friction, grit or grid drive systems. Drive systems find use not only in printers, but in plotting and in cutting devices. For example, in friction-drive systems, the friction (or grit) wheels are placed on one side (i.e., above) of the strip of sheet material and pinch-rollers (made of rubber or other flexible material) which are placed on the other side (i.e., below) of the strip of sheet material with spring pressure urging the pinch rollers and material toward the friction-wheels. During work operations, such as plotting, printing or cutting, the strip material is driven back-and-forth in the longitudinal or (X) direction by the friction-wheels while, at the same time a workhead including a pen, printing head or cutting blade is driven over the strip material in the lateral, or Y, direction. Friction-drive systems, in particular, have gained substantial favor with many types of printers due to their ability to accept plain (unperforated) strips of material of differing widths. Tractor-drive systems for use with perforated strips of material are known in the art, but require correct spacing of the track-drive wheels to match the spacing of the perforated strips.

One example of a friction drive system is disclosed in patent application Ser. No. 09/217,667, entitled "METHODS FOR CALIBRATION AND AUTOMATIC ALIGNMENT AND FRICTION DRIVE APPARATUS", filed on Dec. 21, 1998, and owned-in-common with the present application, and herein incorporated by reference. Disclosed in the above-referenced application are friction drive wheels spaced in a direction parallel to the print (y) axis from each other, and which can be differentially actuated for differently driving spaced portions of the printing sheet for aligning the printing sheet 16. The use of friction, grit or grid drive apparatus for translating the printing sheet 16 along the printing sheet translation axis, and in particular of the apparatus and methods disclosed in the above reference application, are considered within the scope of the present invention.

Described above is a technique wherein the printhead carriage 30 mounts the edge sensor 360 which, in cooperation with the reflective strip 362, determines the skew of the printing sheet 16. However, also disclosed in the above-referenced application are methods and apparatus wherein a light source is disposed above a sensor that includes an array of pixels extending in the direction of the print (Y) axis. The sensor is disposed with the worksurface 14 for sensing the edge 19 of the printing sheet 16, and is spaced in the direction of the printing sheet translation (X) axis from the apparatus for driving the printing sheet ( i.e., one of the translatable clamps or the friction drive wheels. Preferably, two sensors are used, one ahead and one behind the drive mechanism. The use of such sensors, as well as of other techniques and apparatus disclosed in the above reference application, are deemed within the scope of the present invention.

According to invention, reference indicia for providing a "ruler" can be provided on the printing sheet 16 and a sensor disposed for reading these indicia such that the controller(s) 22, responsive to sensor, can track the distance the printing sheet 16 is translated along the printing sheet translation (X) axis by the clamp pair 42 or the friction wheels. For example, the "ruler" can be printed on the back side of the printing sheet 16, that is the side facing the worksurface 14, and read by a sensor disposed with the worksurface 14, such the pixel array sensor discussed above.

Field Replaceable Thermal Printhead Assembly

Figure 19A:
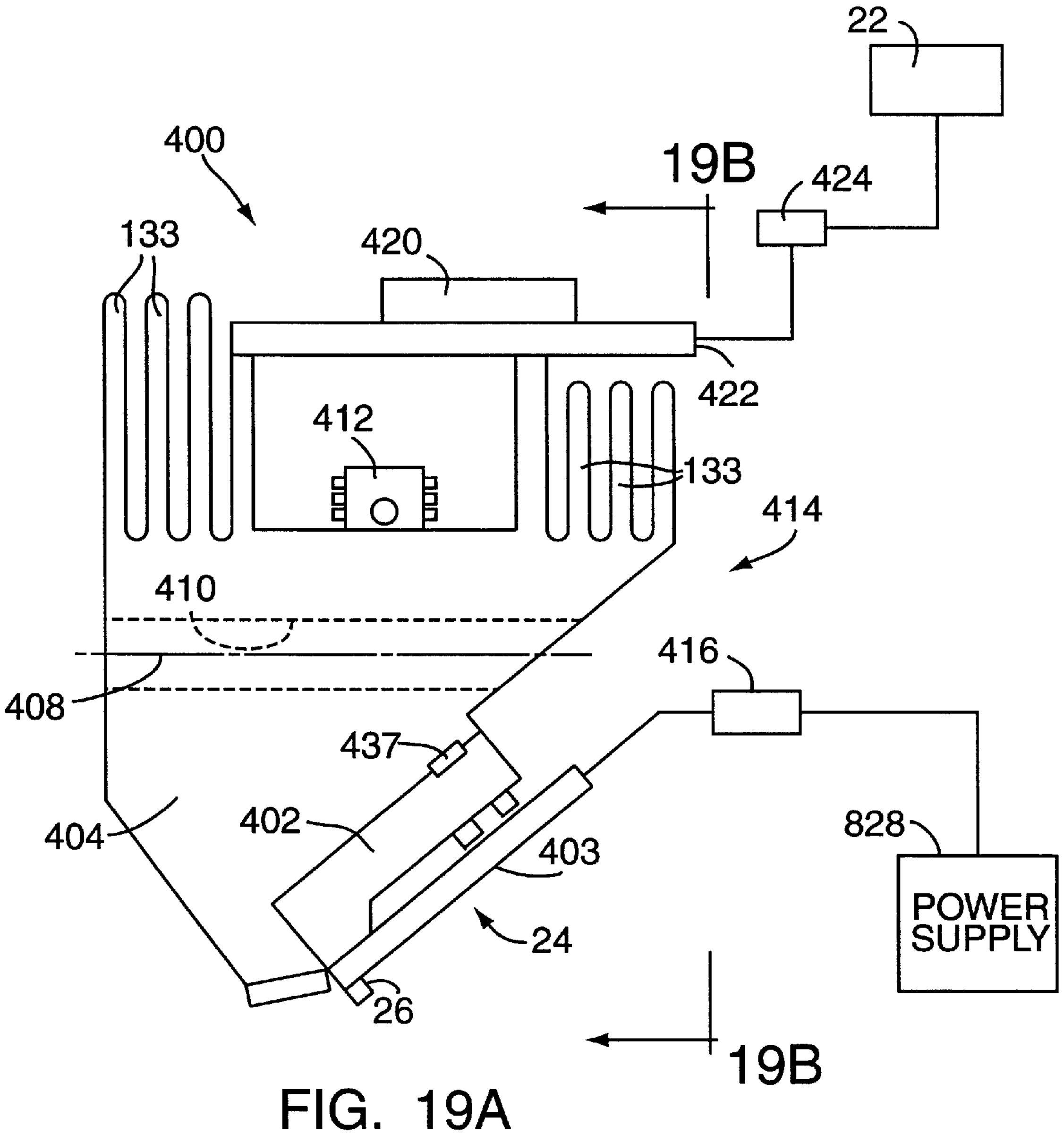
FIG. 19A illustrates a side elevational view of a printhead assembly of the present invention.

According to the invention, the thermal printhead 24 can be mounted to the cantilever arm 72 of the thermal printhead carriage 30 (See FIGS. 2, 4 or 5) via the thermal printhead assembly 400 illustrated in FIG. 19A. With reference to FIG. 19A, the thermal printhead 24 can include a mounting block 402 for mounting the thermal printhead circuit board 403 to the printhead assembly base 404. A single coupling joint mounts the printhead assembly 400, and hence the thermal printhead 24, along the mounting axis 408, shown in FIG. 4A, to the cantilever arm 72. Preferably, the coupling joint is a trunnion joint and the base 404 defines an aperture 410 for accommodating a trunnion pin (not shown) that extends along the mounting axis 408 (in the preferred embodiment the trunnion joint axis) that is received by the cantilever arm 72. Note that the mounting axis 408 is generally perpendicular to the direction along which the array of thermal printing elements 26 extends, and hence is generally perpendicular to the printing sheet translation (X) axis. The single coupling joint 406 advantageously provides for simple and easy removal and replacement of the thermal printhead 24 in the field, and can allow the printhead 24 to swivel for producing a more even pressure distribution on the thermal printing elements 26.

The thermal printhead assembly 400 can also include a heating element 412 and a cooling element 414 for transferring heat with the thermal printhead 24. The cooling element 414 can include cooling fins 133 that are mounted with the printhead assembly base 404. The cooling fins 133 are also shown in FIGS. 2 and 4A, and when the thermal printhead assembly 400 is mounted to the cantilever arm 72, the cooling fins 133 receive air directed to them by the blower 126 mounted with the cantilever arm 72. Preferably, the base 404 is thermally conductive for providing thermal communication between heating and cooling elements and the array of thermal printing elements 26.

The heating element 412 and the cooling element 414 are provided for enhanced thermal management of the thermal printhead 24 and, in particular, the array of thermal printing elements 26. Upon initial startup of the wide format thermal printer 10, the array of thermal printing elements can advantageously be warmed by the transfer of heat from the heating element 412 such that multicolor graphic image is printed properly on the printing sheet 16. However, during extended printing, it can be advantageous to remove heat from the array of thermal printing elements 26 and, accordingly, removal of such heat is enhanced by the cooling element 414. The heating element 412 is typically an electrical power resistor mounted for thermal communication with the printhead assembly base 404 and, hence, with the thermal printhead 24 and array of thermal printing elements 26.

The thermal printhead 24 receives signals via the thermal printhead connector 416 which include data representative of the multicolor graphic product to be printed on the printing sheet 16. As is known in the art, thermal printhead 24 typically includes drive electronics for conditioning those signals prior to energizing the array of thermal printing elements 26 responsive to the signals. For example, the drive electronics can convert the signals received by the connector 416 from differential type signals to single-ended signals. The thermal printhead 24 also receives power from a power supply 828, as is known in the art, for energizing the array of thermal printing elements 26.

According to the invention, a semiconductor element 420 is included with the thermal printhead 24 for storing data characteristic of the thermal printhead 24. The printhead assembly base 404 mounts a semiconductor element mounting board 422 that, in-turn, mounts the semiconductor element 420. The connector 424 provides communication between the semiconductor element 420 and the controller (s) 22 associated with the wide format thermal printer 10. The arrangement shown in FIG. 19A is exemplary, and as understood by one of ordinary skill, in light of the disclosure herein, the semiconductor element 420 can be mounted adjacent the array of thermal printing elements 26, such as on the thermal printhead circuit board 403 add/or be incorporated with the drive electronics. The term "printhead assembly," is employed herein to aid in the above discussion; however, as understood by one of ordinary skill in the art, the printhead assembly 400 need not include all of the elements described above.

The data characteristic of the printhead stored by the semiconductor element 420 can include data representative of the resistances of the thermal printing elements 26, such as an average resistance of the printhead elements. This resistance data can be useful in a variety of ways. For example, for proper printing of the multicolor graphic product on the printing sheet 16, the array of thermal printhead elements 26 is selectively energized. Typically, the thermal printhead elements are energized such that a selected amount of heat is generated in each element for transferring a pixel of color from the donor sheet to the printing sheet 16. Of course, the amount of heat generated depends, in-turn, on the current (or voltage) applied to the thermal printing element and the resistance of that element. Typically, it is more important that the manufacturer of the thermal printhead keep the individual resistances of the thermal printing elements that makeup the array of thermal printing elements 26 within a rather narrow range of tolerances than the manufacturer provide a particular resistance. Thus the average value of the resistances of the thermal printing elements can vary, and the data stored in the semiconductor element 420 allows the wide format thermal printer 10 to automatically compensate for a thermal printhead 24 that has a higher or lower average resistance than another printhead 24. Accordingly, when the thermal printhead 24 is replaced in the field, a calibration procedure is not necessary or, if necessary, can be less difficult or time consuming and the wide format thermal printer 10 can more readily be returned to service.

Keeping the resistances of the individual thermal printing elements within narrow tolerances, for example, within one (1%) percent, typically adds to the cost and difficulty of manufacturing the thermal printhead 24, and can also lead to a thermal printhead 24 that is less robust than one manufactured with a wider range of tolerances. However, according to the invention, the data characteristic of the printhead can include the individual resistances of a selected plurality of the thermal printing elements. The selected plurality of the thermal printhead elements can included the individual resistances of each of the thermal printhead elements that is normally used in printing. The data representative of the resistances of the individual elements are stored in the semiconductor element 420 and each individual resistance is accounted for when energizing that element during printing. Accordingly, the manufacturer of the thermal printhead 24 need not take such extreme measures for producing a narrow range of tolerances, leading to a less-expensive thermal printhead and one that can be more robust in use.

According to the invention, the data stored on the semiconductor element 420 can include data representative of the history of use of the thermal printhead 24, or of the printer, and is typically acquired by monitoring selected printing parameters. For example, history data can include data representative of the following: the total time of use of the wide format thermal printer 10 with the thermal printhead 24 installed thereon; the total amount of time the thermal printhead has spent pressing donor sheet against printing sheet 16 and printing; the total distance translated along the print (Y) axis by the thermal printhead 24 while pressing the donor sheet against printing sheet 16 and printing; the voltages that have applied to the thermal printing elements when energizing the thermal printing elements; and information related to the number of printing pulses (e.g. voltage pulses) that have been communicated to the thermal printing elements.

The semiconductor element 420 can include a processor programmed for tracking the number of printing pulses communicated to the thermal printing elements and for storing that number in the memory of the semiconductor element 420. As is known in the art, very often more than one pulse is sent to a thermal printing element to print a pixel with that element. Accordingly, the program can include tracking the total number of printing pulses communicated to all of the thermal printing elements or can track a number related to the total number to account for multi-pulse printing of each pixel. The total printing time accumulated on the printhead assembly 400 is related to the number of printing pulses transmitted to the thermal printing elements 26. From a knowledge of the number of printing pulses provided to the array of thermal printing elements 26 and the resolution of the multi-color graphic product, that is, the dots per inch, an approximate total time of use of the thermal printhead 24 can be determined, such as by the tracking program or by the controller(s) associated with the wide formal thermal printer 10, and stored on the semiconductor element.

There are many different types of donor sheets and printing sheets 16 used in the graphic arts. These types of donor sheets and printing sheets 16 can produce varying amounts of wear on the thermal printhead 24. Accordingly, the types of printing sheets and donor sheets used with the thermal printhead 24 can be tracked and the history of use data described above can include data representative of the amount of time spent printing selected donor sheets and printing sheets. Typically, the controller(s) 22 read data characteristic of the donor sheet from the memory element 300 mounted with the supply roll of the donor sheet.

The data described above can be useful in a number of ways, such as diagnosing problems with the quality of the multicolor graphic product, determining if customer claims are within a warranty, tracking use for timely performing service and maintenance. For example, data can be read from the semiconductor element 420 when testing a particular thermal printhead 24 in the field. The thermal printhead assembly 400 can be removed from the printer and the resistance profile, that is the average resistance or the resistance of individual thermal printing elements of the thermal printhead 24, read from the semiconductor element 420. The stored profile will typically correspond to the resistances of the thermal printing elements 26 at the time of manufacture of the thermal printhead 24, and can be compared to actual empirical tests performed on the thermal printhead 24 when removed from the wide format thermal printer 10. A determination that some or all of the thermal printing elements have changed their resistance can be an indication of over-stressing, that is, over-heating, of the thermal printhead. The thermal printhead can be replaced, or the controller(s) 22 associated with the wide format thermal printer 10 instructed to print the color plane of the multicolor graphic product so as to compensate for changed thermal printing elements.

Figure 19B:
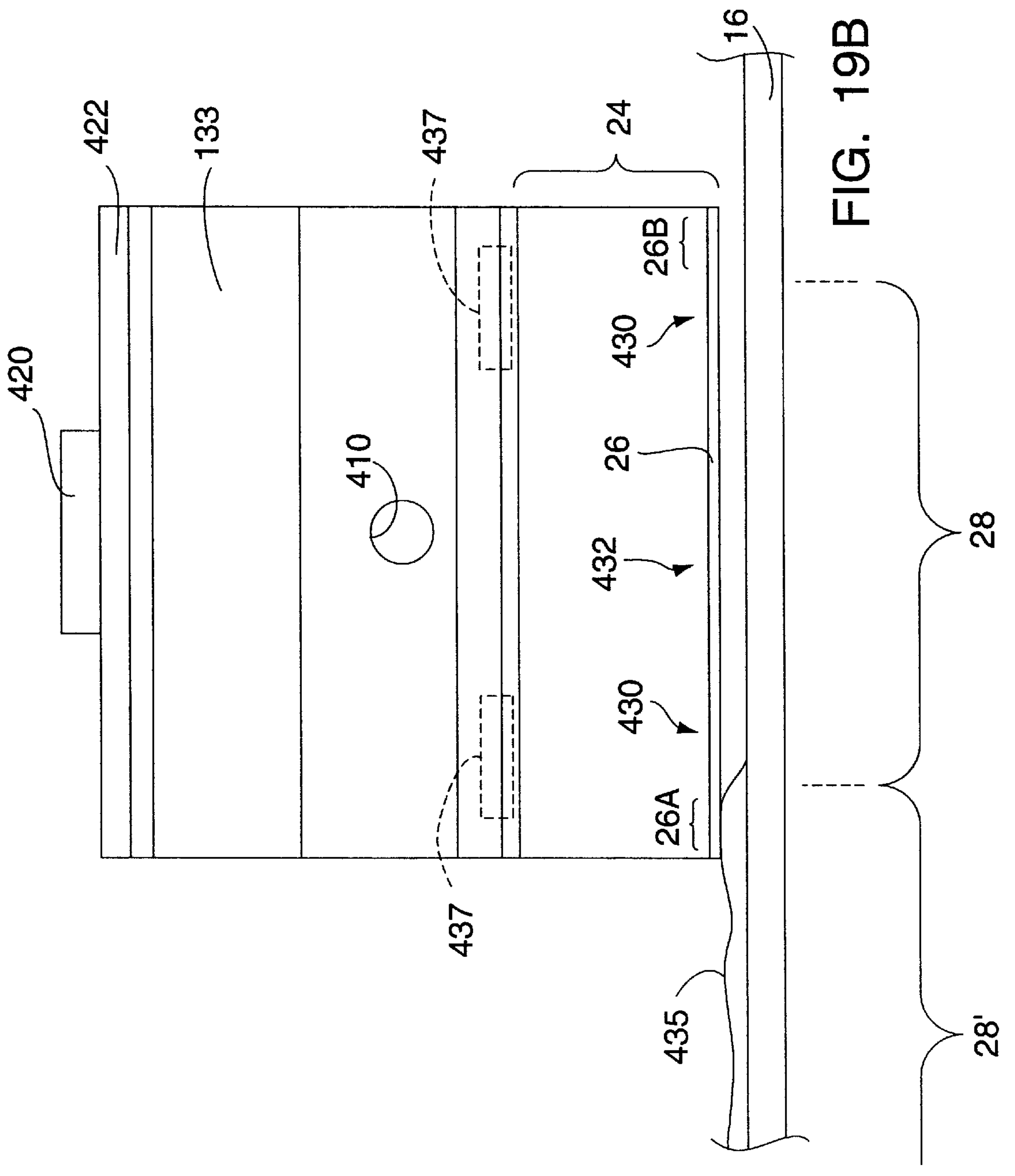
FIG. 19B illustrates of view of the printhead assembly of FIG. 19A taken along line 19B—19B of FIG. 19A.

The thermal printing elements 26 of the thermal printhead 24 selectively heat the donor sheet to transfer pixels of donor material, such as an ink, from the donor sheet to the printing sheet 16. Typically, each thermal printing element corresponds to a single pixel. Depending on the nature of the multicolor graphic product to be printed, a particular thermal printing element can be energized repeatedly within a relatively short period of time, or can be energized infrequently. Furthermore, a particular thermal printing element can be surrounded by neighboring thermal elements that are relatively hot or cold, depending on the recent usage of those elements. As is known in the art, the amount of heat transferred to the donor sheet by a particular thermal printing element thus can vary as a function of the past energization of that thermal printing element and its neighbors. Print quality can be affected if the amount of energy transferred when printing similar pixels is allowed to excessively vary from pixel to pixel. Accordingly there are known in the various "hysteresis control" techniques for accounting for the past energization of a thermal printing element and its neighbors when energizing that element for printing. FIG. 19B is a view of the thermal printhead assembly 400 taken along the line 19B—19B of FIG. 19A. Note that the outer thermal printing elements 430, which are located near the ends of the array of thermal printing elements 26, have fewer neighbors than those elements 432 nearer the middle of the array of thermal printing elements 26. According to the invention, the array of thermal printing elements 26 can include thermal elements 26A and 26B that are not normally used in printing. That is, print swaths, such as print swath 28, are printed by the thermal printing elements normally used in printing, which are those elements of the array between the dotted lines defining the print swath 28. According to the invention, selected thermal printing elements not normally used in printing are energized so as to provided additional heated neighbors for the outer thermal elements 430 to reduce any printing discrepancies between the outer thermal printing elements 430 and those thermal printing elements 432 nearer the middle of the array of thermal printing elements 26. The thermal printing elements 26 that are heated can be energized prior to and/or during the energization of the outer thermal printing elements 430.

In addition, it is also understood by those of ordinary skill, in light of the disclosure herein, that proper alignment of consecutive print swaths can be important to avoid or limit the visibility of "seams" running along the print (Y) axis and indicating where individual print swaths meet. Such seams can be more or less visible depending on the nature of the multicolor graphic product being printed. The translatable clamp pair 42 of the present invention can provide accurate and repeatable translation of the printing sheet 16 for limiting misalignment of the print swaths. The disclosed apparatus and methods for alignment of the printing sheet 16 along the printing sheet translation (X) axis also can contribute to reducing any misalignment of the printing swaths. For example, one technique for reducing the visibility of seams can include printing the multicolor graphic product such that print swaths used in printing one color plane are not in registration with those of another color plane. Thus any seams in the first color plane do not have the same position along the printing sheet translation (X) axis as seams in the other color plane. Another technique that may be of use is to print swaths with other than "straight" bounding edges. For example, the print swath 28 shown in FIG. 1 is bounded by the straight edges 29A and 29B. The array of thermal printing elements 26 can be energized such that bounding edges of the print swath assume a meandering shape, such as a sawtooth or sinusoid. Successive print swaths thus have edges that meet in the manner of the pieces of a jigsaw puzzle.

According to another technique practiced in accordance with the invention, the distribution of pressure along the array of thermal printing elements is modified. For example, with reference to FIG. 19B, consider that thermal printhead 24 is about to print the print swath 28, having just printed print swath 28' and deposited a slightly raised area of ink 435 on the printing sheet material 16. The thermal printing elements 26A, though not normally used for printing, contact the raised are of ink 435, and the contact and/or pressure between the array of thermal printing elements 26 and the printing sheet material 16 is not uniform along the length of the array of thermal printing elements 26. Accordingly, shims 437 can be placed between the mounting block 402 of the thermal printhead 24 as shown in FIGS. 19A and 19B. Typically, these shims are approximately 1 thousandths of an inch thick. The use of such shims has been found to improve the quality of the printed multicolor graphic product.

Donor Sheet Conservation

The present invention includes many features intended to provide for economical and efficient printing of the multicolor graphic product on the printing sheet 16. It is known in the art that the donor sheet is typically expensive. Accordingly, the donor sheet assembly 228 includes a length of donor sheet 229 that can be, for example, 500 meters long, such that an operator of the wide format thermal printer can realize the economic benefits of buying in bulk.

Furthermore, the memory element 300 includes data representative of the length of unused donor sheet remaining on the supply core body 230. Accordingly, before a particular job is started, the controller(s) 22 associated with the wide format thermal printer 10 can determine whether enough donor sheet remains on the supply core body 230 to completely print a particular color plane. Unexpectedly running out of the donor sheet during printing is a problem not unknown with prior art printers and typically destroys the multicolor graphic product, wasting the donor sheet that had been already used in printing the color planes of the multicolor graphic product. This problem can be avoided with techniques and apparatus of the present invention.

According to the invention additional methods and apparatus are provided for conserving donor sheet while printing and for reducing the amount time required to print a particular multicolor graphic product on the printing sheet 16. The apparatus and method involve programming running on the controller(s) 22 associated with the wide format thermal printer 10. Techniques referred to herein as X axis conservation, Y axis conservation, knockout conservation, and time conservation, are now described.

Figure 20:
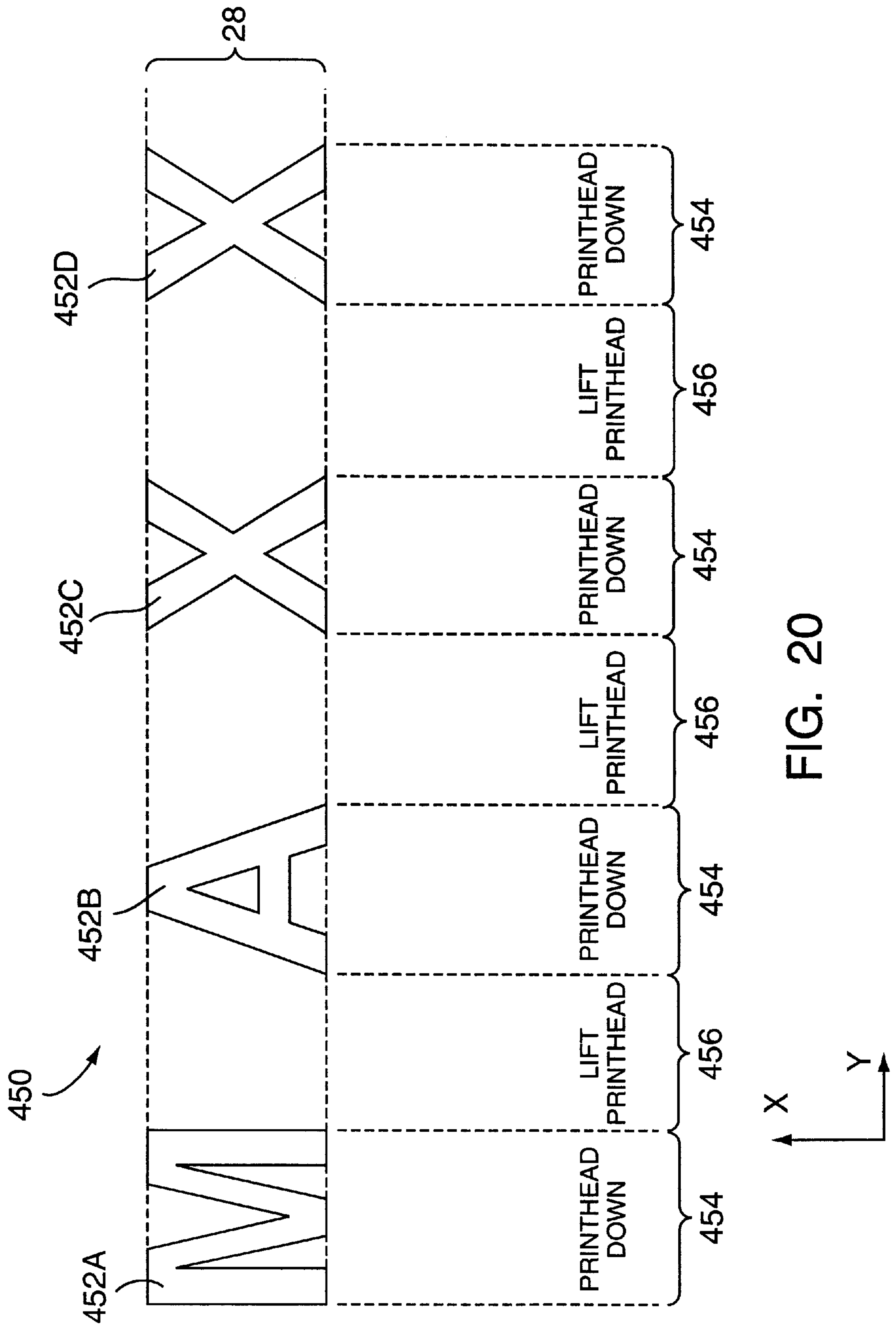
FIG. 20 illustrates the technique of Y axis conservation for reducing the amount of donor sheet consumed by the wide format thermal printer of the present invention.

FIG. 20 illustrates the technique of Y axis conservation. Consider printing the text "MAXX", as indicated by reference numeral 450. The individual letters are indicated by reference numerals 452A through 452E. Assume for simplicity that the height of the text "MAXX" is such that it may be printed in one print swath 28. The thermal printhead 24 prints the text 450 by pressing the donor sheet 153 against the printing sheet 16 and selectively energizing the array of thermal printing elements 26 while translating the thermal printhead 24 along the print (Y) axis. Translation of the thermal printhead 24 while pressing the donor sheet 153 against the printing sheet, causes the donor sheet to be drawn past the thermal printhead 24. Reference numerals 454 indicate translation along the print (Y) axis with the thermal printhead down for printing the individual letters 452A through 452E of the text 450. According to the invention, the thermal printhead 24 is lifted in between printing objects, such as the individual letters 452A through 452E, when the objects are separated by at least a selected distance in the direction of the print (Y) axis, so as to not draw the donor sheet 153 past the thermal printhead 24 when there are not any pixels to be printed. Reference numerals 456 indicate translation along the (Y) axis while the thermal printhead is lifted away from the printing sheet 16. The pivot actuator 74 lifts the thermal printhead 24 by moving the cantilever arm 72 upward, upon instruction from the controller(s) 22 associated with the wide format thermal printer 10.

Figure 21B:
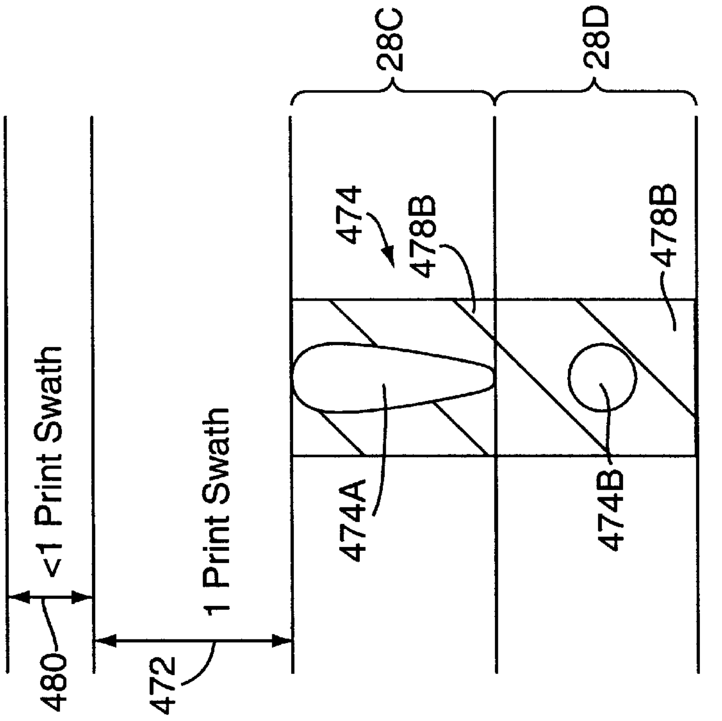
FIGS. 21A and 21B illustrate alternative techniques for printing with the wide format printer of the present invention, where
Figure 21A:
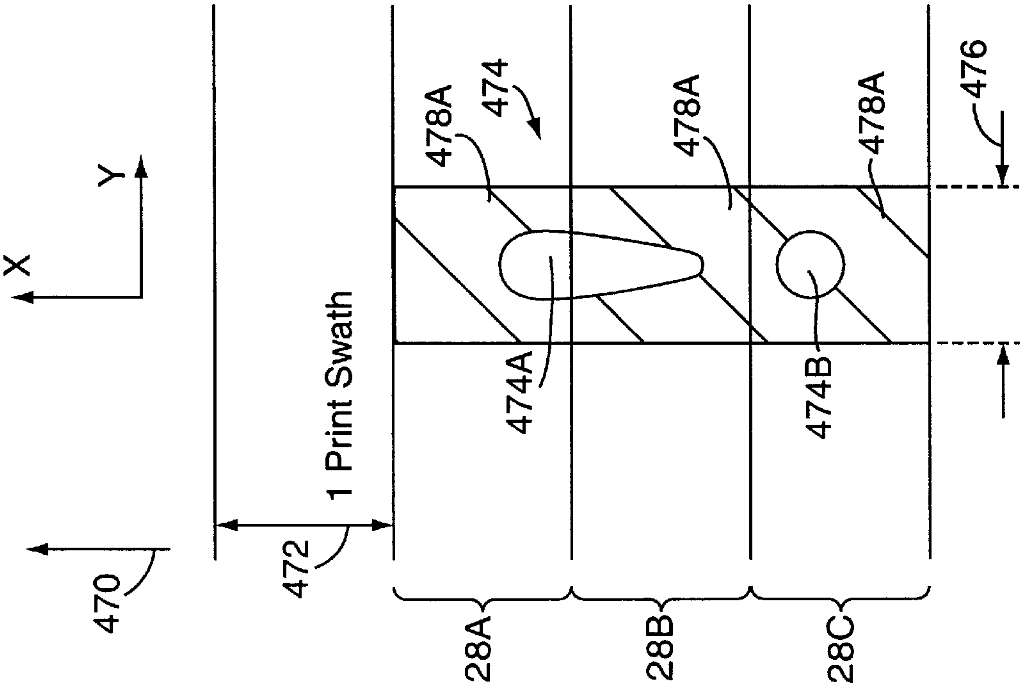

FIGS. 21A and 21B illustrate the use of the technique referred to as (X) axis conservation. With reference to FIG. 21A, consider the printing of the exclamation mark 474 having a top portion 474A and a lower portion 474B. The printing sheet 16 is translated in the direction indicated by reference numeral 470. According to one technique for printing the multicolor graphic image, each of the color planes is divided into a number of print swaths, each having a swath width substantially equal to the printing width of the array of thermal printing elements 26 along the printing sheet translation (X) axis, and the printing sheet 16 is translated a distance equal to the swath width after printing each of the print swaths. Such a technique can result in the exclamation mark 474 being printed as illustrated in FIG. 21A, that is, in the three (3) print swaths 28A, 28B and 28C. When printing the exclamation point 474, the printhead is only down for a distance along the (Y) axis, indicated by the reference numeral 476. However, note that the shaded areas, indicated by reference numerals 478A, are portions of the donor sheet that are drawn past the thermal printhead 24, but are not used for printing. The portions 478A are simply wasted. Some waste, of course, is unavoidable. However, by translating the printing sheet 16 a selected distance 480 along the printing sheet translation axis, it is possible to print the exclamation mark 474 in fewer print swaths.

For example, as shown in FIG. 21B, the exclamation mark 474 may be printed in two (2) print swaths 28C and 28D, such that the wasted portions of the donor sheet, indicated by reference numerals 478B, is less than the wasted portions indicated by reference numerals 478A. Typically, (X) axis conservation involves translating the printing sheet 16 a selected amount, which can be other than an integer number of swath widths, so as to print a given portion of the color plane with a reduced number of print swaths.

Figure 22A:
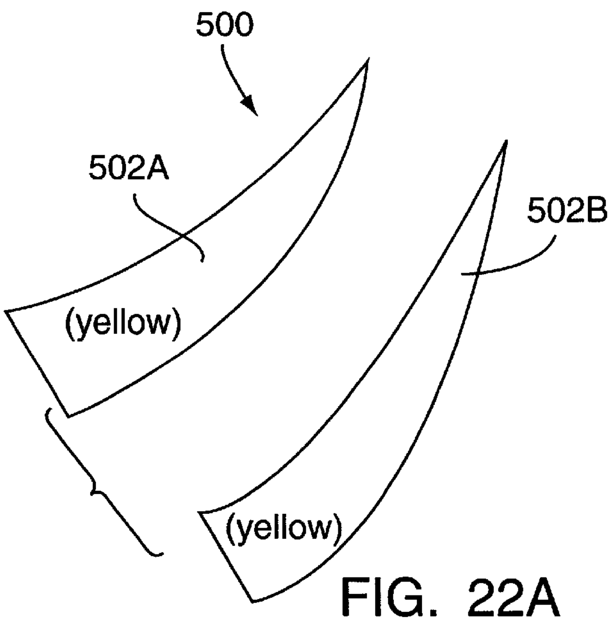
FIG. 22A illustrates two banners to be included in the multicolor graphic product printed by the wide format thermal printer of the present invention.
Figure 22D:
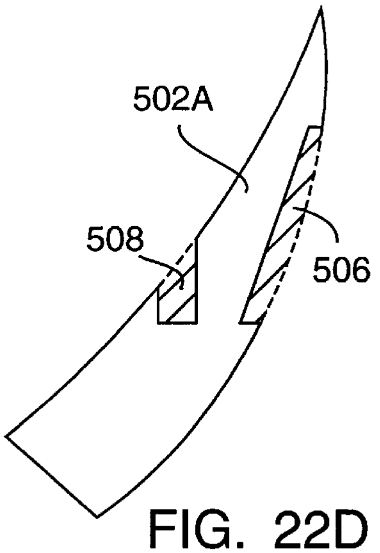
FIG. 22D illustrates one of the banners of FIG. 22C including those "knocked out" portions that are not printed when printing the banner.
Figure 22B:
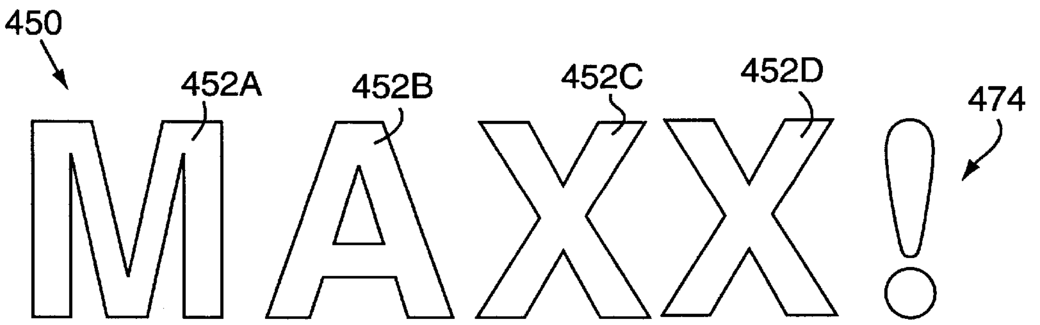
FIG. 22B illustrates textual objects to be included with the banners of FIG. 22A in the multicolor graphic product to be printed by the wide format printer of the present invention.
Figure 22C:
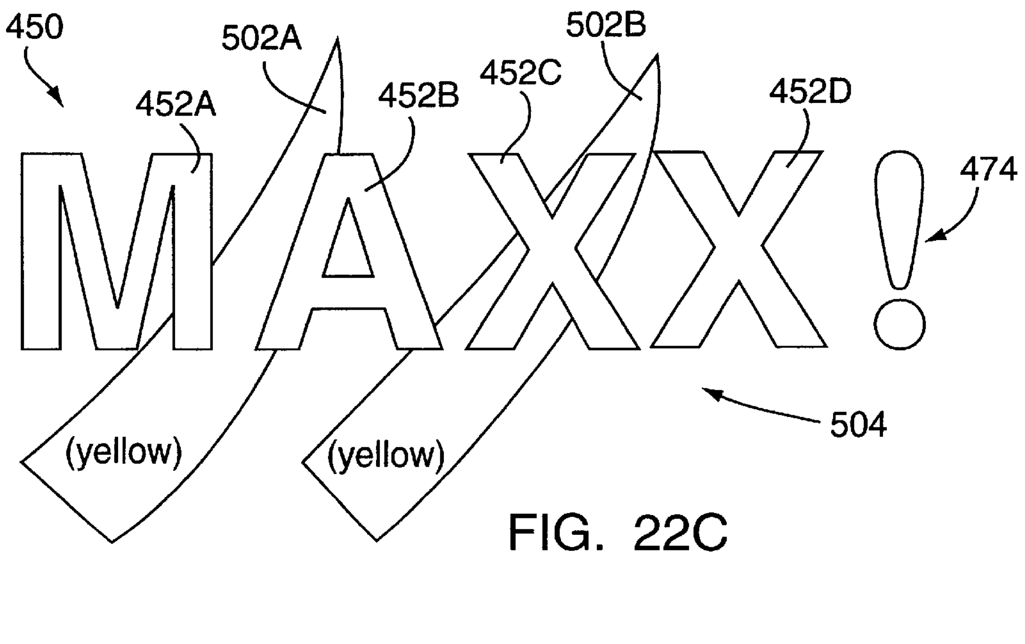
FIG. 22C illustrates the placement of textual objects of FIG. 22B over the banners of FIG. 22A in the multicolor graphic product such that portions of the banners are "knocked out".

The invention also includes methods and apparatus for practicing the technique referred to above as "knock-out" conservation. Consider the two (2) yellow banners, indicated by reference numeral 500 as shown in FIG. 22A, and also consider the text "MAXX", indicated by reference numeral 450 and shown in FIG. 22B. A graphic designer may desire that the text 450 be laid-over the yellow banners 500 such that the text, if for example, printed in black, knocks out the yellow banners where the text overlays the yellow banners 500. For example, with reference to FIG. 22C, the letter "A", indicated by reference numeral 452B, knocks out a portion of the left yellow banner 502A, as does the letter "M", indicated by reference numeral 452A. These two (2) knocked out portions are shown in FIG. 22D, and indicated by reference numerals 506 and 508, respectively. Because the wide format printer 10 prints in separate color planes, unless properly instructed, the printer 10 simply prints all of the yellow banners 502A and 502B when printing the yellow color plane and then proceeds to print the yellow with the black text "MAXX" when printing the black color plane. However, according to the invention, the knocked out areas of the yellow banners, such as those areas indicated by reference numerals 506 and 508 in FIG. 22D, are determined and the printer 10 refrains from printing knocked out areas such as 508 and 506 for conserving the yellow donor sheet.

The invention also includes method and apparatus for reducing the time required to print the multicolor graphic product on the printing sheet 16. For example, with reference to FIG. 23, consider that the exclamation mark 474 is the final object printed in a first color plane and that it is printed in two (2) print swaths 28C and 28D. Consider also that the next color plane to be printed is a green color plane that consists of the four (4) rectangular blocks 512A through 512D. The thermal printhead 24 finishes printing the first color plane with the printing of the print swath 28.

Figure 23:
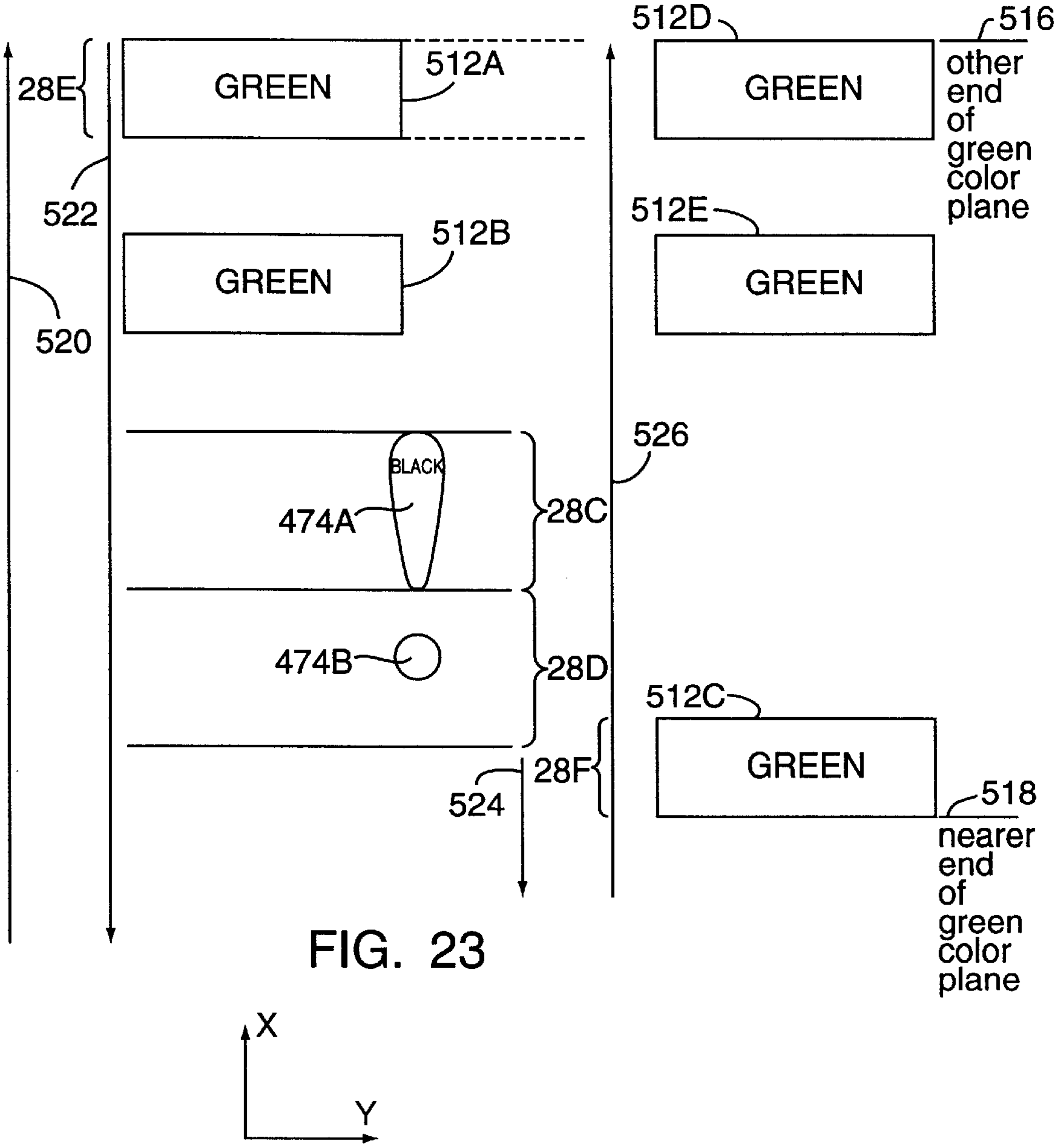
FIG. 23 illustrates a technique for printing with the wide format thermal printer for reducing the time it takes to print a multicolor graphic product on the printing sheet.

The green color plane can be considered to have a near end, indicated by reference numeral 518, and a far end, indicated by reference numeral 516. The wide format thermal printer 10 can print the green color plane by translating the printing sheet 16, as indicated by reference numerals 520 and 522 such that objects nearer the far end 516 are printed first, or, alternatively, can translate the printing sheet 16 as indicated by reference numeral 524 and 526, such that objects nearer the near end 518 are printed first. As can be appreciated by viewing FIG. 23, the total distance the printing sheet 16 is translated is less when printing the color plane by printing objects nearer the near end 518 first than when printing the objects nearer the far end 516 first. Translating the printing sheet 16 a shorter distance reduces the time to print the multicolor graphic product. Because the wide format thermal printer of the present invention can print in either direction along the printing sheet translation (X) axis, one printing technique can be simply alternating printing directions as successive color planes are printed. However, as shown in FIG. 23, it can be more efficient to evaluate the position of the printing head when finishing a first color plane relative to the objects of the next color plane to be printed and translating the printing sheet such that the objects nearer the near end of the next color plane are printed before the objects nearer the far end of the next color plane. This can involve printing successive color planes in the same direction. Note that printing a single color plane can involve printing while translating in both direction along the printing sheet translation (X) axis.

Before the multicolored graphic product is printed on the printing sheet 16, machine readable data files representative of the graphic product are created. Typically, a graphic artist working at a computer workstation provides input using a keyboard and a pointing and selecting device, such as a mouse or light pen, to generate an image representative of the multicolor graphic product on the screen of the workstation. The workstation stores one or more data files representative of the multicolor graphic image in a memory associated with the workstation. The graphic artist incorporates bitmap images, text, and geometric shapes, as well as other objects, into the final multicolor graphic product, and can enter these objects into workstation in any order. The file created by the workstation representative of the multicolor graphic image is referred to herein as "plot file," or alternatively as a "job file." According to the invention the plot file is processed to separate out individual color plane data and to place the data representative of the multicolor graphic image in a form suitable for instructing the wide format thermal printer 10 to print the multicolor graphic product using the donor sheet and time conservation techniques illustrates in FIGS. 20–23.

Accordingly, the above techniques illustrated in FIGS. 20–23 are implemented via appropriate software, hardware, or firmware associated with the controller(s) 22 of the present invention, and typically involve processing of the data representative of the multicolor graphic product, such as the job file. Presented below is a preferred embodiment of processing techniques, in the form of flow charts, for achieving X axis conservation, Y axis conservation, knock out conservation and printing time conservation, as illustrated in FIGS. 20–23 above. One of ordinary skill, in light of the disclosure herein, can program the controller(s) 22 associated with wide format thermal printer 10 and/or provide the appropriate firmware or hardware so as to functionally achieve the above conservation techniques.

Figure 25A:
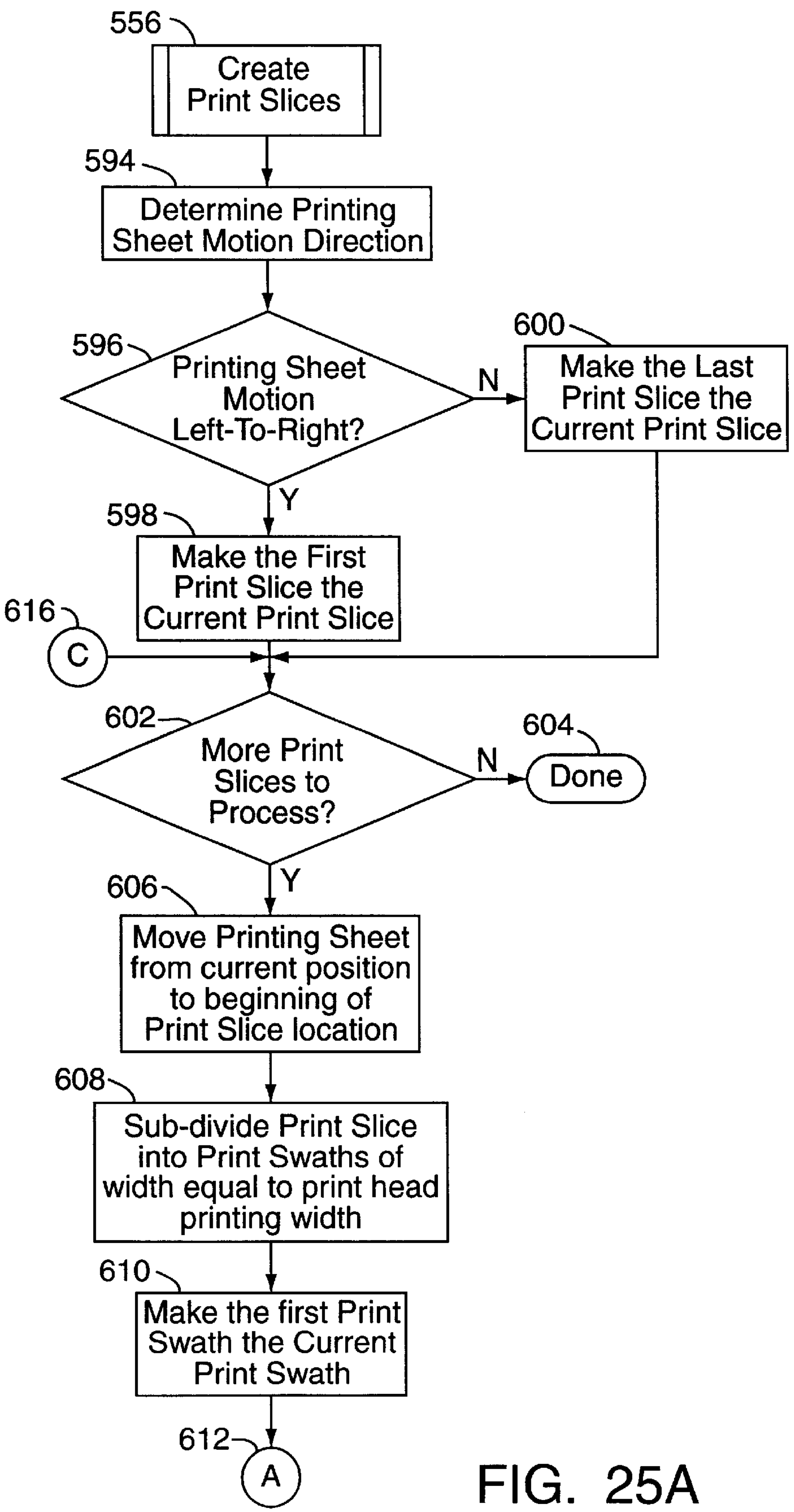
FIG. 25A is a flow chart illustrating additional steps, including selecting the direction of translation of the printing sheet for reducing the time for printing the multicolor graphic product in accordance with FIG. 23 and for dividing the print swipes into print swaths.
Figure 25B:
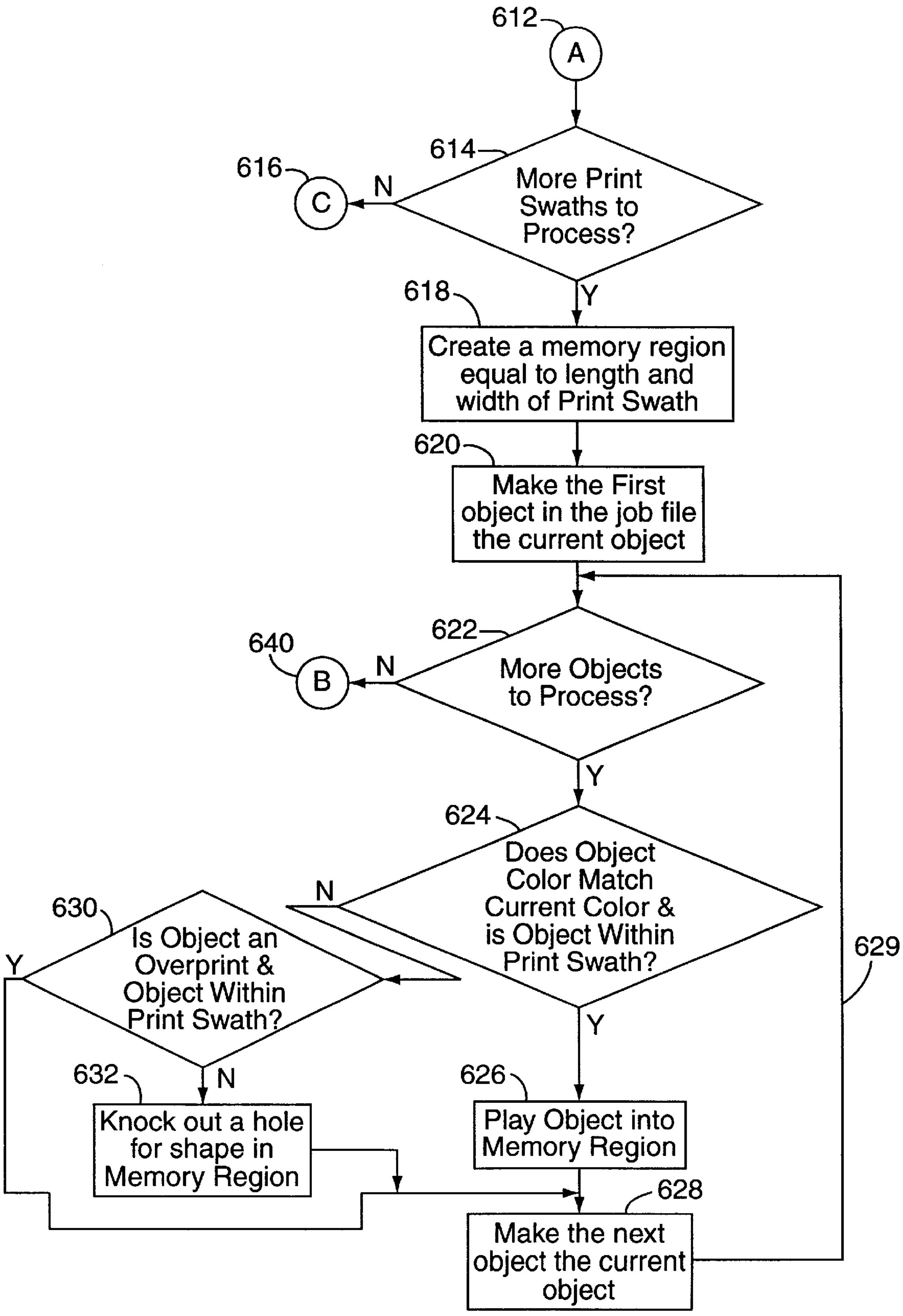
FIG. 25B is a flow chart illustrating additional steps including a technique for processing data so as to refrain from printing the knocked-out areas of FIGS. 22A–22D.
Figure 25C:
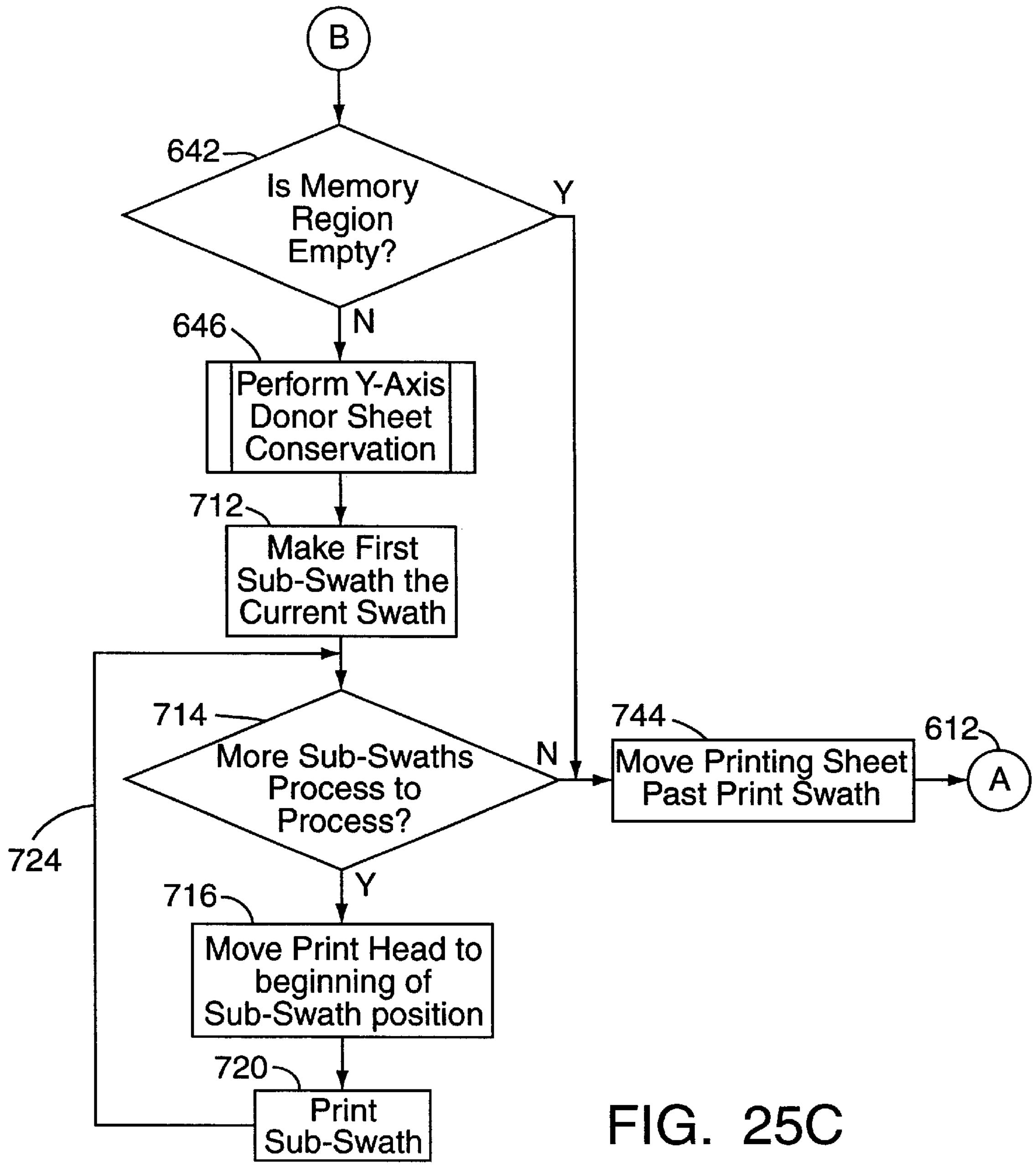
FIG. 25C is a flow chart indicating the printing of the selected color plane on the printing sheet in print swaths, including performing the Y axis conservation shown in FIG. 20 for each print swath.
Figure 26:
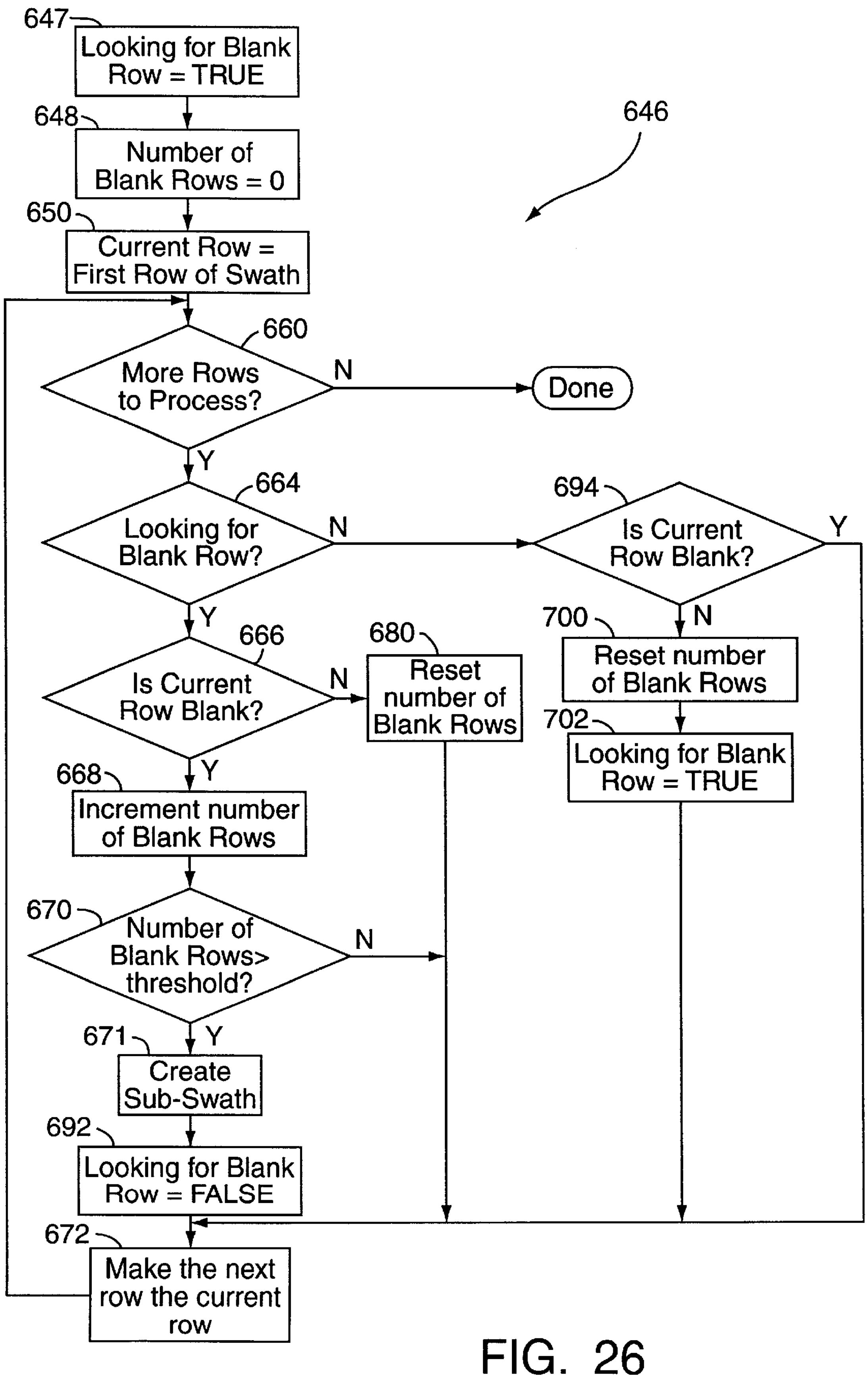
FIG. 26 is a flow chart illustrating one procedure for processing data in accordance with the flow chart of FIG. 25C to create subswaths for performing the Y axis donor sheet conservation illustrated in FIG. 20.

FIGS. 24–26 are flow charts illustrating processing data representative of the multicolor graphic product such that the wide format thermal printer 10 of the present invention prints the multicolor graphic product according to the conservation techniques illustrated in FIGS. 20–23.

Figure 27A:
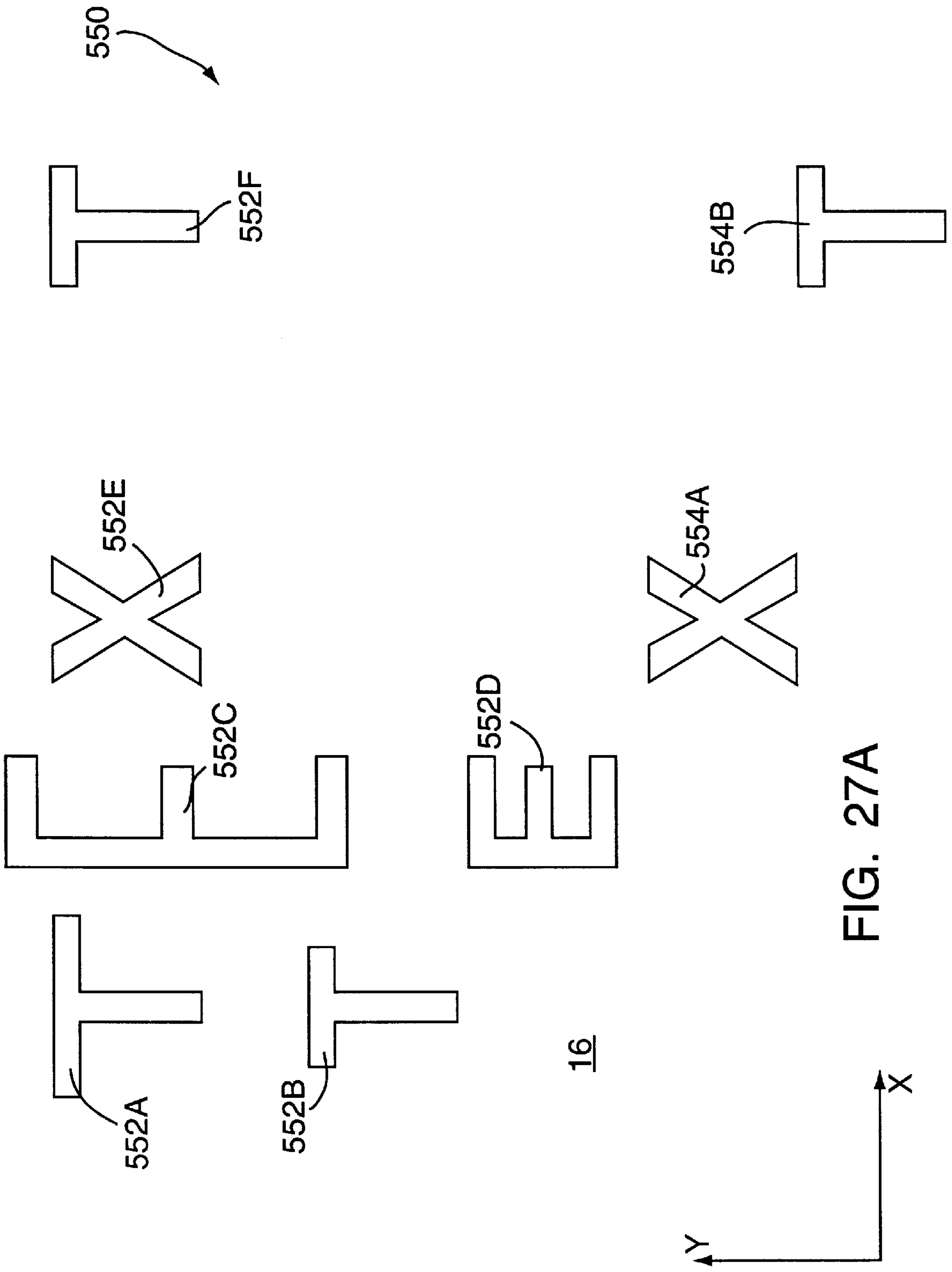
FIG. 27A illustrates an example of a multicolor graphic product to be printed by the wide format thermal printer of the present invention.
Figure 27B:
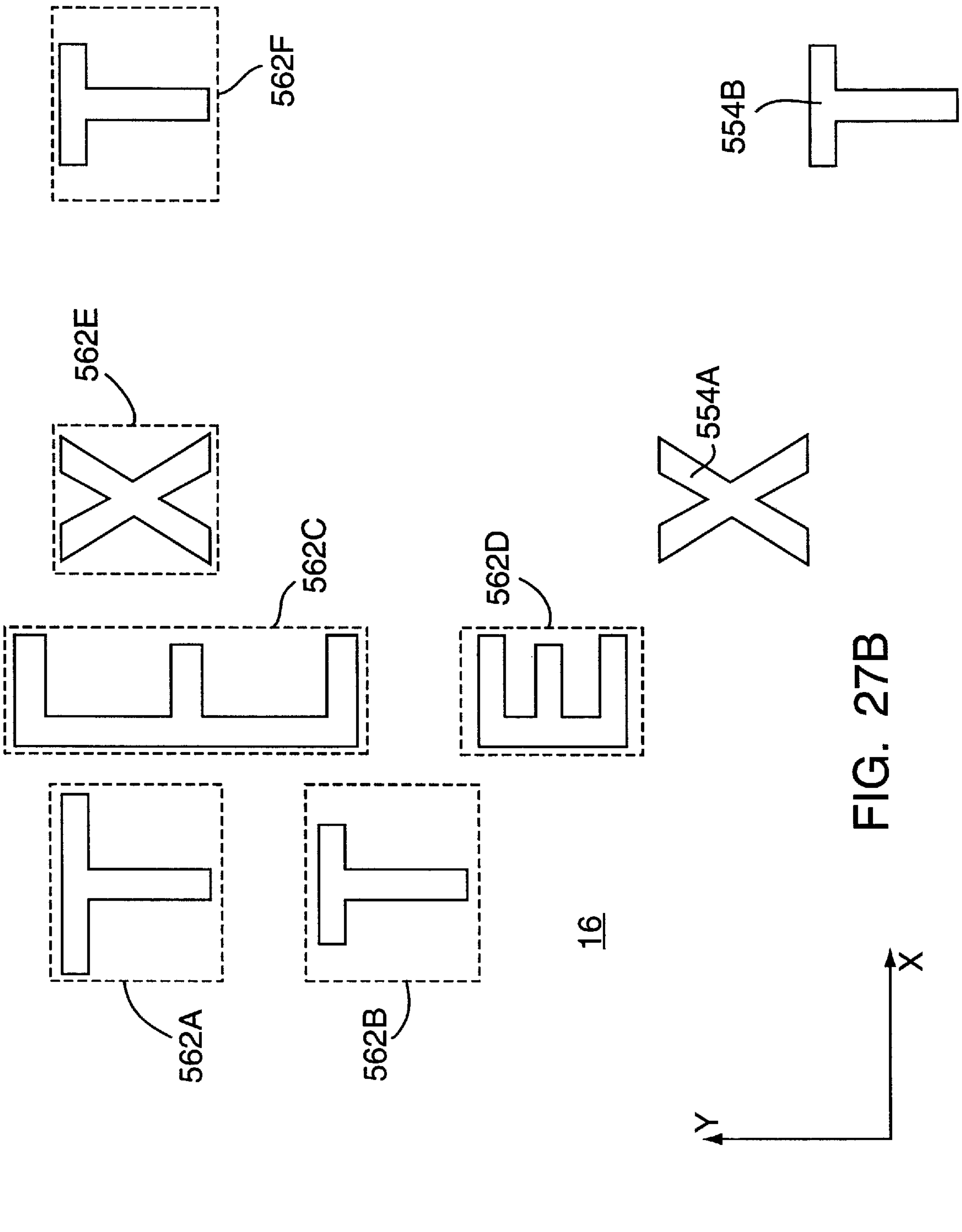
FIG. 27B illustrates the creation of bounding rectangles around those objects of the multicolor graphic product of FIG. 27A which are to be printed in the selected color plane.
Figure 27C:
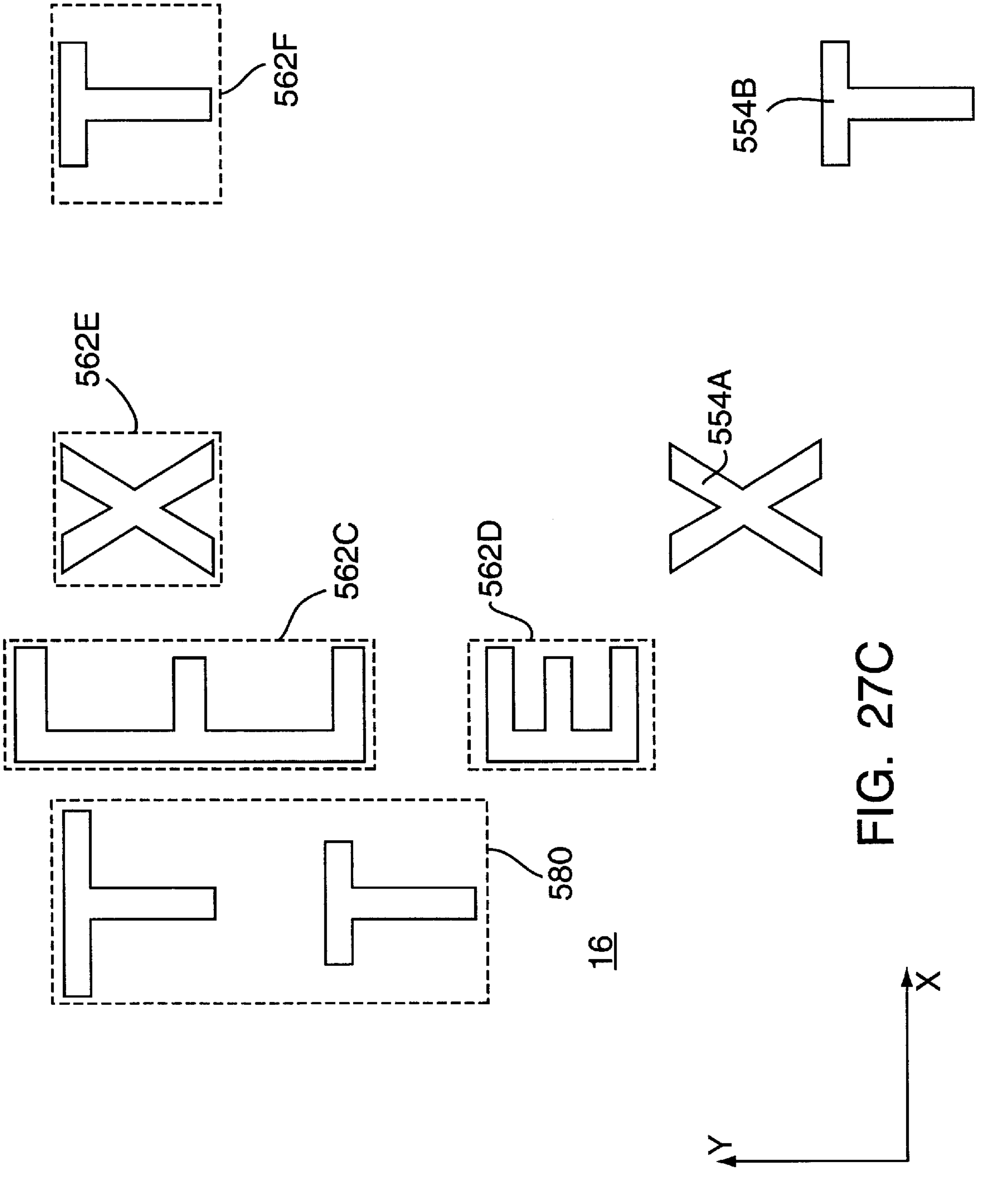
FIG. 27C illustrates combining two slices, which correspond to the bounding rectangles of FIG. 27B, to form a combined slice.

FIGS. 27A–27I are intended to be considered in conjunction with the discussion of FIGS. 24–26. Each of the FIGS. 27A–27I includes a coordinate axes indicating the printing sheet translation (X) and print (Y) directions. With reference to FIG. 27A, consider that the multicolor graphic product to be printed on the printing sheet 16 consists of the word "TEXT" printed twice. The letters represented by the reference numerals 552A through 552F are to be printed in one color, and that the letters "X" and "T", represented by reference numerals 554A and 554B, respectively, are to be printed in a second color. Each of the letters in 552 and 554 is an object in a plot file created by the graphic artist, who may enter the objects into the plot file In any order. For simplicity, all the objects shown in FIG. 27A are textual characters, which are typically geometric shapes.

The data processing steps indicated in the flow charts in FIGS. 24–26 are performed for each color plane. Typically, the order of printing color planes is predetermined by the nature of the multicolor graphic product. Typical multicolor graphic products printed by the wide format thermal printer 10 of the invention can include process colors, such as the subtractive "CMYK" process colors and additionally, spot colors specific to a particular job and that are typically not rendered faithfully by a combination of the process colors and, hence, are printed by using a donor sheet of the desired spot color. It is known in the art that the CMYK process colors are preferably printed in a selected order. Accordingly, the multicolor graphic product can include deliberate overprints.

Figure 24A:
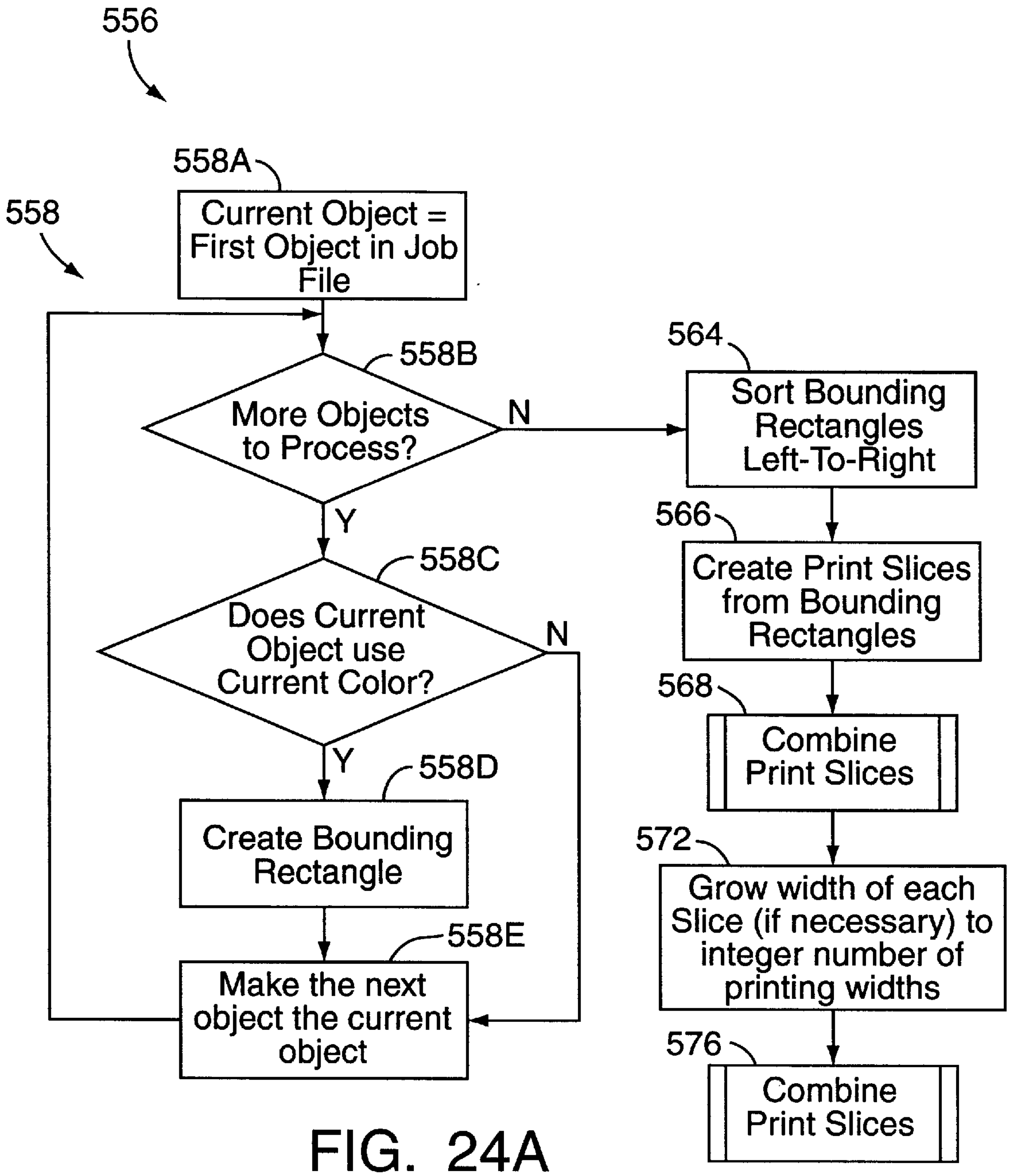
FIG. 24A is a flow chart illustrating one data processing technique for determining those objects of the multicolor graphic product that are part of a selected color plane and for generating print slices corresponding to the selected objects.

Reference numerals 558A through 558E in FIG. 24A indicate data processing steps wherein the job file is read to sort out those objects that are of the same color as the color plane to be printed. For each object found that is of the color plane to be printed, a bounding rectangle is created about that object, as indicated by reference numeral 558D. For example, assume that the color plane to be printed corresponds to the color of the objects 552 in FIG. 27A. The routine indicated by reference numeral 558 in FIG. 24A results in the creation of the bounding rectangles 562A through 562F shown in FIG. 27B. Note that the objects 554A and 554B do not receive bounding rectangles because they are not of the color to be printed in this color plane. Typically objects are shapes and bitmaps. A bitmap receives its own bounding rectangle.

After the job file has been read through to sort those objects of the color of the color plane to be printed and the bounding rectangles drawn around each object, the bounding rectangles are sorted left-to-right along the printing sheet translation (X) axis, as indicated by functional block 564. For example, each bounding rectangle 562 shown in FIG. 27B can be considered to have an X and Y coordinate associated therewith, such as the X and Y coordinate corresponding to the lower left-hand corner of each bounding rectangle. According to functional block 564, the bounding rectangles are sorted such that those with the lower X coordinate are arranged in a list before those with higher X coordinates. Next, as indicated by functional block 566, print slices are created from bounding rectangles. The term "print slice" as used herein, simply refers to a rectangular area of the color plane. Initially there is a 1 to 1 correspondence between print slice and bounding rectangles; that is, each print slice simply becomes a bounding rectangle.

Figure 24B:
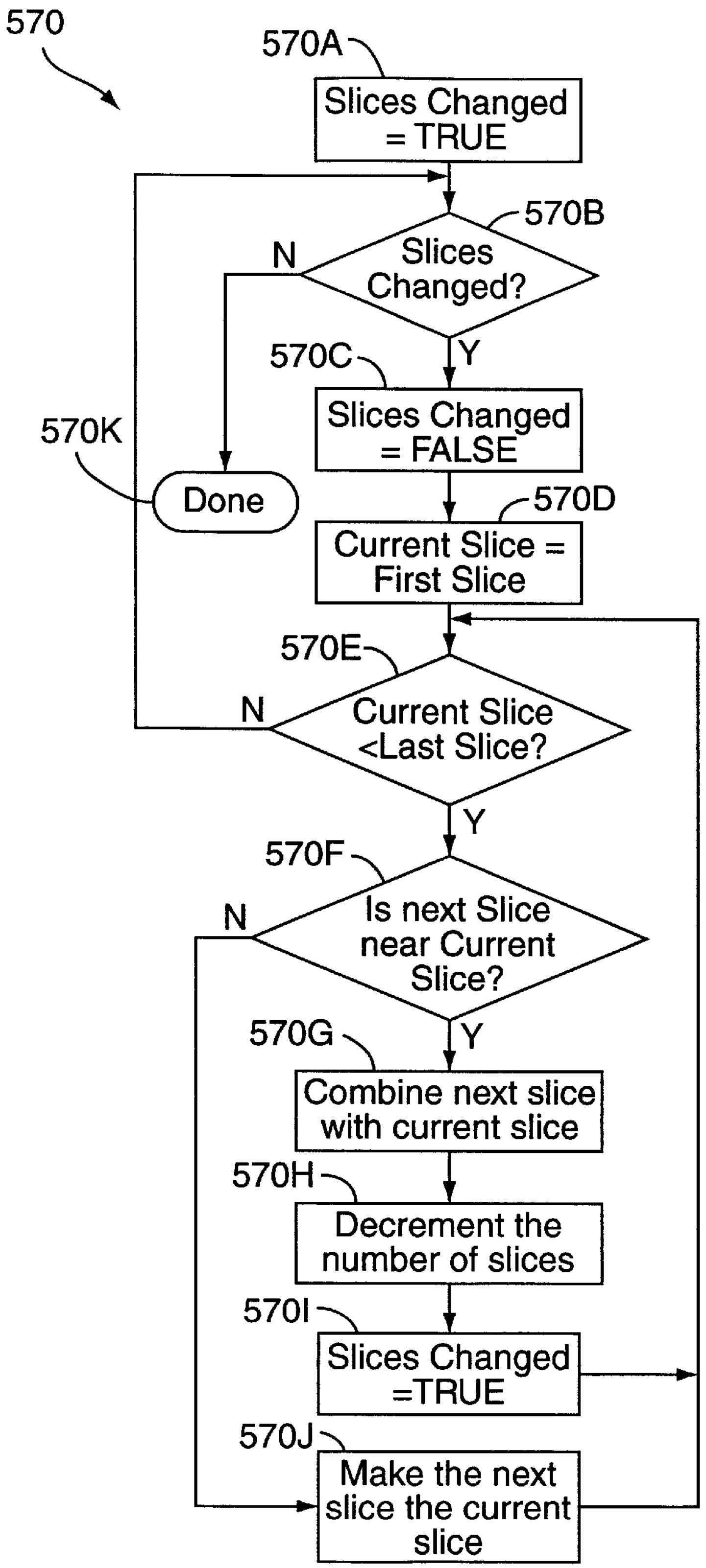
FIG. 24B is a flow chart illustrating one data processing technique for combining the print slices in accordance with the flow chart of FIG. 24A.

Proceeding to functional block 568, print slices that are within a selected distance of each other along the X axis are combined. FIG. 24B is a block diagram schematically illustrating a preferred technique for combining print slices. As indicated by functional block 570A, a "slices changed" variable is defined and set as "TRUE." In decision block 570B, the slices changed variable is evaluated. If the "slices changed" is true, the "yes" branch is followed to functional block 570C where the "slices changed" variable is set to "FALSE," and proceeding to functional block 570D, the current slice is selected to be the first slice from the list of slices created by functional blocks 564 and 566. Next, decision block 570E checks to see whether slices remain in the list to be processed, and returns to decision block 570B if the list includes more slices to consider, as is discussed below. Proceeding to decision block 570F, neighboring slices are compared to see if they are within a selected distance of each other along the X axis. If the slices are close, that is, they are separated by less than the selected distance, they are combined to form a new slice. For example, in FIG. 27B, the rectangular boxes 562A and 562B are now each slices. As they are very close, actually overlapping, they are combined into the new combined slice 580 in FIG. 27C.

Figure 27D:
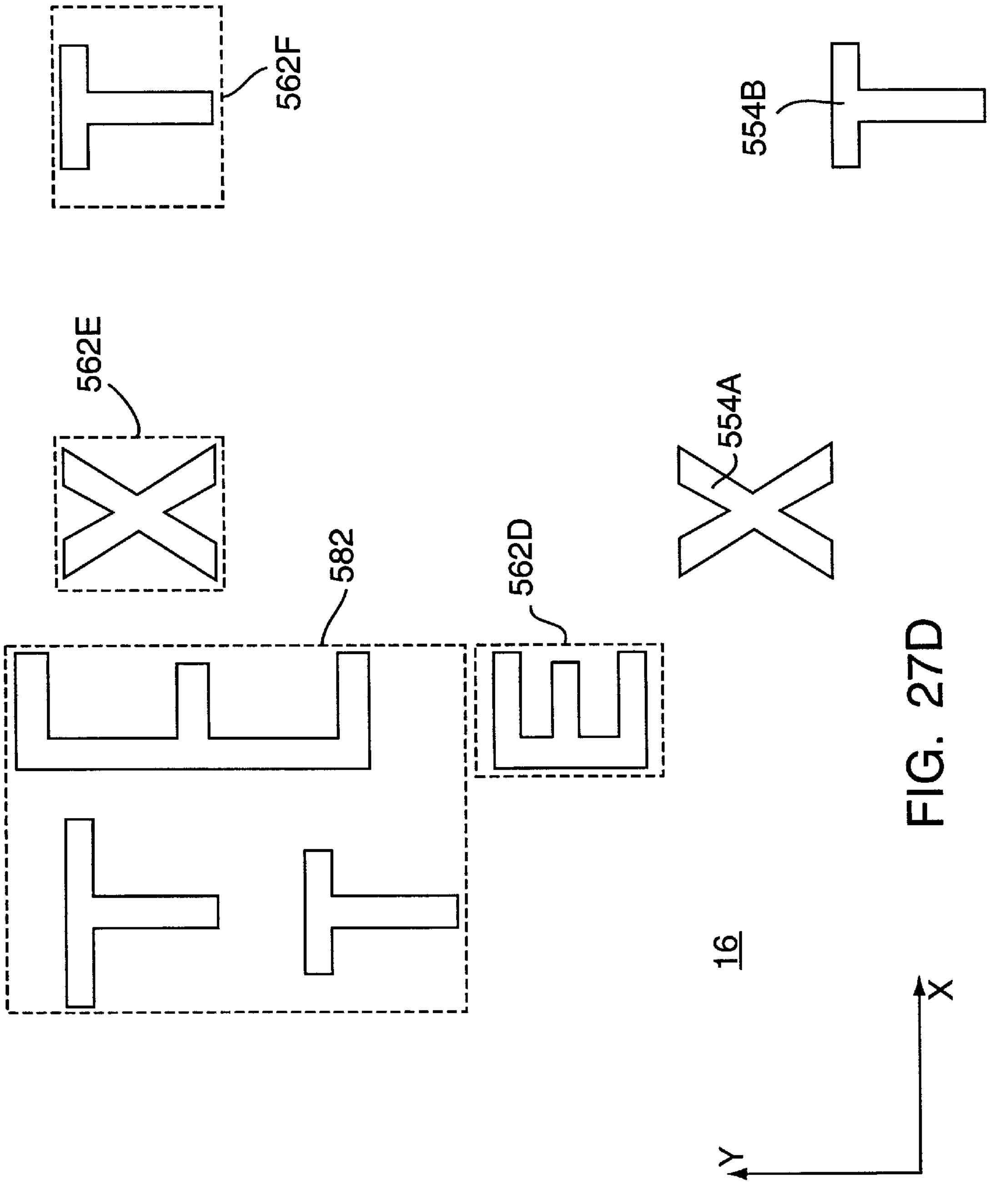
FIG. 27D illustrates combining the combined slice of FIG. 27C with another slice of FIG. 27C to form a combined slice.
Figure 27E:
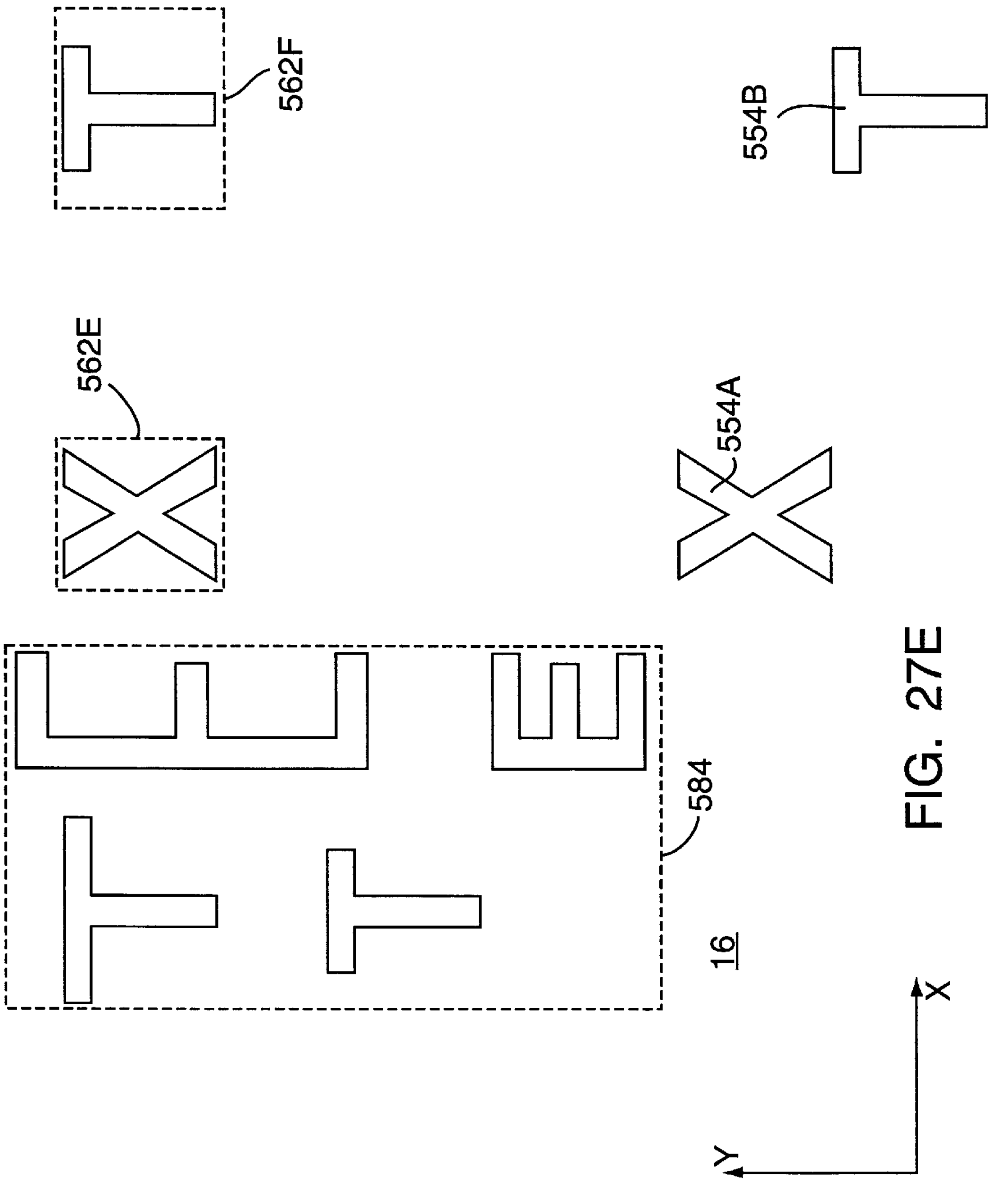
FIG. 27E illustrates combining the combined slice of FIG. 27D with another slice of FIG. 27D to form a combined slice.

Proceeding with functional blocks 570H and 570I in FIG. 24B, the number of slices is decremented and the "slices changed" variables is set to "TRUE." Returning to decision block 570E, the above procedure is repeated, and FIG. 27D illustrates the result of proceeding through the blocks 570E through 570I again. The new combined slice 580 has been compared to the next nearest slice, which is the former rectangle 562C. Accordingly, these two are combined, as shown in FIG. 27D, to form the new slice 582 which will, in turn, be combined with the former rectangular box 562D to form the combined slice 584, shown in FIG. 27E. Note that the combined print slice technique shown in the block diagram 570 will continue until, in going through the entire list of slices, no slices are changed. For example, whenever any slice is changed, the "slices changed" variable is set to "TRUE" and after following the "no" branch from decision block 570E to decision block 570B, the procedure of blocks 570E through 570I is again followed. This process continues until, in going through the whole list of slices, no slices are changed, at which point, the "combine slices" routine 570 is exited, as indicated by reference number 570K.

With reference again to FIG. 24A, proceeding from functional block 568 to functional block 572, the width of each slice, where "width" in this context refers to its dimension along the X axis, is "grown", or increased, to be an integer number of printing, or swath, widths. The increase in X dimension is toward the middle of the color plane. For example, with reference to FIG. 27F, the right-hand boundary 585 of the slice 584 is extended to 586 such that the width of the slice 588 along the X axis corresponds to an integral number of print-head widths. The printing width is typically about 4 inches.

Figure 27F:
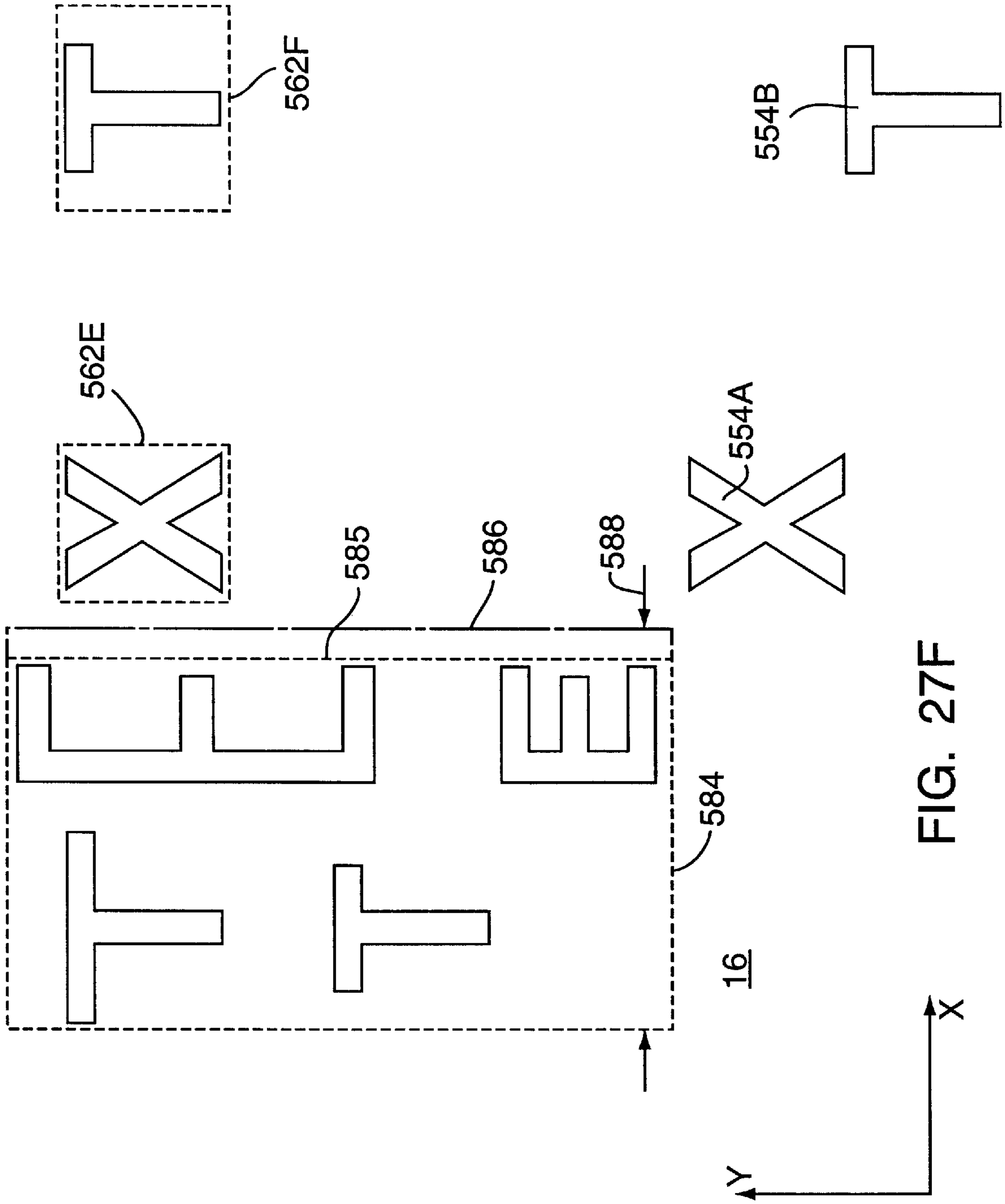
FIG. 27F illustrates increasing the width of the combined slice of FIG. 27E to be an integral number of printing widths of the thermal printhead of the wide format thermal printer of the present invention.
Figure 27G:
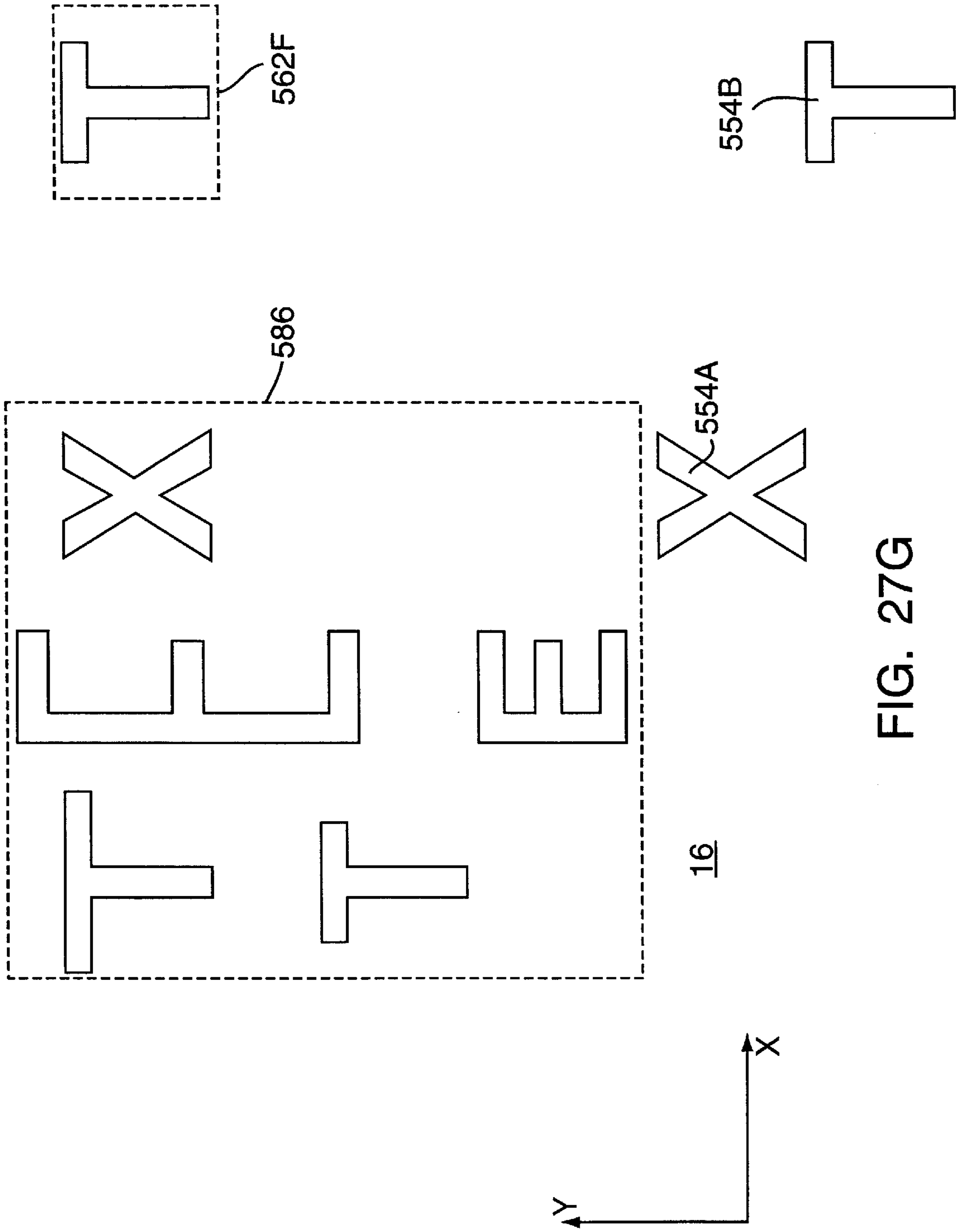
FIG. 27G illustrates combining the slice of FIG. 27F having the increased width with another slice of FIG. 27F to form a combined slice.
Figure 27H:
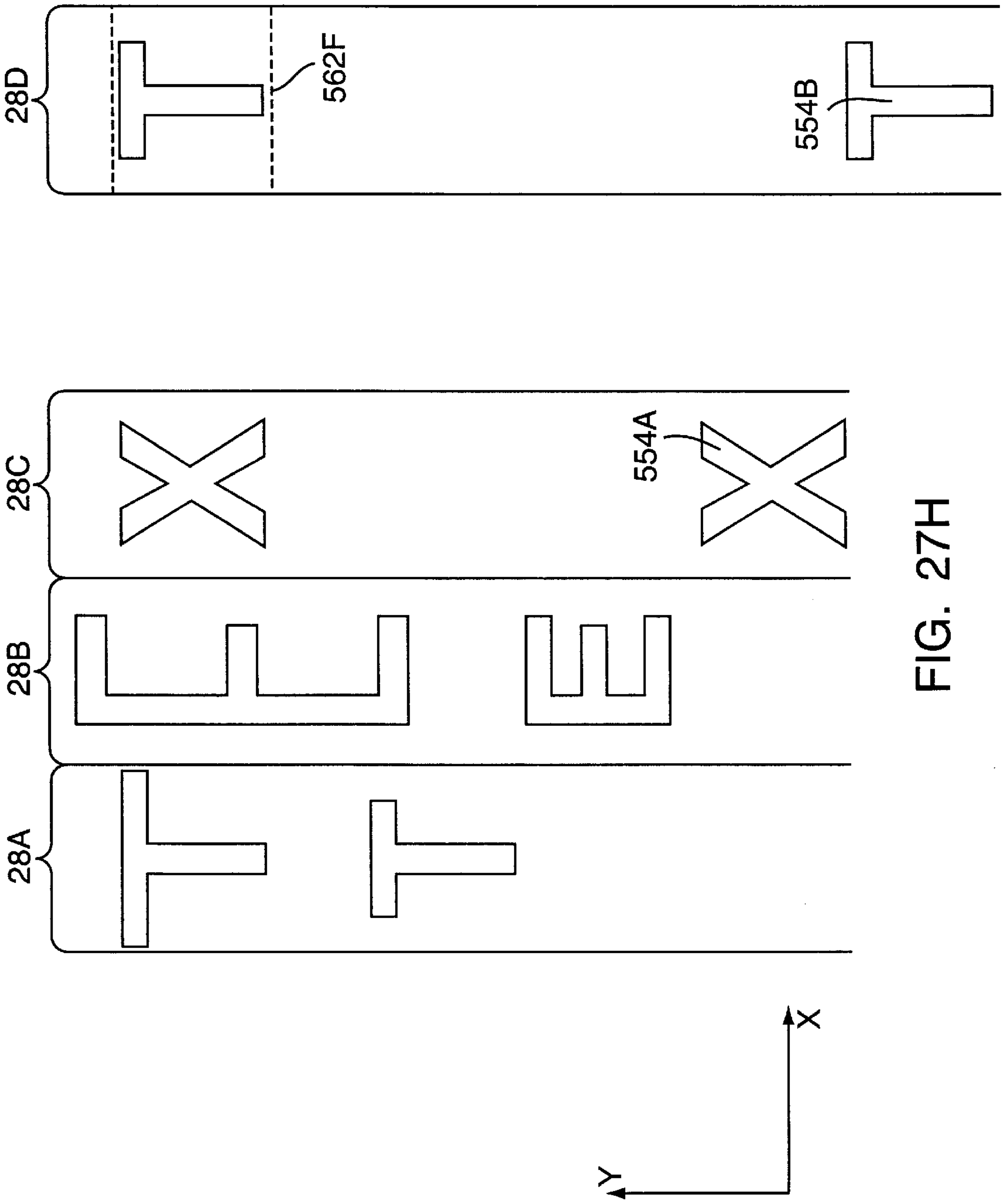
FIG. 27H illustrates dividing the slices of FIG. 27G into print swaths.

Returning to FIG. 24A, after increasing the width of each slice as necessary to be an integer number of printing widths, the combine print slices procedure 570 of FIG. 24B is again performed, as indicated by functional block 576. For example, the new slice 584 having the boundary indicated by reference numeral 586 in FIG. 27F, is now much closer to the rectangular box 562E, now considered a slice, in FIG. 27F. Accordingly, as shown in FIG. 27G, on proceeding again through the combined print slice flow chart 570, a new slice 586, as indicated in FIG. 27G, is generated. The combined print slice flow chart is followed again until reaching the "done" block 570K.

The block diagram shown in FIG. 24A results in the color plane of the color to be printed being organized into a selected number of print slices where a print slice, as noted above, is a rectangular area of the color plane. With reference now to FIGS. 25A and 25B, reference numeral 556 refers to the generation of the print slices described above in FIGS. 24A and 24B.

Proceeding to functional block 594 of FIG. 25A the direction of motion of the printing sheet along the printing sheet translation axis during printing of the color plane is determined. This direction is determined, as indicated by FIG. 23. That is, the left to right list created at functional block 564 is examined and compared to the known present position of the thermal printhead 24 to determine the nearer end of the color plane. The direction of translation of the printing sheet 16 is selected such that the color plane is printed from its nearer end to it farther end. Depending as on the direction selected, as indicated by reference numerals 596 to 600, either the last print slice or the first print slice is taken as the current print slice.

Decision block 602 causes an exit to the "done" state, indicated in decision block 604, if there remain no print slices to process in the color plane. Next, as indicated by functional block 606, the printing sheet 16 is translated such that the thermal printhead 24 is positioned at the beginning of the current print slice location. Proceeding to functional block 608, the print slice is subdivided into print swaths of width equal to the printing width, described above, of the thermal printhead 24. See FIG. 27H, wherein the print slice 586 is now divided into print swaths 28A, 28B and 28C and the rectangular box 562F, now a print slice, is divided into a print swath 28D. Proceeding to functional block 610, the first print swath is set as the current print swath. As indicated by reference numeral 612, indicating the circled "A", the remainder of processing is described in FIG. 25B.

With reference to FIG. 25B, decision block 614 checks to ensure that print swaths remain to be processed. If the answer is "NO", reference numerals 616 referring to the circled "C" in FIGS. 25A and 25B, indicate proceeding back to decision block 602 of FIG. 25A to print other print slices. As described above, if there are no other print slices, decision block 602 leads to "done," as indicated by block 604, and printing of the color plane is complete.

However, as of yet, the printing of a print swath is not described. Returning to FIG. 25B, as indicated by block 618, a memory region that is equal to the length and width of the print swath is set aside in a memory associated with the controllers. This is a one-to-one mapping, that is, the memory region includes one memory location for each pixel that can be printed within the print swath. Next, as indicated by functional block 620, the print job, that is, the file created by the graphic artist, is examined again. Each object in the print job file is examined to determine if it is of the color to be printed in the color plane and whether it falls within the current print swath. Initially, as indicated by functional block 620, the first object in the print job file becomes the current object. Decision block 622 checks to make sure there are still objects to process. Proceeding to decision block 624, if the object is the same color as the color plane about to be printed and it falls within the current print swath, the object is "played" into the memory region, that is, binary "ONES" are inserted in the memory regions at those locations corresponding to the pixels wherein the color should be printed on the printing sheet 16.

Assume that it is determined at decision block 624 that the current object is not of the color plane to be printed. Following the "NO" branch from decision block 624, decision block 630 checks to see if the current object is an deliberate overprint, that is, the object is to be deliberately printed over to achieve a particular effect. If it is an overprint, as indicated by the "YES" branch of decision block 630, decision block 628 makes the next object the current object. However, if the current object is not a deliberate overprint, then the current object is of a color that prints over the color of the color plane being printed, and a "hole" is knocked-out for the object in the memory region, that is any "ONES" in a locations corresponding to current object are changed to "ZEROS." This corresponds to the "knock-out" conservation shown in FIG. 22D. After all objects in the print job file are processed, the "NO" branch of decision block 622 is followed, leading to the circled "B", as indicated by reference numeral 640.

With reference to FIG. 25C, further processing is now described. As indicated by decision block 642, a check is made to determine whether the memory region created by functional block 618 is empty. If the memory region is empty, there are no objects to be printed in the current print swath. For example, all of the objects printed in the swath may have been knocked-out. If the memory region is empty, following the "YES" branch of decision block 642 leads to functional block 744, wherein the printing sheet 16 is translated past the print swath 28A, and as indicated by reference numeral 612 and the circled "A", the next print swath is printed, as indicated by reference numeral 612 in FIG. 25B.

Alternatively, if the memory region is determined in decision block 642 not to be empty, functional block 646 performs Y axis conservation for the current print swath, corresponding to lifting the printhead as illustrated in FIG. 20. A print swath consists of consecutive rows of pixels, where the rows extend along the printing sheet translation (X) axis, each pixel corresponding to one thermal printing element of the array of thermal printing elements 26. Basically, each row of pixels within the print swath is examined to see if all the pixels that row are blank, and to determine when there exists consecutive blank rows. The number of consecutive blank row is counted, and, should more than a threshold number of consecutive blank rows be found, the print swath is divided into sub-swaths, where the thermal printhead 24 is lifted between subswaths. This procedure is described in detail below.

Figure 27I:
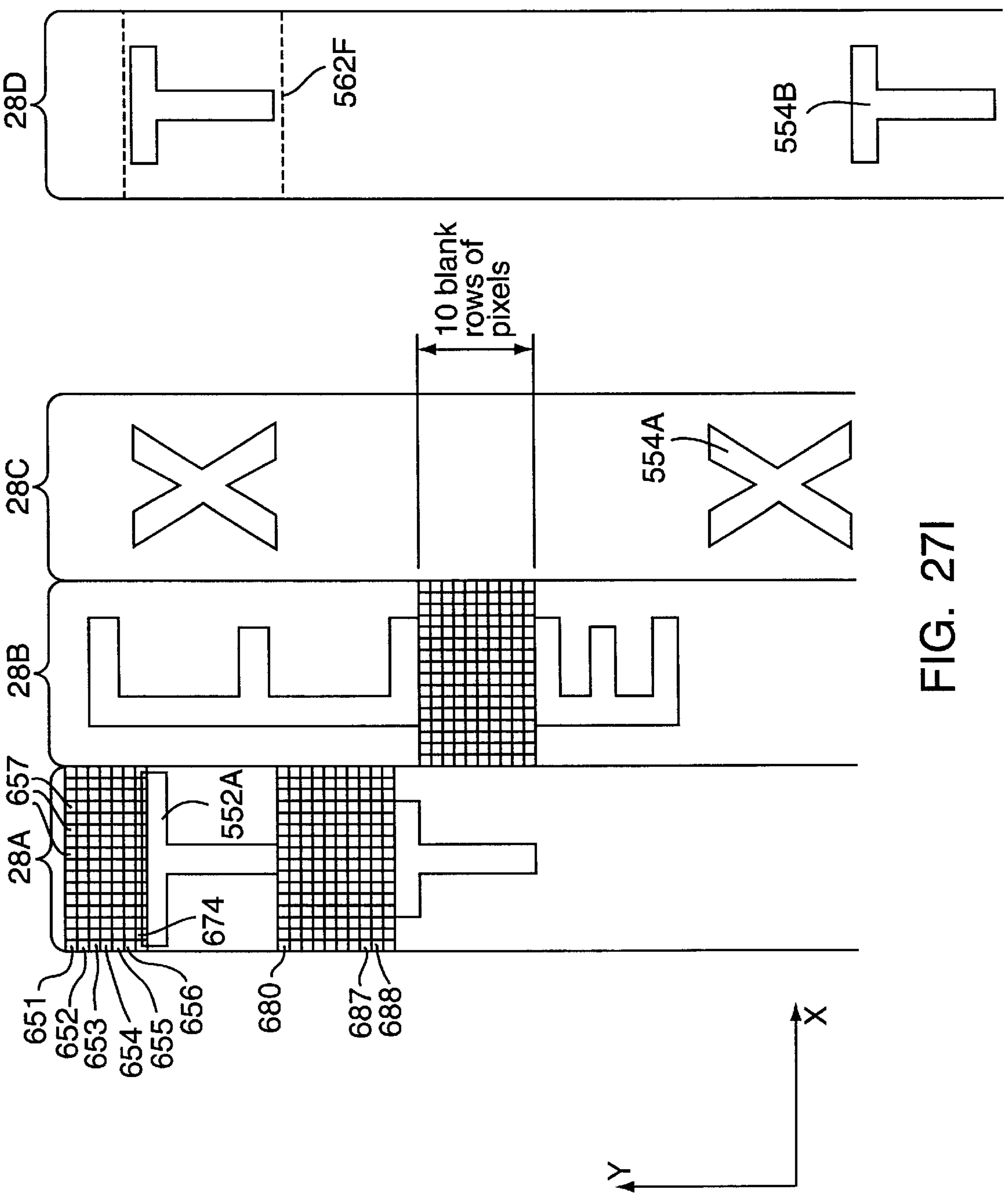
FIG. 27I illustrates counting consecutive blank rows in one of the print swaths of FIG. 27I in accordance with the flow chart of FIG. 26.

FIG. 26 is a flow chart illustrating the Y axis donor sheet conservation procedure and is considered in conjunction with FIG. 27I. Consider print swath 28A, shown in FIG. 27I. Starting with functional block 647 in FIG. 26, the variable "looking for a blank row" is set at "TRUE." Then, in functional block 648, the number of blank rows are set equal to "ZERO." Proceeding to functional block 650, the current row is set as the first row of the swath 28A. The first row of pixels is indicated by reference numeral 651 in FIG. 27I, with the individual pixels indicated by reference numerals 652. For simplicity, the individual pixels 652 are shown as much larger than they typically are in practice. (Typically, a print swath is four (4) inches wide, and there are 1200 pixels across the width of the swath, for a resolution of 300 dpi.)

Returning again to the flow chart of FIG. 26, the decision block 660 checks to see whether there are more rows in the swath 28A to process. At this point, the variable "looking for a blank row" is "TRUE," having been set by the functional block 647 and not otherwise reset. Accordingly, proceeding along the "YES" branch to decision block 666, each pixel of the current row is examined to determine whether the row 651 is blank. Accordingly, proceeding along the "YES" branch from decision block 666 to functional block 668, the number of blank rows is incremented. Proceeding to decision block 670, the number of blank rows is compared to the threshold value, and assume for the purposes of this example that this threshold value is six (6) blank rows.

The six blank rows 651 to 656 are counted by repeating the blocks 660, 664, 666, 668, 670, and 672. As the number of blank rows does not exceed six (6), the "NO" branch leading from decision block 670 is followed, which leads to functional block 672, setting the next row as the current row, leading again to a decision block 660, 664, etc. This procedure continues through the decision and functions blocks indicated until all the six rows 651–656 shown in slice 28A of FIG. 27I are counted. Finally, when processing the seventh (7th) row, indicated by reference numeral 674 in FIG. 27I, decision block 666 determines that the row is not blank, and proceeding along the "NO" branch to functional block 680, resets the number of blank rows. The next row is made the current row according to functional block 672 and the process described above repeats.

Consider the examination of rows 680–688 in FIG. 27I. In this instance, it is determined by the program represented by the flow chart of FIG. 26 that the threshold number of blank rows is exceeded. Accordingly, when examining the row 687 in FIG. 27I (the seventh row), it is determined in decision block 670 that the number of blank rows is greater than the threshold value (6) and, proceeding along the "YES" branch to functional block 671, a sub-swath is created such that after printing the "T" 552A in swath 28A, the thermal printhead 24 is lifted. Proceeding now to functional block 692, the variable "looking for a blank row" is set at "FALSE," and the next row is made the current row by functional block 672. Basically, at this point, the counting of blank rows continues to determine when the thermal printhead 24 is to be dropped again. As the variable "looking for a blank row" is "FALSE," when reaching decision block 664 the "NO" branch is followed, leading to decision block 694 which checks to determine whether the current row is blank. If the current row is blank, functional block 672 sets the next row as the current row. Eventually, however, after examining row 696, the next row is found to contain pixels to be printed. The "NO" branch leading from decision block 694 is followed and, as indicated in functional block 700, the number of blank rows is set to "ZERO." Proceeding to functional block 702, the variable "looking for blank rows" is set at "TRUE" and the procedure illustrated above repeats until all the rows of the swath have been examined. For the example of print swath 28A, two (2) sub-swaths 690 and 710 are created, as shown in FIG. 27J.

Referring back to FIG. 25C, after performing the print (Y) axis donor sheet conservation of functional block 646, the first sub-swath is taken as the current swath, as indicated by functional block 712. Proceeding to decision block 714, a check is made to determine whether there are more sub-swaths to process. Proceeding to functional block 716, the thermal printhead 24 is moved along the print (Y) axis to the beginning of the sub-swath position corresponding to the position indicated by reference numeral 718 in FIG. 27J.

Figure 27J:
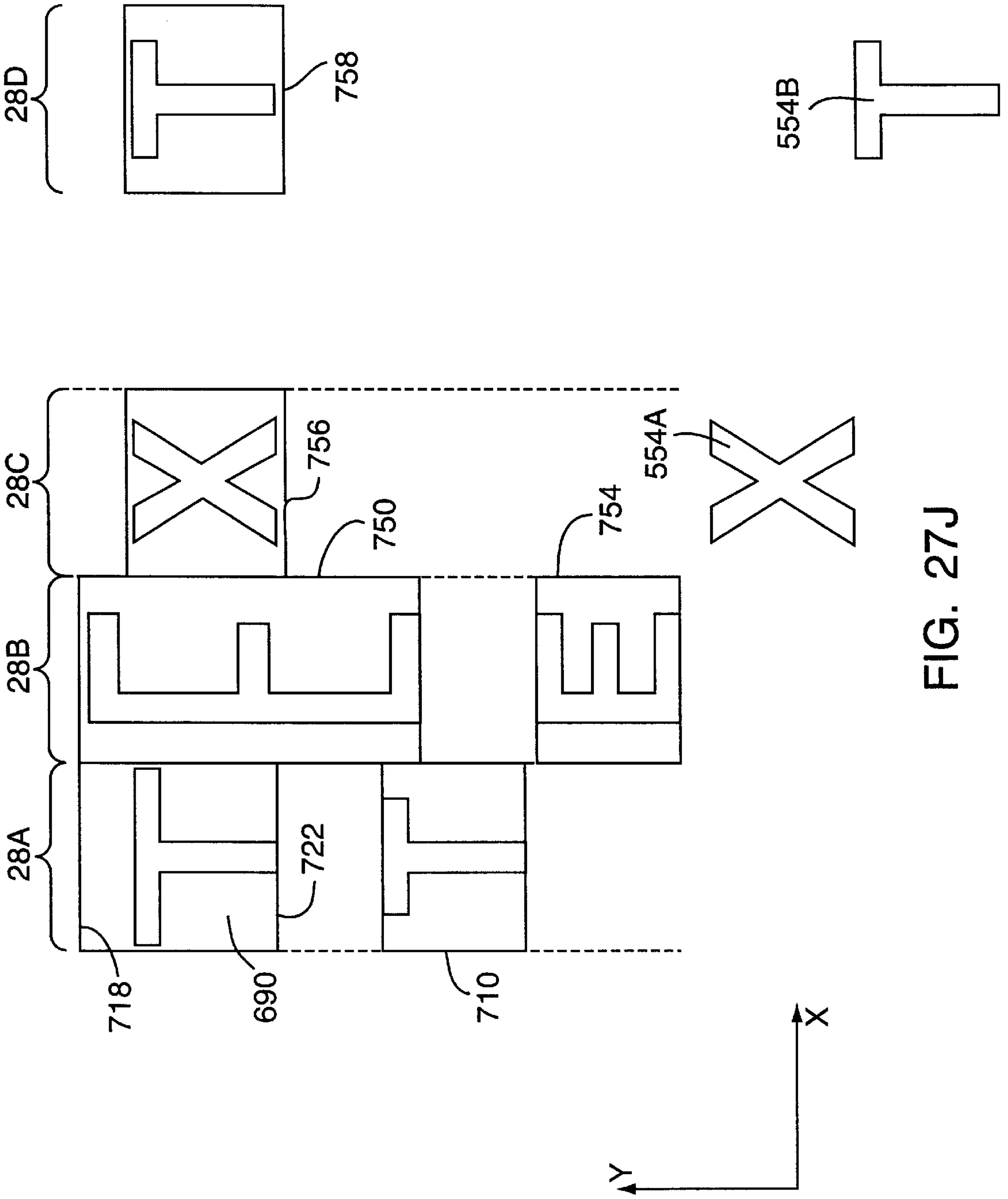
FIG. 27J illustrates the formation of sub swaths as result of the counting of the consecutive blank rows in FIG. 27I and in accordance with flow chart of FIG. 26.

Proceeding to functional block 720, the sub-swath 690 of FIG. 27J is now printed by translating the thermal printhead 24 along the print (Y) axis. The thermal printhead 24 is lifted at the end of the print swath indicated by reference numeral 722. As indicated by FIG. 25C and the loop return path 724, the next sub-swath 710 is printed. Next the "NO" branch of decision block 714 is followed, leading to functional block 744 wherein the printing sheet 16 is moved along the printing sheet translation (X) axis past print swath 28A to the next print swath 28B. As indicated by reference numeral 612, indicating the circled "A", returning to the top of FIG. 25B the remaining print swaths are processed and the procedure outlined above repeats for each print swath in the color plane. The flow charts of FIGS. 24–26 are repeated for each color plane of the multicolor graphic product, for example so as to print the objects 554A and 554B. FIG. 27J illustrates how the procedure as detailed in the above flow charts can divide the print swaths 28B, 28C and 28D into individual sub-swaths 750 to 754, 756 and 758.

Tension Control

Proper control of the tension applied to the donor sheet section 153A (see FIG. 12) during printing can help ensure that a high quality multicolor graphic product is printed on the printing sheet 16. As understood by one of ordinary skill in the art, the tension to be applied to the donor sheet section 153A typically varies as a function of the characteristics of the particular type of donor sheet being used to print. According to the invention, data characteristic of the donor sheet can be read from the memory element 300 mounted by the supply core body 230 prior to loading the donor sheet cassette 32 on the cassette receiving station 96, and the desired tension determined by the controller(s) 22 as a function of the read data. Alternatively, the desired tension can be assumed to be a constant, i.e., the same for all donor sheets. This assumption is often justified.

The desired tension is applied to the donor sheet by selectively energizing the take-up motor 104 and the magnetic brake 110. As is also known in the art, the radius of the length of donor sheet 229 wound on the supply core body

230 (i.e., the radius of the supply roll of donor sheet) and the radius of any donor sheet wound about the take-up core body 235 (i.e., the radius of the take-up roll) need to be determined and taken into account to determine the proper energization of the take-up motor 104 and the magnetic brake 110.

It is known in the art to determine the overall radius of a known length of donor sheet wound on the supply core body 230 from a knowledge of the radius of the core body and the thickness of the donor sheet. See for example U.S. Pat. No. 5,333,960 issued Aug. 2, 1994, and herein incorporated by reference. According to the invention, however, the thickness of the donor sheet need not be known to determine the overall radius of a remaining length of donor sheet wound on a core body.

In the present invention, the controller(s) 22 can track the length of donor sheet used, i.e., the length transferred past the thermal printhead 24, by tracking the distance translated by the thermal printhead 24 along the print (Y) axis with the thermal printhead 24 pressing the donor sheet against the printing sheet 16. The length of donor sheet remaining on the supply roll is determined as the original length wound on the supply core body minus the length used as tracked above The length of donor sheet wound on the take-up core body is equal to the length tracked above, or the original length wound on the supply core body 230 minus the length remaining on the supply core body 230.

According to the invention, the radius of the supply roll of the donor sheet can be determined responsive to data read from the memory element 300. For example, the controller (s) 22 can approximate the current radius of the supply roll from data representative of the following: 1) the remaining length of the donor sheet on the supply core body; 2) a known length of donor sheet wound on the supply core body 230; 3) the radius of the supply roll when the known length is wound on the supply core body 230; and 4) the radius of the core tubular body. Typically, items 1)–3) are read from the memory element, and item 4) is fixed and stored by a memory associated with the controller. Item 1), the remaining length, is written to the memory element 300 when the donor sheet cassette 32 is returned to the cassette storage rack 55 after printing a color plane or a portion thereof. The known length and known radii typically are the original length of donor sheet wound on the supply core body 230, and the radius corresponding to the original length, and these are written to the memory element 300 at the time of manufacture of the supply roll. The radius $r_c$ of the core supply core body 230 and the radius R of the supply roll of donor sheet are shown in FIG. 15A.

According to the invention, the radius of the supply roll can be determined from the equations I and II below, or directly from equation III, which is obtained by combining equations I and II. The terms used in the equations are defined below.

$L_f$=a known length of donor sheet wound on the core body $R_f$=the known radius of the length $L_f$ of donor sheet wound on the core body $r_c$=the radius of the core body $l_c$=the length of the donor sheet that when wound into a roll would have the radius $r_c$ L=a second known length of donor sheet wound about the core body R=the radius of the length L of donor sheet wound on the core body, unknown and to be determined $$\frac{L_f + l_c}{l_c} = \frac{R_f^2}{r_c^2} \qquad \text{Equation I}$$

$$\frac{L + l_c}{L_f + l_c} = \frac{R^2}{R_f^2} \qquad \text{Equation II}$$

$$R = \sqrt{r_c^2\left(1 - \frac{L}{L_f}\right) + \frac{L}{L_f} R_f^2} \qquad \text{Equation III}$$

Once the radius of the supply roll is determined, the brake 110 is energized by providing the energization E to the take-up motor according to Equation IV, where:

E=the energization provided to the take-up motor (or brake) to provide desired tension $E_{thresh}$=the threshold energization that must be provided to the take-up motor to overcome friction (or to the brake to initiate braking)

$E_c$=the energization of the motor (or brake) needed to provide a known tension for a known radius (the "known" radius used is $r_c$)

$T_d$=desired tension to be applied to donor sheet (such as determined from data read from the memory element)

$T_k$=tension applied to the donor sheet at energization $E_c$ and known radius $r_c$ $$E = (E_c - E_{thresh})\frac{R}{r_c}\frac{T_d}{T_k} + E_{thresh} \qquad \text{Equation IV}$$

The tension $T_k$, which is the tension applied to the donor sheet when a known energization $E_c$ is applied to the brake 110 and the supply roll has the known radius $r_c$, can be determined empirically, such as by using a spring gauge, taking into account the typical translation speed (e.g., 2 inches/minute) of the printhead carriage 30 when printing along the print (Y) axis. This data is typically stored in a memory associated with the controller 22.

The above equations are also used for the energization of the take-up motor 104. Note that the thermal printhead 24, when pressing the donor sheet against the printing sheet 16, largely isolates the brake 110 from the take-up motor 104, such that the tension in the donor sheet between the thermal printhead 24 and the supply roll is affected largely by the brake rather than the take-up motor, and the tension on the donor sheet between the thermal printhead 24 and the take-up roll is affected mostly by the energization of the take-up motor 104, rather than by the brake.

The threshold energization of the take-up motor 104 and the brake 110 can be determined as follows: After mounting a new donor sheet cassette 32 onto cassette receiving station 96, the take-up motor 104 is be rotated in the reverse direction to create some slack in the donor sheet. Next, take-up motor is increasingly energized for forward rotation until the take-up motor just begins to rotate. The take-up motor threshold energization level corresponds to the energization at which this onset of rotation is noted.

A threshold energization for the brake can be determined in a similar manner. For example, after generating the slack in the donor sheet and determining E as noted above, the take-up motor 104 is further rotated to remove the slack previously introduced, and the energization of the take-up motor is further increased such that rotational sensor or encoder again indicates the onset of rotation of take-up roll. The brake is now increasingly energized until the rotation ceases, and this energization level corresponds to the threshold energization when using the equations above to determine the energization of the brake to provide the desired tension. Typically, the threshold energization do not vary significantly from donor sheet cassette to donor sheet cassette.

Figure 28:
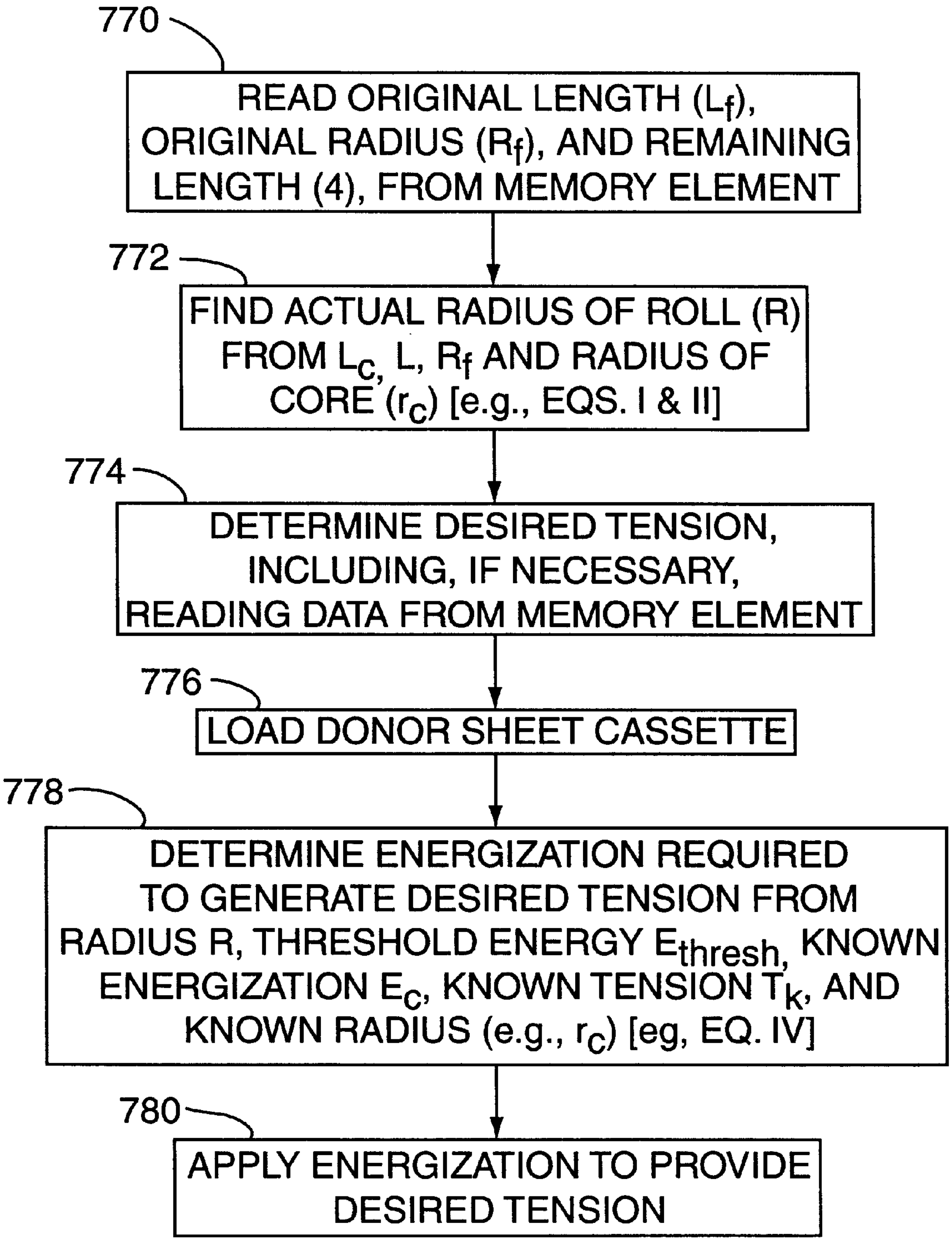
FIG. 28 is a flowchart illustrating the steps followed to energize the take-up motor and the brake to provide a selected tension on the donor sheet.

FIG. 28 is a flowchart illustrating the steps followed to energize the brake 110 (or the take-up motor 104) to provide a selected tension on the donor sheet. As indicated by block 770, the original length of donor sheet wound on the supply core body 230, the original radius of the of the length of donor sheet wound on the supply core body, and the length of donor sheet remaining on the supply core body 230 are read form the memory element 300. Proceeding to block 772, the radius corresponding to the length of donor sheet wound on the supply core is determined as a function of the data read from the memory element and the radius of the core tube, which is typically fixed and stored in a memory associated with the controller 22. Proceeding to block 774, the desired tension is determined. If necessary, additional data can be read from the memory element, and, for example, look up tables consulted to determine the desired tension corresponding to the donor sheet. As indicated in block 778, the donor sheet cassette containing the donor sheet wound on the core body is loaded onto the cassette receiving station 96. The energization to be applied to the take-up motor and the brake are each determined in accordance with Equation IV presented above. Proceeding to block 780, the energization is applied to the brake to provide the desired tension.

The donor sheet can spool onto the take-up core differently than the unused donor sheet spools on the supply core body 230, due to the ink material transferred from the donor sheet to the printing sheet 16 during printing, among other factors. However, as with energizing the brake 110, a known radius corresponding to a known length of donor sheet wound on the take-up core body suffices to determine the proper energization of the take-up motor 104, and both are typically determined empirically. A rotation sensor, such as the encoder indicated by reference numeral 875 in FIG. 4B, is typically coupled to the take-up motor 104, and is included in the present invention to determine when the donor sheet has broken. (The encoder will indicate an excessive number of rotations per unit time.) According to another technique that can be practiced in accordance with the invention, the change in the radius of the take-up roll can be tracked by noting the length of donor sheet used, as described above, as well as the number rotations of the take-up roll, as determined by a rotation sensor or encoder 875.

Preferably, the invention includes the magnetic brake 110 coupled to the supply roll for tensioning the donor sheet between the supply roll and the thermal printhead 24. However, as is known in the art, a mechanical brake can also be used. For example, a spring-biased arm mounting a friction pad can be disposed such that the friction pad rests against the supply roll, such as against the outer layer of donor sheet wound on the supply roll.

Figures 29, 29A:
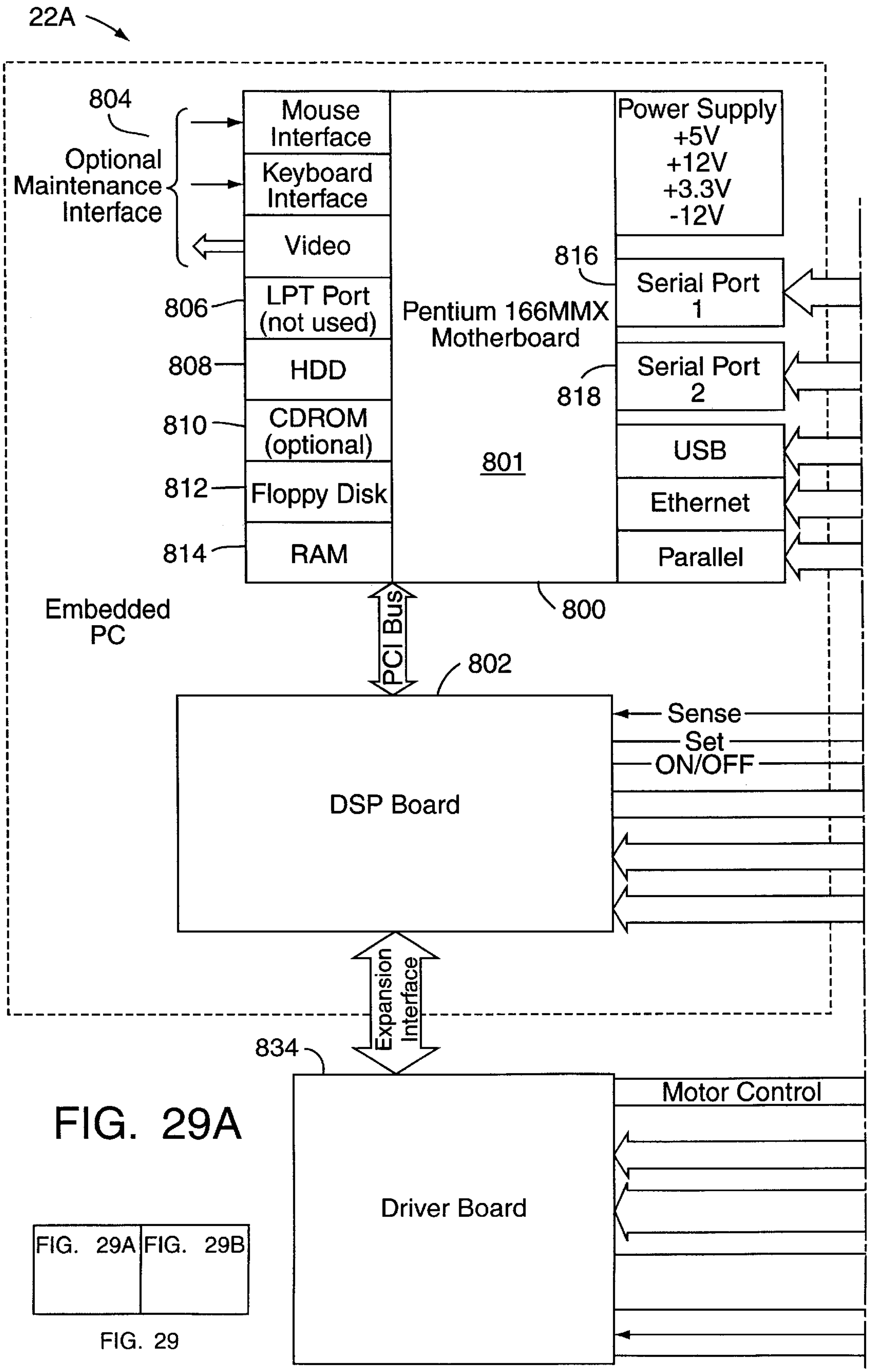
FIG. 29 schematically illustrates one example of the on board controller 22A and the interfacing of the on board controller 22A with other components of the wide format printer 10.

FIG. 29 schematically illustrate one example of the on-board controller 22A and the interfacing of the on board controller 22A with other components of the wide format printer 10. The on board controller 22A can include an IBM compatible pc 800 in communication with the Digital Signal Processor (DSP) 802, which handles much of the standard, lower level functionality of the wide format printer 10. The IBM compatible pc can include the Pentium MMX processor 801, and the typical other standard hardware, such as the mouse keyboard and video interfaces 804; the printer port 806; the hard drive 808; the CD ROM drive 810; the floppy disk drive 812; and the random access memory (RAM) 814. Also included are the following: the serial port 816 in communication with the data transfer element(s) 304 for communication with memory elements 300 mounted in donor sheet apparatus 228 received by donor sheet cassettes 32 on the cassette storage rack 55; the second serial port in communication with the user interface 61; and the communication interface 822 for communicating with other controller(s) 22.

The DSP 802 communicates with the printhead power supply 828 that provides the electrical power for energizing the thermal printing elements of the thermal printhead 24. As is known by ordinary skill in the art, considerable power can be required to properly energize the thermal printing elements, and the printhead power supply often includes a large storage capacitor(s) for enhancing power deliver to the thermal printing elements. The storage capacitor or capacitors can be located proximate to thermal printhead 24, rather than with the printhead power supply 828, for reducing the effects of the inductance of the power leads running from the printhead power supply 828 to the thermal printhead 24. The DSP also communicates with the semiconductor element 420 mounted with the thermal printhead 24, communicates print data representative of the multicolor graphic product to the thermal printhead 24 for selectively energizing the thermal printing elements, and communicate with the rotary sensor or encoder 830 coupled to the take-up shaft 100 for sensing rotation thereof.

Figure 29B:
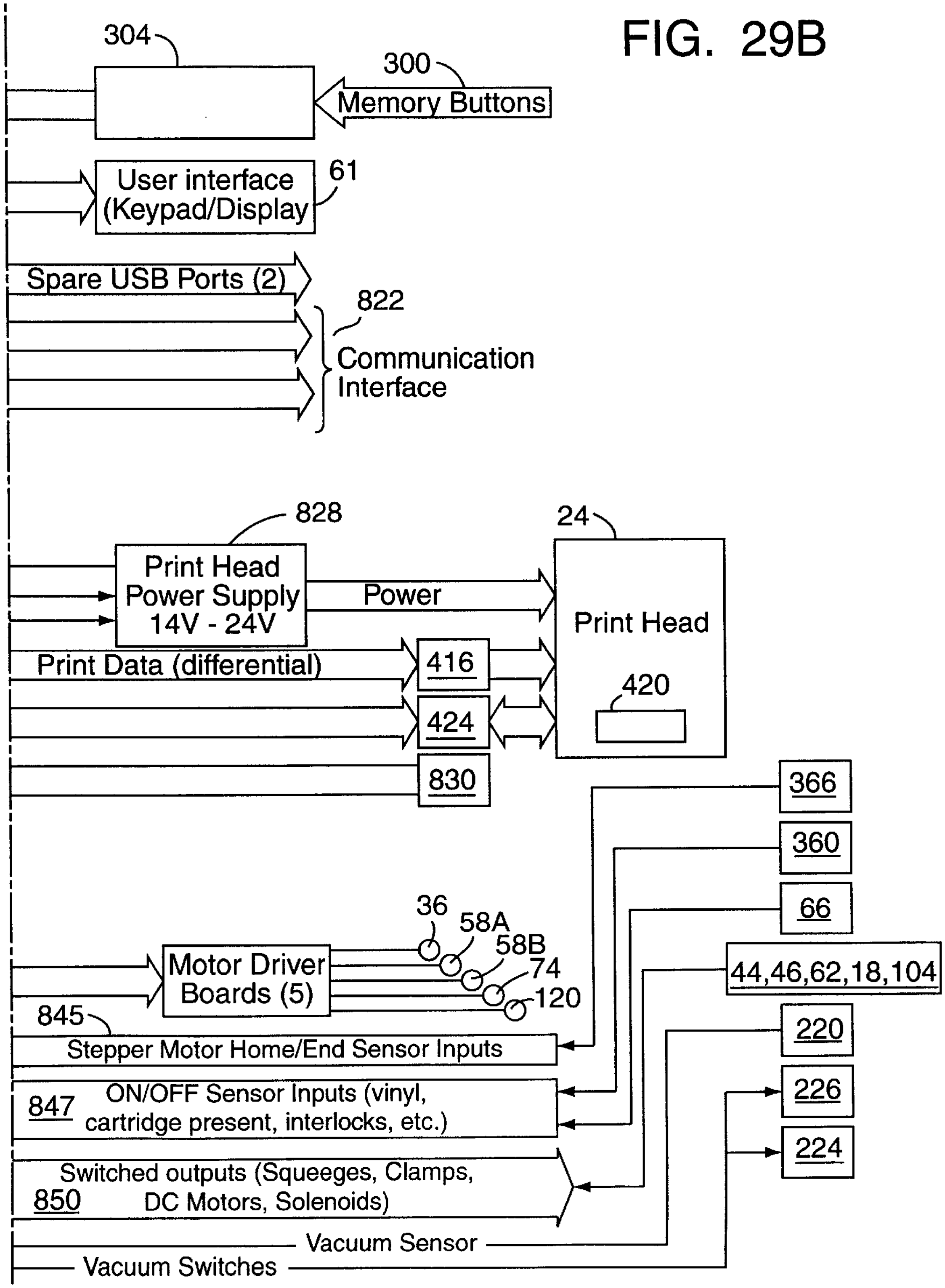

The wide format thermal printer 10 can also include the driver board 834 and the five (5) motor drivers 840 for driving those motors or actuators of the wide format thermal printer 10 that preferably are stepper motors. For example, as indicated by FIGS. 29A AND 29B, the printing drive motor 36, left and right clamp actuators 58A and 58B, respectively, the pivot actuator 74, and the belt drive motor 120 are preferably stepper motors and can be driven by the driver board 834 in combination with the motor driver boards 840.

As understood by those of ordinary skill in the art, the wide format thermal printer of the present invention can include various sensors, detectors, interlocks, etc., that are known to be useful for safe and efficient use of the wide formal thermal printer and that are often employed on printers or plotters known in the art. Sensors are often included with stepper and other motors to indicate "home" and "end" positions of the motors or the apparatus driven by the motors. The driver board 834 communicates with such sensors and interlocks. As indicated by reference numerals 845 and 847, the driver board 834 can also communicate with the home position sensor 366 described in conjunction with aligning and tracking the printing sheet 16, the edge sensor 360 and the hanging loop optical sensor 66. As indicated by reference numeral 850, the driver board 834 also drives the clamps 44 and 46 between the clamped and unclamped conditions, as well the dc motors or actuators of the wide format thermal printer 10, such as the take-up motor 104 and the brake 110, and the squeegee 62 actuators. The vacuum sensor 220 and flow control valves 224 and 226 can also be driven by the driver board 834.

Having described the invention, what is claimed as new and to be secured by Letters Patent is:

1. A method of providing a replaceable donor sheet assembly for insertion in a refillable cassette and for use with a thermal printer for providing a donor sheet for thermal printing, comprising the steps of:

providing a length of donor sheet;

providing a core having a tubular body extending along a longitudinal axis between a base end and a drive end and having a central opening extending therethrough between said base and drive ends, the core including a plurality of drive elements, drive elements along and radially of the longitudinal axis and are located within said central opening substantially at the drive end of said core body and a memory element mounted within said central opening of said core body and substantially at the drive end of said core body and inboard of said drive elements, said memory element having a data transfer face substantially perpendicular to said longitudinal axis and facing said base end of said core body and a back face facing said drive end of said core body;

winding the selected length of the donor sheet about the core body;

determining selected data characteristic of the donor sheet; and writing the selected data to said memory element.

2. The method of claim 1 wherein the step of writing the selected data includes inserting a probe having a data transfer element into the central opening of the tubular body at the base end thereof such that the probe data transfer element contacts the data transfer face of the memory element.

3. A method of manufacturing a replaceable assembly for providing a supply of donor sheet and for insertion in a refillable cassette, comprising the steps of:

providing a length of donor sheet having a first width W;

cutting the length of donor sheet along its length into N separate slice lengths of donor sheet each having a width approximately equal to W divided by N;

providing N supply core bodies;

winding the N slice lengths of donor sheet onto the N core bodies to provide N wound supply core bodies of donor sheet;

providing N memory elements each having data transfer and back faces, each of the memory elements mounted within a different supply core body substantially at a first end thereof and having the data transfer face facing inwardly toward the second end of the core body;

testing the donor sheet to determine data characteristic of the donor sheet;

storing on said memory elements the data characteristic of the sheet material;

providing N take-up core bodies; and affixing free ends of each of the slice lengths wound on the supply core bodies to a different take-up core body to form N donor sheet assemblies.

4. The method of claim 3 wherein the step of providing a length of donor sheet having a width W includes providing a length of donor sheet having a width W greater than or equal to 24 inches and wherein the step of cutting the donor sheet along its length into N slice lengths each having a width approximately equal to W/N includes cutting the length of donor sheet into 5 slice lengths each having a width approximately equal to 4.75 inches.

5. The method of claim 3 including the step of storing data on a selected memory element representative of the slice position of the slice length of donor sheet wound on the supply core body mounting that memory element.

6. The method of claim 3 wherein the step of testing includes testing each of the slice lengths individually and wherein the step of storing includes storing on a selected memory element the data obtained from the testing of that slice length wound on the supply core body with which the selected memory element is mounted.

* * * * *